United States Patent
Gschwind et al.

(10) Patent No.: US 10,649,785 B2
(45) Date of Patent: May 12, 2020

(54) TRACKING CHANGES TO MEMORY VIA CHECK AND RECOVERY

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 15/489,909

(22) Filed: Apr. 18, 2017

(65) Prior Publication Data

US 2018/0300152 A1    Oct. 18, 2018

(51) Int. Cl.
*G06F 9/38*    (2018.01)

(52) U.S. Cl.
CPC ............ *G06F 9/3863* (2013.01); *G06F 9/384* (2013.01); *G06F 9/3842* (2013.01)

(58) Field of Classification Search
CPC .... G06F 9/3863; G06F 9/30058; G06F 9/384; G06F 9/3842
See application file for complete search history.

(56) References Cited

U.S. PATENT DOCUMENTS 3,781,810 A * 12/1973 Downing ............ G06F 9/30105
                                                       712/228
5,535,397 A    7/1996 Durante
(Continued)

FOREIGN PATENT DOCUMENTS

GB     2516999 A      2/2015
WO     WO2007130386 A2   11/2007
(Continued)

OTHER PUBLICATIONS

Gschwind, Michael K., "Management of Store Queue Based on Restoration Operation," U.S. Appl. No. 15/810,618, filed Nov. 13, 2017, pp. 1-120.
(Continued)

*Primary Examiner* — William B Partridge
*Assistant Examiner* — Kasim Alli
(74) *Attorney, Agent, or Firm* — Steven Chiu, Esq.; Blanche E. Schiller, Esq.; Heslin Rothenberg Farley & Mesiti P.C.

(57) ABSTRACT

One or more architected registers are restored from a snapshot previously taken of the one or more architected registers. The snapshot indicates one or more physical registers previously assigned to the one or more architected registers. The restoring replaces the one or more physical registers currently assigned to the one or more architected registers with the one or more physical registers previously assigned to the one or more architected registers as indicated by the snapshot. A determination is made as to the validity of the one or more architected registers restored using the snapshot. The determining validity includes checking memory locations associated with the one or more architected registers to determine whether contents of the one or more architected registers have changed since the snapshot was taken. If the contents of the one or more architected registers have not changed, the one or more architected registers are valid.

20 Claims, 45 Drawing Sheets

(56) References Cited

U.S. PATENT DOCUMENTS

| | | |
|---|---|---|
| 5,649,230 A | 7/1997 | Lentz |
| 5,673,408 A | 9/1997 | Shebanow |
| 5,742,822 A | 4/1998 | Motomura |
| 5,794,024 A | 8/1998 | Golla et al. |
| 5,809,522 A | 9/1998 | Novak |
| 5,881,305 A * | 3/1999 | Walker ............... G06F 9/30101 712/217 |
| 5,918,005 A | 6/1999 | Moreno et al. |
| 5,974,512 A | 10/1999 | Chiba |
| 5,987,495 A | 11/1999 | Ault |
| 6,047,122 A | 4/2000 | Spiller |
| 6,088,779 A | 7/2000 | Bharadhwaj |
| 6,134,653 A | 10/2000 | Roy |
| 6,298,403 B1 | 10/2001 | Suri |
| 6,338,137 B1 | 1/2002 | Shiell |
| 6,421,758 B1 | 7/2002 | Buti |
| 6,480,931 B1 | 11/2002 | Buti et al. |
| 6,571,329 B1 | 5/2003 | Ukai |
| 7,085,914 B1 | 8/2006 | Gschwind |
| 7,426,618 B2 * | 9/2008 | Vu ...................... G06F 11/1469 711/114 |
| 7,493,621 B2 | 2/2009 | Bradford |
| 7,543,284 B2 | 6/2009 | Bolton et al. |
| 7,562,200 B1 | 7/2009 | Chatterjee |
| 7,962,731 B2 | 6/2011 | Rychlik |
| 7,971,018 B2 | 6/2011 | Schwemmlein |
| 8,001,421 B2 | 8/2011 | Wang et al. |
| 8,010,543 B1 | 8/2011 | Armangau |
| 8,020,169 B2 | 9/2011 | Yamasaki |
| 8,095,915 B2 | 1/2012 | Winberg et al. |
| 8,099,726 B2 | 1/2012 | Harris |
| 8,245,018 B2 | 8/2012 | Nguyen |
| 8,438,372 B2 | 5/2013 | Dieffenderfer et al. |
| 8,484,438 B2 | 7/2013 | Cypher |
| 8,516,465 B2 | 8/2013 | Damron |
| 8,544,022 B2 | 9/2013 | Arndt et al. |
| 8,560,816 B2 | 10/2013 | Moir et al. |
| 8,661,204 B2 | 2/2014 | Dwarkadas et al. |
| 8,677,105 B2 | 3/2014 | Abdallah |
| 8,966,453 B1 | 2/2015 | Zamfir |
| 8,972,992 B2 | 3/2015 | Srinivas |
| 8,972,994 B2 | 3/2015 | Srinivas |
| 9,009,692 B2 | 4/2015 | Kalogeropulos et al. |
| 9,015,450 B2 | 4/2015 | Sun |
| 9,063,747 B2 | 6/2015 | Tran |
| 9,081,834 B2 | 7/2015 | Bhave |
| 9,110,691 B2 | 8/2015 | Chung et al. |
| 9,262,207 B2 | 2/2016 | Cain, III et al. |
| 9,298,626 B2 | 3/2016 | Busaba et al. |
| 9,361,115 B2 | 6/2016 | Greiner et al. |
| 10,198,267 B2 | 2/2019 | Airaud |
| 10,198,321 B1 | 2/2019 | Gordon |
| 2002/0087500 A1 | 7/2002 | Berkowitz |
| 2002/0087836 A1 | 7/2002 | Jourdan |
| 2003/0177342 A1 | 9/2003 | Morita |
| 2004/0133766 A1 | 7/2004 | Abraham |
| 2006/0026390 A1 | 2/2006 | Cabillic |
| 2006/0026407 A1 | 2/2006 | Chauvel |
| 2006/0184771 A1 | 8/2006 | Floyd et al. |
| 2006/0268967 A1 | 11/2006 | Drezet |
| 2007/0022428 A1 | 1/2007 | Yamasaki |
| 2007/0043934 A1 | 2/2007 | Sodani |
| 2007/0074006 A1 | 3/2007 | Martinez et al. |
| 2007/0130448 A1 | 6/2007 | Jourdan |
| 2007/0156985 A1 | 7/2007 | Tsai |
| 2007/0245099 A1 | 10/2007 | Gray et al. |
| 2008/0016325 A1 | 1/2008 | Laudon et al. |
| 2008/0040586 A1 | 2/2008 | Colavin et al. |
| 2008/0077782 A1 | 3/2008 | Lataille et al. |
| 2008/0098362 A1 | 4/2008 | Moore |
| 2008/0148022 A1 | 6/2008 | Piry et al. |
| 2009/0077329 A1 | 3/2009 | Wood |
| 2009/0292977 A1 * | 11/2009 | Bradley ............... G06F 11/1004 714/807 |
| 2010/0031084 A1 | 2/2010 | Tremblay et al. |
| 2010/0153690 A1 | 6/2010 | Vick et al. |
| 2010/0217945 A1 | 8/2010 | Ge et al. |
| 2010/0262812 A1 | 10/2010 | Lopez |
| 2011/0093686 A1 | 4/2011 | Penton |
| 2011/0238962 A1 | 9/2011 | Cain, III et al. |
| 2012/0005461 A1 | 1/2012 | Moir et al. |
| 2012/0089807 A1 | 4/2012 | Rupley |
| 2012/0278592 A1 | 11/2012 | Tran |
| 2012/0278596 A1 | 11/2012 | Tran |
| 2012/0296877 A1 | 11/2012 | Guthrie |
| 2013/0086598 A1 | 4/2013 | Gschwind et al. |
| 2013/0179665 A1 * | 7/2013 | Jackson ............... G06F 9/384 712/228 |
| 2013/0226878 A1 | 8/2013 | Sankaranarayanan |
| 2013/0232489 A1 | 9/2013 | Mitsugi et al. |
| 2013/0339327 A1 | 12/2013 | Belmar |
| 2014/0032884 A1 | 1/2014 | Krishna et al. |
| 2014/0040595 A1 | 2/2014 | Tran |
| 2014/0095848 A1 | 4/2014 | Gschwind et al. |
| 2014/0114929 A1 | 4/2014 | Henrichs |
| 2014/0156933 A1 | 6/2014 | Shaikh |
| 2014/0230077 A1 | 8/2014 | Muff |
| 2014/0244978 A1 | 8/2014 | King |
| 2015/0012727 A1 | 1/2015 | Akizuki |
| 2015/0019843 A1 | 1/2015 | Krishna et al. |
| 2015/0019847 A1 | 1/2015 | Catherwood |
| 2015/0039860 A1 | 2/2015 | Sundar |
| 2015/0046662 A1 | 2/2015 | Heinrich et al. |
| 2015/0052403 A1 | 2/2015 | Garrett |
| 2015/0154106 A1 | 6/2015 | Pusdesris et al. |
| 2015/0227355 A1 | 8/2015 | Tripoli |
| 2015/0339123 A1 | 11/2015 | Jackson |
| 2015/0339480 A1 | 11/2015 | Lutas |
| 2016/0041913 A1 | 2/2016 | Avudaiyappan et al. |
| 2016/0077926 A1 | 3/2016 | Mutalik |
| 2016/0092673 A1 | 3/2016 | LeMay |
| 2016/0104011 A1 | 4/2016 | Henry et al. |
| 2016/0350115 A1 | 12/2016 | Tonnerre |
| 2017/0249144 A1 | 8/2017 | Jaget |
| 2017/0300505 A1 | 10/2017 | Belmanu Sadananda |
| 2018/0260564 A1 | 9/2018 | Porteboeuf |
| 2018/0300142 A1 | 10/2018 | Gschwind et al. |
| 2018/0300143 A1 | 10/2018 | Gschwind et al. |
| 2018/0300149 A1 | 10/2018 | Gschwind et al. |
| 2018/0300150 A1 | 10/2018 | Gschwind et al. |
| 2018/0300151 A1 | 10/2018 | Gschwind et al. |
| 2018/0300153 A1 | 10/2018 | Gschwind et al. |
| 2018/0300154 A1 | 10/2018 | Gschwind et al. |
| 2018/0300155 A1 | 10/2018 | Gschwind et al. |
| 2018/0300156 A1 | 10/2018 | Gschwind et al. |
| 2018/0300157 A1 | 10/2018 | Gschwind et al. |
| 2018/0300158 A1 | 10/2018 | Gschwind et al. |
| 2018/0300159 A1 | 10/2018 | Gschwind et al. |
| 2018/0300368 A1 | 10/2018 | Gschwind et al. |

FOREIGN PATENT DOCUMENTS

| | | |
|---|---|---|
| WO | WO2013062948 A1 | 5/2013 |
| WO | WO2013100992 A1 | 7/2013 |

OTHER PUBLICATIONS

Gschwind, Michael K. et al., "Register Restoration using Transactional Memory Register Snapshots," U.S. Appl. No. 15/812,587, filed Nov. 14, 2017, pp. 1-120.

List of IBM Patents or Patent Applications Treated as Related, Feb. 8, 2018, pp. 1-2.

Anonymous, "A Graph-Based Modeling Method for Register Coupling in Chip Functional Verification," IP.com No. IPCOM000235071D, Feb. 26, 2014, pp. 1-17 (+ cover).

Anonymous, "Hot-Patching a VM/Guest Snapshot," IP.com No. IPCOM000244666D, Jan. 2016, pp. 1-2 (+ cover).

Anonymous, "Power-Saving Mode Control with Dynamically-Controlled Access," IP.com No. IPCOM000239255D, Oct. 23, 2014, pp. 1-4 (+ cover).

Anonymous, SMT Address Trickling, IP.com No. IPCOM000012658D, May 19, 2003, pp. 1-6 (+ cover).

(56) References Cited

OTHER PUBLICATIONS

Anonymous, "System and Method for Fact and Consistency Checking of Digital Communication Using Big Data," IP.Com No. IPCOM000233765D, Dec. 19, 2013, pp. 1-3 (+ cover).
Casper et al., "Hardware Acceleration of Transactional Memory on Commodity Systems," ASPLOS XVI, Mar. 2011, pp. 27-38.
Condie, Tyson et al., "MapReduce Online," Technical Report No. UCB/EECS-2009-136 http://www.eecs.berkeley.edu/Pubs/TechRpts/2009/EECS-2009-136.html, Oct. 2009, pp. 1-14.
Ferreira, Ronaldo Rodrigues, "The Transactional HW/SW Stack for Fault Tolerant Embedded Computing," Jan. 2015, pp. 1-129.
IBM, "CPU Self-Optimization Thread," IP.com No. IPCOM000150554D, Apr. 18, 2007, pp. 1-2 (+ cover).
IBM, "Power ISA—V2.07B," Apr. 2015, pp. 1-1527.
IBM, "z/Architecture—Principles of Operation," IBM Publication No. SA22-7832-10, Eleventh Edition, Mar. 2015, pp. 1-1732.
Memik, Gokhan et al., "Engineering Over-Clocking: Reliability-Performance Trade-Offs for High-Performance Register Files," Proceedings of the 2005 International Conference on Dependable Systems and Networks, Jun. 2015, pp. 1-10.
Sharafeddine, Mageda et al., "Virtual Register Renaming," Proceedings of the 26th international conference on Architecture of Computing Systems, Feb. 2013, pp. 86-97.
Gschwind, Michael K. et al., "Spill/Reload Multiple Instructions," U.S. Appl. No. 15/489,846, filed Apr. 18, 2017, pp. 1-123.
Gschwind, Michael K., et al., "Sharing Snapshots Between Restoration and Recovery," U.S. Appl. No. 15/489,869, filed Apr. 18, 2017, pp. 1-123.
Gschwind, Michael K., et al., "Register Restoration Using Recovery Buffers," U.S. Appl. No. 15/489,882, filed Apr. 18, 2017, pp. 1-123.
Gschwind, Michael K., et al., "Coalescing Store Instructions for Restoration," U.S. Appl. No. 15/489,899, filed Apr. 18, 2017, pp. 1-124.
Gschwind, Michael K., et al., "Sharing Snapshots Across Save Requests," U.S. Appl. No. 15/489,923, filed Apr. 18, 2017, pp. 1-123.
Gschwind, Michael K., et al., "Selective Register Allocation," U.S. Appl. No. 15/489,933, filed Apr. 18, 2017, pp. 1-123.
Gschwind, Michael K., et al., "Register Restoration Invalidation Based on a Context Switch," U.S. Appl. No. 15/489,940, filed Apr. 18, 2017, pp. 1-123.
Gschwind, Michael K., et al., "Selecting Register Restoration or Register Reloading," U.S. Appl. No. 15/490,000, filed Apr. 18, 2017, pp. 1-123.
Gschwind, Michael K., "Management of Store Queue Based on Restoration Operation," U.S. Appl. No. 15/489,989, filed Apr. 18, 2017, pp. 1-122.
Gschwind, Michael K. et al., "Register Context Restoration Based on Rename Register Recovery," U.S. Appl. No. 15/490,013, filed Apr. 18, 2017, pp. 1-123.
Gschwind, Michael K. et al., "Register Restoration using Transactional Memory Register Snapshots," U.S. Appl. No. 15/489,952, filed Apr. 18, 2017, pp. 1-123.
List of IBM Patents or Patent Applications Treated as Related, Apr. 25, 2017, 2 pages.
Pasricha et al., "Improving Branch Prediction Accuracy in Embedded Processors in the Presence of Context Switches," in Proceedings of the 21st International Conference on Computer Design (ICCD'03), IEEE, 2003, 6 pages.
Magnusson, "Understanding Stacks and Registers in the Sparc Architectures(s)", Mar. 13, 2015, pp. 1-9.
Ferreira, Ronaldo Rodrigues, "The Transactional HW/SW Stack for Fault Tolerant Embedded Computing," Jan. 2015, pp. 35-44, 53-55, 61-68, 76-80, 103-108 (+ cover sheets).
IBM, "Power ISA—V2.07B," Apr. 2015, pp. 47-63, 131-135, 139-141, 229-234, 645, 821-824, 1285-1289, 1351, 1355 (+ cover sheets).
IBM, "z/Architecture—Principles of Operation," IBM Publication No. SA22-7832-10, Eleventh Edition, Mar. 2015, pp. 7-221 thru 7-242, 7-327 thru 7-337, 9-31, 10-39 thru 10-59, 10-131 thru 10-159, 21-8, A-32 (+ cover sheets).
Gschwind, Michael K. et al., "Spill/Reload Multiple Instructions," U.S. Appl. No. 16/458,591, filed Jul. 1, 2019, pp. 1-125.
List of IBM Patents or Patent Applications Treated as Related, Oct. 29, 2019, 2 pages.

\* cited by examiner

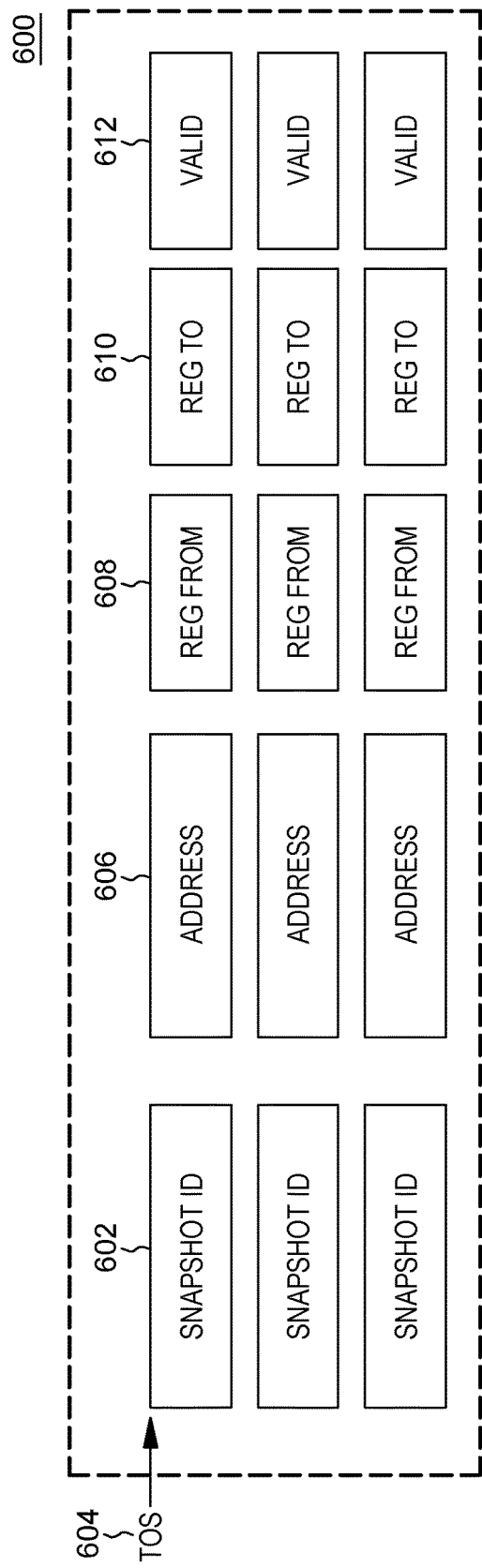
FIG. 6
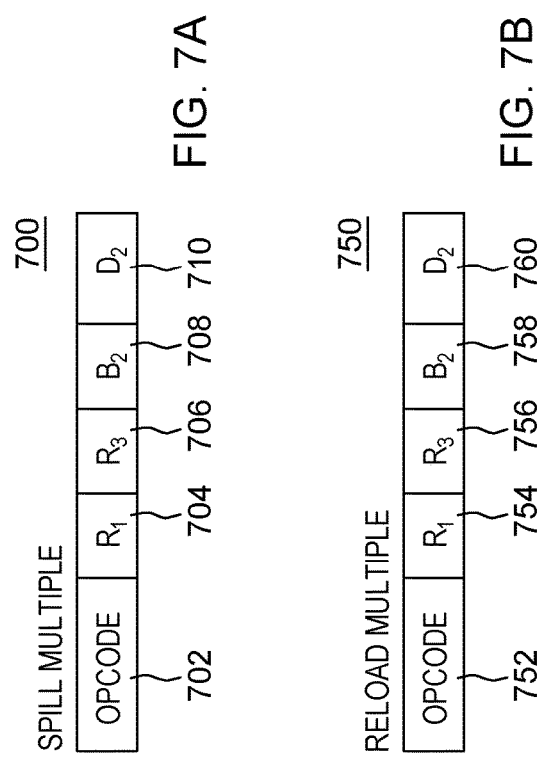
FIG. 7A
FIG. 7B

```
┌─────────────────────────────────────────────────────────────────────────┐
│  ┌───────────────────────────────────────────────────────────────┐      │
│  │ RESTORE ONE OR MORE ARCHITECTED REGISTERS OF THE              │      │
│  │ COMPUTING ENVIRONMENT FROM A SNAPSHOT PREVIOUSLY TAKEN        │      │
│  │ OF THE ONE OR MORE ARCHITECTED REGISTERS ~2400                │      │
│  │                                                               │      │
│  │    THE SNAPSHOT INDICATES ONE OR MORE PHYSICAL                │      │
│  │    REGISTERS PREVIOUSLY ASSIGNED TO THE ONE OR MORE           │      │
│  │    ARCHITECTED REGISTERS ~2402                                │      │
│  │                                                               │      │
│  │ THE RESTORING REPLACES THE ONE OR MORE PHYSICAL REGISTERS     │      │
│  │ CURRENTLY ASSIGNED TO THE ONE OR MORE ARCHITECTED             │      │
│  │ REGISTERS WITH THE ONE OR MORE PHYSICAL REGISTERS             │      │
│  │ PREVIOUSLY ASSIGNED TO THE ONE OR MORE ARCHITECTED            │      │
│  │ REGISTERS AS INDICATED BY THE SNAPSHOT ~2404                  │      │
│  │                                                               │      │
│  │ DETERMINE VALIDITY OF THE ONE OR MORE ARCHITECTED REGISTERS   │      │
│  │ RESTORED USING THE SNAPSHOT ~2406                             │      │
│  │                                                               │      │
│  │    CHECK MEMORY LOCATIONS ASSOCIATED WITH THE ONE OR          │      │
│  │    MORE ARCHITECTED REGISTERS TO DETERMINE WHETHER            │      │
│  │    CONTENTS OF THE ONE OR MORE ARCHITECTED REGISTERS          │      │
│  │    HAVE CHANGED SINCE THE SNAPSHOT WAS TAKEN, WHEREIN         │      │
│  │    THE ONE OR MORE ARCHITECTED REGISTERS ARE VALID            │      │
│  │    BASED ON THE CHECKING INDICATING THE CONTENTS OF THE       │      │
│  │    ONE OR MORE ARCHITECTED REGISTERS HAVE NOT CHANGED ~2408   │      │
│  └───────────────────────────────────────────────────────────────┘      │
│                                                                         │
│  ┌───────────────────────────────────────────────────────────┐~2410     │
│  │ RELOAD THE CONTENTS OF THE ONE OR MORE ARCHITECTED        │          │
│  │ REGISTERS FROM MEMORY BASED ON DETERMINING                │          │
│  │ INVALIDITY OF THE ONE OR MORE ARCHITECTED REGISTERS       │          │
│  │ RESTORED USING THE SNAPSHOT                               │          │
│  └───────────────────────────────────────────────────────────┘          │
│                    ┌─2412                                               │
│  ┌───────────────────────────────────────────────────────┐              │
│  │ OBTAIN A RESTORE INSTRUCTION, AND PERFORM THE         │              │
│  │ RESTORING BASED THEREON ~2414                         │              │
│  │                                                       │              │
│  │    THE RESTORE INSTRUCTION PROVIDING AN INDICATION    │              │
│  │    OF THE ONE OR MORE ARCHITECTED REGISTERS TO BE     │              │
│  │    RESTORED ~2416                                     │              │
│  └───────────────────────────────────────────────────────┘              │
│                                                                         │
│  ┌────────────────────────────────────────────────────────────────┐~2418│
│  │ THE RESTORE INSTRUCTION INCLUDES A BULK RESTORE INSTRUCTION    │     │
│  │ TO RESTORE A PLURALITY OF ARCHITECTED REGISTERS                │     │
│  └────────────────────────────────────────────────────────────────┘     │
└─────────────────────────────────────────────────────────────────────────┘

FIG. 24A
```

COMPARE AN INDICATION OF THE ONE OR MORE ARCHITECTED REGISTERS TO BE RESTORED WITH A PREVIOUS SAVE REQUEST TO DETERMINE WHETHER THE SNAPSHOT OF THE ONE OR MORE ARCHITECTED REGISTERS HAS BEEN TAKEN ~2420

PERFORM THE RESTORING BASED ON THE COMPARING INDICATING THE SNAPSHOT HAS BEEN TAKEN ~2422

THE SAVE REQUEST INCLUDES A BULK STORE INSTRUCTION TO SAVE A PLURALITY OF ARCHITECTED REGISTERS ~2424

RELOAD CONTENTS OF THE ONE OR MORE ARCHITECTED REGISTERS FROM MEMORY BASED ON THE COMPARING INDICATING THE SNAPSHOT HAS NOT BEEN TAKEN ~2426

THE DETERMINING VALIDITY OF THE ONE OR MORE ARCHITECTED REGISTERS INCLUDES

LOADING CONTENTS OF THE ONE OR MORE ARCHITECTED REGISTERS FROM MEMORY ~2428

COMPARING THE CONTENTS LOADED FROM MEMORY WITH CONTENTS OF THE ONE OR MORE ARCHITECTED REGISTERS RESTORED FROM THE SNAPSHOT ~2430

DETERMINING INVALIDITY OF THE ONE OR MORE ARCHITECTED REGISTERS BASED ON THE COMPARING INDICATING A MISMATCH ~2432

OBTAIN THE SNAPSHOT FROM A STACK OF SNAPSHOTS ~2434

THE SNAPSHOT IS A LAST SNAPSHOT TAKEN ~2436

FIG. 24B

TRACKING CHANGES TO MEMORY VIA CHECK AND RECOVERY

BACKGROUND

One or more aspects relate, in general, to processing within a computing environment, and in particular, to facilitating such processing.

Computer programs often call functions to provide particular operations, such as print, various mathematical operations, etc. The program calling the function is referred to as a caller, and the called function is referred to as the callee. Many of these functions are extremely short, either due to their net static length (i.e., the functions do not include many instructions), or their short dynamic length (e.g., due to an early-out condition).

Short functions, like any other functions, store callee-saved registers that they modify on a stack as part of the function's prolog and restore them as part of the epilog. The stack, also referred to as a call stack, is used by a computer program to store information about active functions of the computer program. Similarly, callers to such functions save caller-saved registers on the stack as part of the function's call sequence, and restore them upon the return, if the values live across the function call. Saving these registers is a significant expense of calling a function.

Further, for short functions, the expense associated with saving and then restoring these registers is even higher, since the restore can only occur after the save has completed, and that is not guaranteed to occur. Under these circumstances, additional penalties, such as load-hit-store and forwarding penalties may be incurred.

SUMMARY

Shortcomings of the prior art are overcome and additional advantages are provided through the provision of a computer program product for facilitating processing within a computing environment. The computer program product comprises a storage medium readable by a processing circuit and storing instructions for performing a method. The method includes, for instance, restoring one or more architected registers of the computing environment from a snapshot previously taken of the one or more architected registers. The snapshot indicates one or more physical registers previously assigned to the one or more architected registers. The restoring replaces the one or more physical registers currently assigned to the one or more architected registers with the one or more physical registers previously assigned to the one or more architected registers as indicated by the snapshot. A determination is made as to the validity of the one or more architected registers restored using the snapshot. The determining validity includes checking memory locations associated with the one or more architected registers to determine whether contents of the one or more architected registers have changed since the snapshot was taken. Based on the checking indicating the contents of the one or more architected registers have not changed, the one or more architected registers are valid. By tracking changes to memory, the validity of the architected registers may be determined, ensuring accurate processing and/or improving performance.

In a further aspect, based on determining invalidity of the one or more architected registers restored using the snapshot, the contents of the one or more architected registers are restored from memory.

In another aspect, a restore instruction is obtained, and the restoring is performed based thereon. The restore instruction provides an indication of the one or more architected registers to be restored. As an example, the restore instruction includes a bulk restore instruction to restore a plurality of architected registers.

In yet a further aspect, an indication of the one or more architected registers to be restored is compared with a previous save request to determine whether the snapshot of the one or more architected registers has been taken. Based on the comparing indicating the snapshot has been taken, the restoring is performed. As an example, the save request includes a bulk store instruction to save a plurality of architected registers. Further, in one example, based on the comparing indicating the snapshot has not been taken, the contents of the one or more architected registers are reloaded from memory.

As an example, the determining validity of the one or more architected registers includes loading contents of the one or more architected registers from memory; comparing the contents loaded from memory with contents of the one or more architected registers restored from the snapshot; and determining invalidity of the one or more architected registers based on the comparing indicating a mismatch.

In a further aspect, the snapshot is obtained from a stack of snapshots. In one example, the snapshot is a last snapshot taken.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 depicts one example of a snapshot stack used in accordance with one or more aspects of the present invention;

FIG. 7A depicts one example of a Spill Multiple instruction, in accordance with an aspect of the present invention;

FIG. 7B depicts one example of a Reload Multiple instruction, in accordance with an aspect of the present invention;

FIGS. 24A-24B depict one example of an aspect of facilitating processing within a computing environment, in accordance with an aspect of the present invention;

DETAILED DESCRIPTION

In accordance with one or more aspects, a capability is provided to optimize the saving and restoring of registers on function calls, thereby improving processing and reducing costs associated therewith. In one example, the capability uses register renaming for the saving/restoring.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
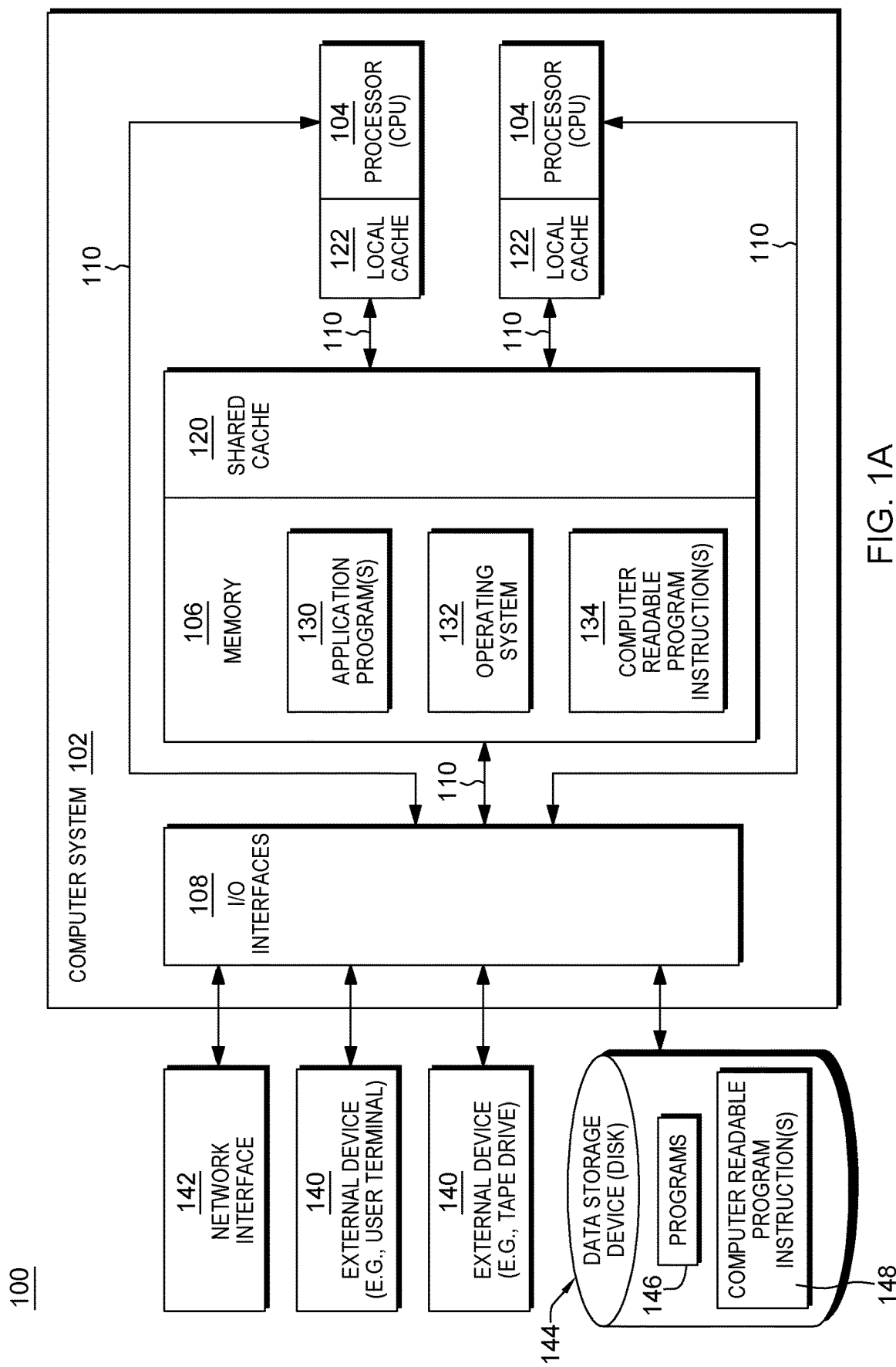
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
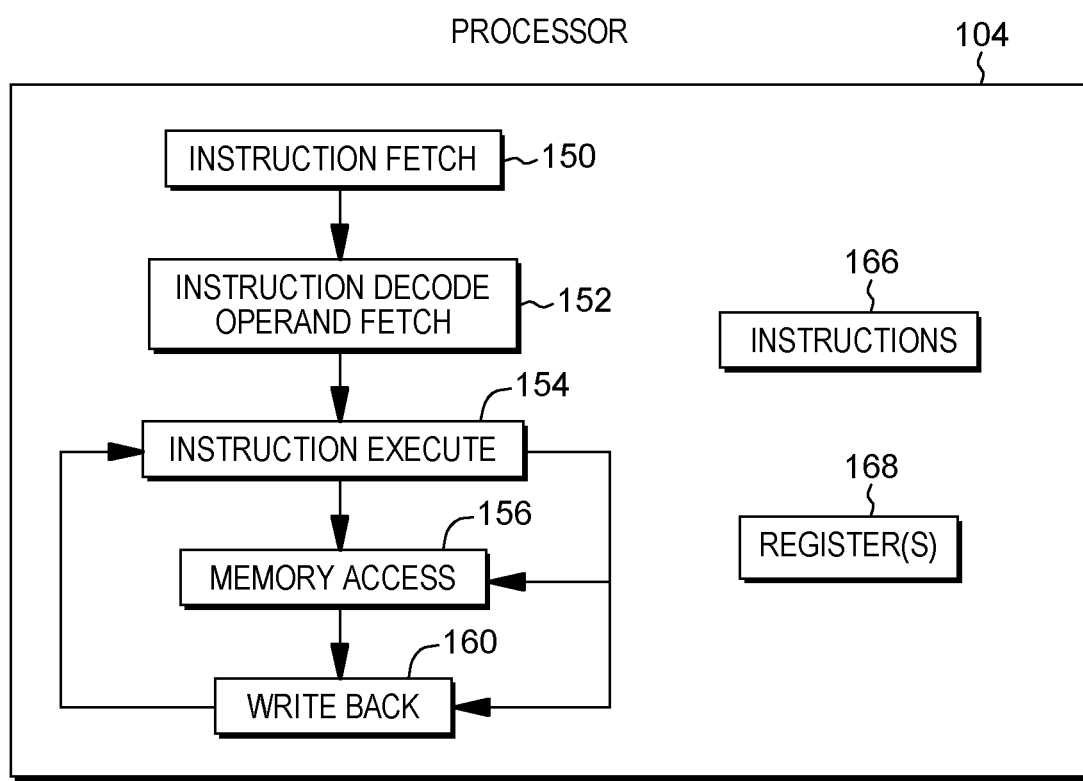
FIG. 1B depicts further details of a processor of FIG. 1A, in accordance with one or more aspects of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more register restoration operations and/or instructions 166, and/or other operations/instructions associated therewith.

Processor 104 also includes, in one embodiment, one or more registers 168 to be used by one or more of the functional components. Processor 104 may include additional, fewer and/or other components than the examples provided herein.

Further details regarding an execution pipeline of processor 104 are described with reference to FIG. 1C. Although various processing stages of the pipeline are depicted and described herein, it will be understood that additional, fewer and/or other stages may be used without departing from the spirit of aspects of the invention.

Figure 1C:
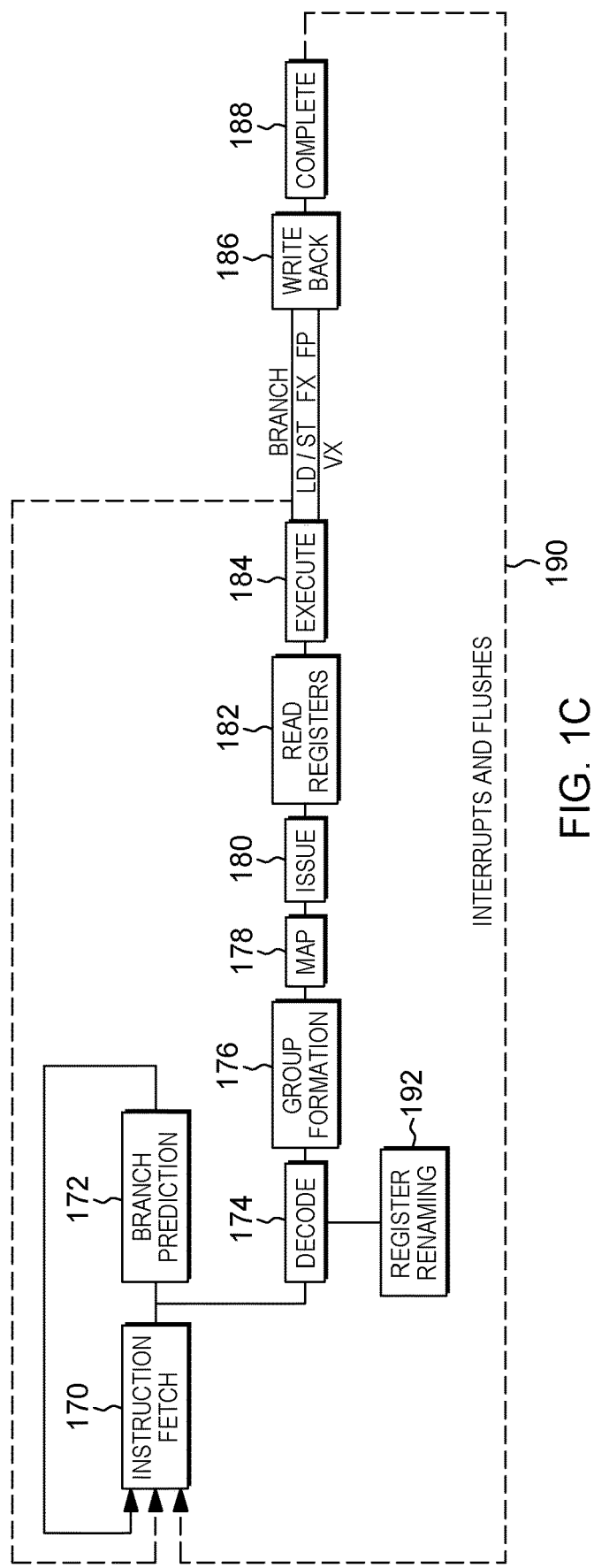
FIG. 1C depicts further details of one example of an instruction execution pipeline used in accordance with one or more aspects of the present invention.

Referring to FIG. 1C, in one embodiment, an instruction is fetched 170 from an instruction queue, and branch prediction 172 and/or decoding 174 of the instruction may be performed. The decoded instruction may be added to a group of instructions 176 to be processed together. The grouped instructions are provided to a mapper 178 that determines any dependencies, assigns resources and dispatches the group of instructions/operations to the appropriate issue queues. There are one or more issue queues for the different types of execution units, including, as examples, branch, load/store, floating point, fixed point, vector, etc. During an issue stage 180, an instruction/operation is issued to the appropriate execution unit. Any registers are read 182 to retrieve its sources, and the instruction/operation executes during an execute stage 184. As indicated, the execution may be for a branch, a load (LD) or a store (ST), a fixed point operation (FX), a floating point operation (FP), or a vector operation (VX), as examples. Any results are written to the appropriate register(s) during a write back stage 186. Subsequently, the instruction completes 188. If there is an interruption or flush 190, processing may return to instruction fetch 170.

Further, in accordance with one or more aspects of the present invention, coupled to the decode unit is a register renaming unit 192, used in one or more aspects in the saving/restoring of registers.

Figure 1D:
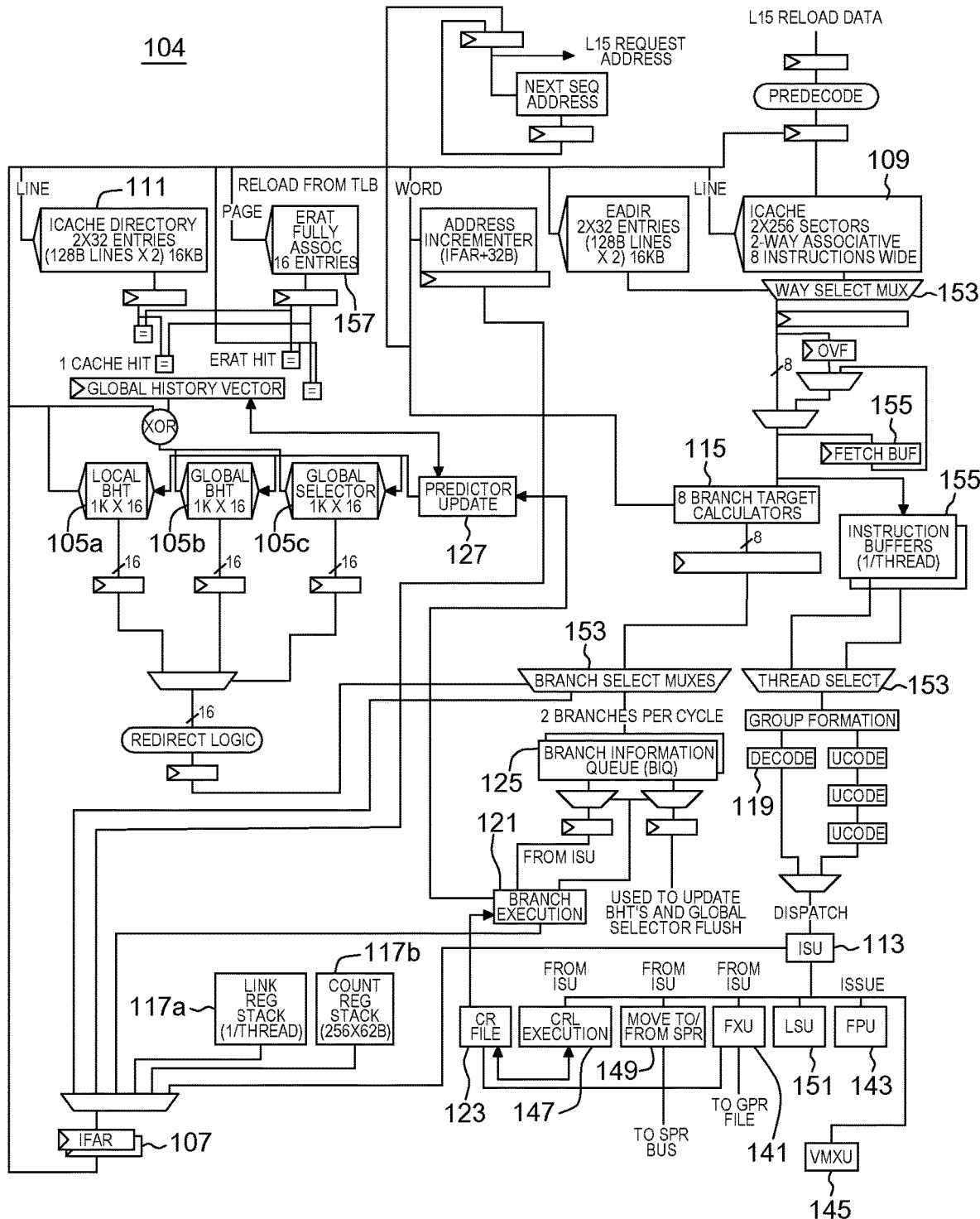
FIG. 1D depicts further details of one example of a processor of FIG. 1A, in accordance with an aspect of the present invention.

Additional details regarding a processor are described with reference to FIG. 1D. In one example, a processor, such as processor 104, is a pipelined processor that may include prediction hardware, registers, caches, decoders, an instruction sequencing unit, and instruction execution units, as examples. The prediction hardware includes, for instance, a local branch history table (BHT) 105a, a global branch history table (BHT) 105b, and a global selector 105c. The prediction hardware is accessed through an instruction fetch address register (IFAR) 107, which has the address for the next instruction fetch.

The same address is also provided to an instruction cache 109, which may fetch a plurality of instructions referred to as a "fetch group". Associated with instruction cache 109 is a directory 111.

The cache and prediction hardware are accessed at approximately the same time with the same address. If the prediction hardware has prediction information available for an instruction in the fetch group, that prediction is forwarded to an instruction sequencing unit (ISU) 113, which, in turn, issues instructions to execution units for execution. The prediction may be used to update IFAR 107 in conjunction with branch target calculation 115 and branch target prediction hardware (such as a link register prediction stack 117a and a count register stack 117b. If no prediction information is available, but one or more instruction decoders 119 find a branch instruction in the fetch group, a prediction is created for that fetch group. Predicted branches are stored in the prediction hardware, such as in a branch information queue (BIQ) 125, and forwarded to ISU 113.

A branch execution unit (BRU) 121 operates in response to instructions issued to it by ISU 113. BRU 121 has read access to a condition register (CR) file 123. Branch execution unit 121 further has access to information stored by the branch scan logic in branch information queue 125 to determine the success of a branch prediction, and is operatively coupled to instruction fetch address register(s) (IFAR) 107 corresponding to the one or more threads supported by the microprocessor. In accordance with at least one embodiment, BIQ entries are associated with, and identified by an identifier, e.g., by a branch tag, BTAG. When a branch associated with a BIQ entry is completed, it is so marked. BIQ entries are maintained in a queue, and the oldest queue entry (entries) is (are) de-allocated sequentially when they are marked as containing information associated with a completed branch. BRU 121 is further operatively coupled to cause a predictor update when BRU 121 discovers a branch misprediction.

When the instruction is executed, BRU 121 detects if the prediction is wrong. If so, the prediction is to be updated. For this purpose, the processor also includes predictor update logic 127. Predictor update logic 127 is responsive to an update indication from branch execution unit 121 and configured to update array entries in one or more of the local BHT 105a, global BHT 105b, and global selector 105c. The predictor hardware 105a, 105b, and 105c may have write ports distinct from the read ports used by the instruction fetch and prediction operation, or a single read/write port may be shared. Predictor update logic 127 may further be operatively coupled to link stack 117a and count register stack 117b.

Referring now to condition register file (CRF) 123, CRF 123 is read-accessible by BRU 121 and can be written to by the execution units, including but not limited to, a fixed point unit (FXU) 141, a floating point unit (FPU) 143, and a vector multimedia extension unit (VMXU) 145. A condition register logic execution unit (CRL execution) 147 (also referred to as the CRU), and special purpose register (SPR) handling logic 149 have read and write access to condition register file (CRF) 123. CRU 147 performs logical operations on the condition registers stored in CRF file 123. FXU 141 is able to perform write updates to CRF 123.

Processor 104 further includes, a load/store unit 151, and various multiplexors 153 and buffers 155, as well as address translation tables 157, and other circuitry.

Executing within processor 104 are programs (also referred to as applications) that use hardware registers to store information. For instance, programs that call routines, such as functions, subroutines or other types of routines, are responsible for saving registers used by the caller and for restoring those registers upon return from the callee. Likewise, the callee is responsible for saving/restoring registers that it uses, as shown in the below code.

First, below is example code of a caller that saves a set of registers and later restores them:

Example1

. . .

Figure 2A:
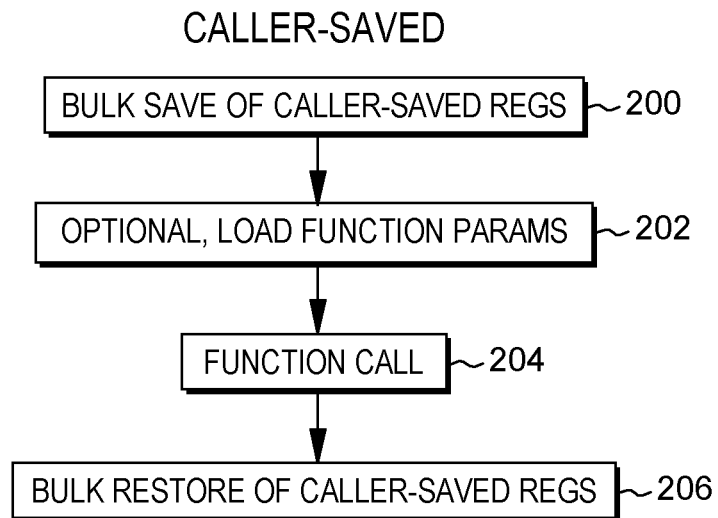
FIG. 2A depicts one example of storing caller-saved registers, in accordance with an aspect of the present invention.

\# begin call to function printit
STMG 1, 5, 256(15) # Save caller's caller-saved registers
LGFI 1, 1
LGFI 2, 2
LGFI 3, 3
LGFI 4, 4
LGFI 5, 5
BRASL 14, printit # Branch to the function printit
LMG 1, 5, 256(15) # Restore caller-saved registers In the above caller's code and referring to FIG. 2A, caller-saved registers are stored, STEP 200. This includes, for instance, a bulk save of the caller-saved registers using, e.g., a Store Multiple instruction (STMG). Optionally, function parameters are loaded (e.g., using the load instruction LGFI), STEP 202, and a function call is performed using, for instance, a branch instruction (BRASL), STEP 204 (i.e., the callee is called). Upon return from the function, the caller-saved registers are restored, STEP 206. In one example, this is a bulk restore using a Load Multiple instruction (LMG). (As used herein, a bulk save or bulk store includes a store of one or more registers, and a bulk restore or bulk reload includes a load of one or more registers. In one example, the bulk save (store) and the bulk restore (reload) are related to saving/restoring registers related to function calls. As a particular example, the bulk save (store) and the bulk restore (reload) are related to saving values on a program stack and restoring the values from the program stack to the same registers from which they have been stored.)

In one example of a Store Multiple instruction, the contents of bit positions of the set of general registers starting with general register $R_1$ specified by the instruction and ending with general register $R_3$ specified by the instruction are placed in the storage area beginning at the location designated by the second operand address (e.g., provided by the contents of the register designated by $B_2$ plus the contents of $D_2$; both $B_2$ and $D_2$ are specified by the instruction) and continuing through as many locations as needed. In one example, the contents of bit positions 32-63 of the general registers are stored in successive four-byte fields beginning at the second operand address. The general registers are stored in the ascending order of their register numbers, starting with general register $R_1$ and continuing up to and including general register $R_3$, with general register 0 following general register 15.

In one example of a Load Multiple instruction, bit positions of the set of general registers starting with general register $R_1$, specified by the instruction, and ending with general register $R_3$, specified by the instruction, are loaded from storage beginning at the location designated by the second operand address (e.g., provided by the contents of the register designated by $B_2$ plus the contents of $D_2$; both $B_2$ and $D_2$ are specified by the instruction) and continuing through as many locations as needed. In one example, bit positions 32-63 of the general registers are loaded from successive four-byte fields beginning at the second operand address and bits 0-31 remain unchanged.

Figure 2B:
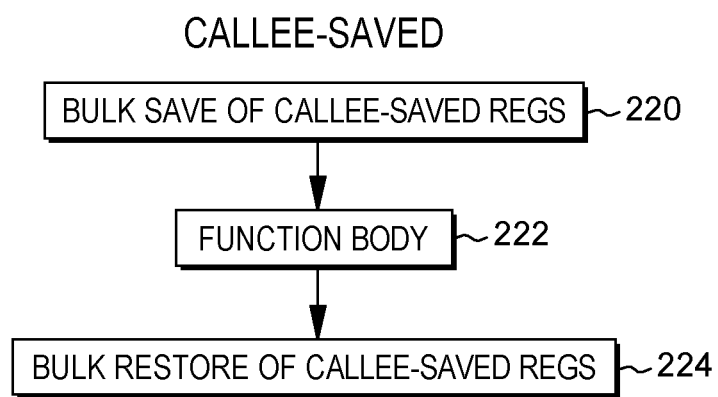
FIG. 2B depicts one example of storing callee-saved registers, in accordance with an aspect of the present invention.

Next, below is example code of a callee that saves a set of registers and later restores them:

Example1
Prolog
STMG 11, 15, 88(15) # Save callee's registers
. . .
function execution
. . .
Epilog
LG 4, 272(15) # Load return address
LMG 11, 15, 248(15) # Restore registers
BR 4 # Branch back to caller
Epilog end In the above callee's code and referring to FIG. 2B, a set of callee-saved registers are stored, STEP 220. This occurs, for instance, in the prolog, and includes a bulk save of the callee-saved registers via, e.g., a Store Multiple instruction (e.g., STMG). Then, processing is performed as part of the function body, including loading the return address back to the caller, STEP 222. Subsequently, the callee-saved registers are restored, STEP 224. In one example, this occurs in the epilog, and includes a bulk restore of the callee-saved registers via, for instance, a Load Multiple instruction (LMG).

Figure 3:
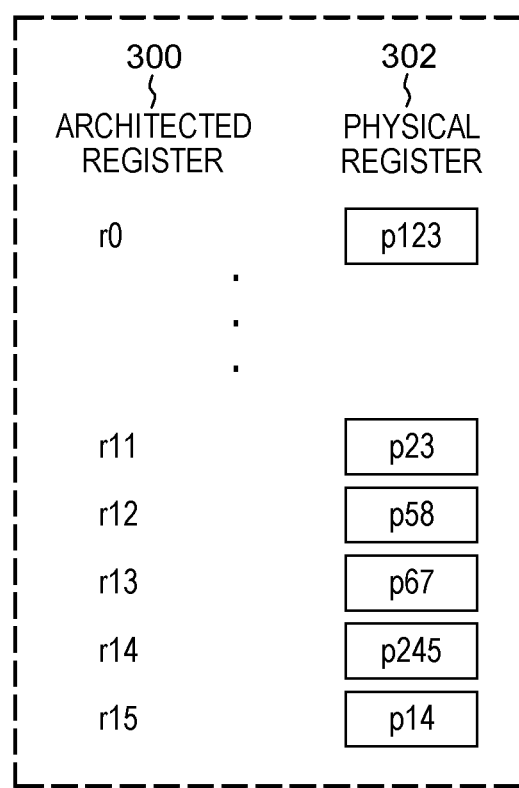
FIG. 3 depicts one example of a mapping of architected registers to physical registers, in accordance with an aspect of the present invention.

The registers that are saved/restored may be architected or logical registers that are mapped to physical registers, as shown in FIG. 3. Referring to FIG. 3, based on, for instance, an instruction referring to an architected register 300, that architected register is associated with a physical register 302. In particular, register renaming logic is used to look up a table (or other data structure) to determine what physical register corresponds to an architected register. For instance, for read accesses, an architected register is replaced with a physical register that is found in the table; and for write accesses, a new physical register is allocated out of a free list.

The renaming logic may involve, in accordance with one or more aspects, one or more units of the processor. For instance, a processor decode unit receives instructions; renames target instructions by, e.g., updating a lookup table associating a set of architected registers to physical registers obtained from a free list; updates a register rename table for source instructions; takes a rollback snapshot (e.g., copy of register rename table) when an instruction or group of instructions may trigger a rollback (e.g., due to the instruction being able to raise an exception or for a branch instruction that may be mispredicted); and includes rollback logic adapted to recover a snapshot corresponding to an event requiring a rollback, e.g., for an exception handler or a new branch target, or cause re-execution.

Further, the renaming logic may involve an execution unit that includes a physical register file accessed by physical register numbers received by the decode unit; logic to execute instructions and write results to a specified physical register; and logic to indicate successful completion or a rollback in the event of, e.g., a branch misprediction or exception.

Additionally, an instruction completion unit is used that receives reports indicating that instructions have completed; marks snapshots as no longer necessary; adds physical registers to the free list; and updates an in-order program counter or other in-order state.

While the saving and restoring of caller-saved and callee-saved registers has been described with respect to examples using general purpose registers, other register types, such as floating point registers, vector registers, vector-scalar registers, condition registers, control registers and/or special purpose registers, as well as other types of registers may be saved and restored by either a caller function, a callee function, or both.

Other, additional and/or fewer units and/or logic may be used.

The saving and restoring of the registers in either or both of the caller and the callee are costly since they involve using memory. Therefore, in accordance with an aspect of the present invention, a capability is provided to reduce this cost. This capability includes, for instance, using a register snapshot to save and restore the registers, thereby avoiding, in at least one aspect, the use of memory in restoring (and optionally, saving) the registers.

Figure 4A:
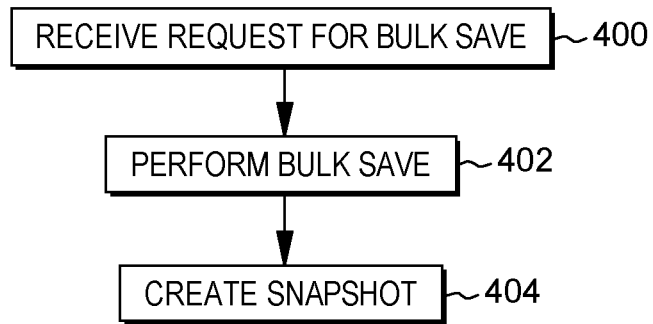
FIG. 4A depicts one example of processing associated with a bulk save request, in accordance with an aspect of the present invention.

In one example, a snapshot is taken of at least a portion of the register state (e.g., at least a portion of a register rename map, other register restoration information, or the full register state) when a store of bulk registers is recognized. Referring to FIG. 4A, a request for a bulk store is obtained (e.g., received, determined, provided, retrieved, have, etc.), STEP 400. The bulk store may be, for example, a Store Multiple Instruction that stores multiple registers. The bulk save is performed, and the contents of the multiple registers are written to memory, STEP 402. Based thereon, a snapshot is created, STEP 404. (In another embodiment, the storing to memory is not performed.)

Figure 5A:
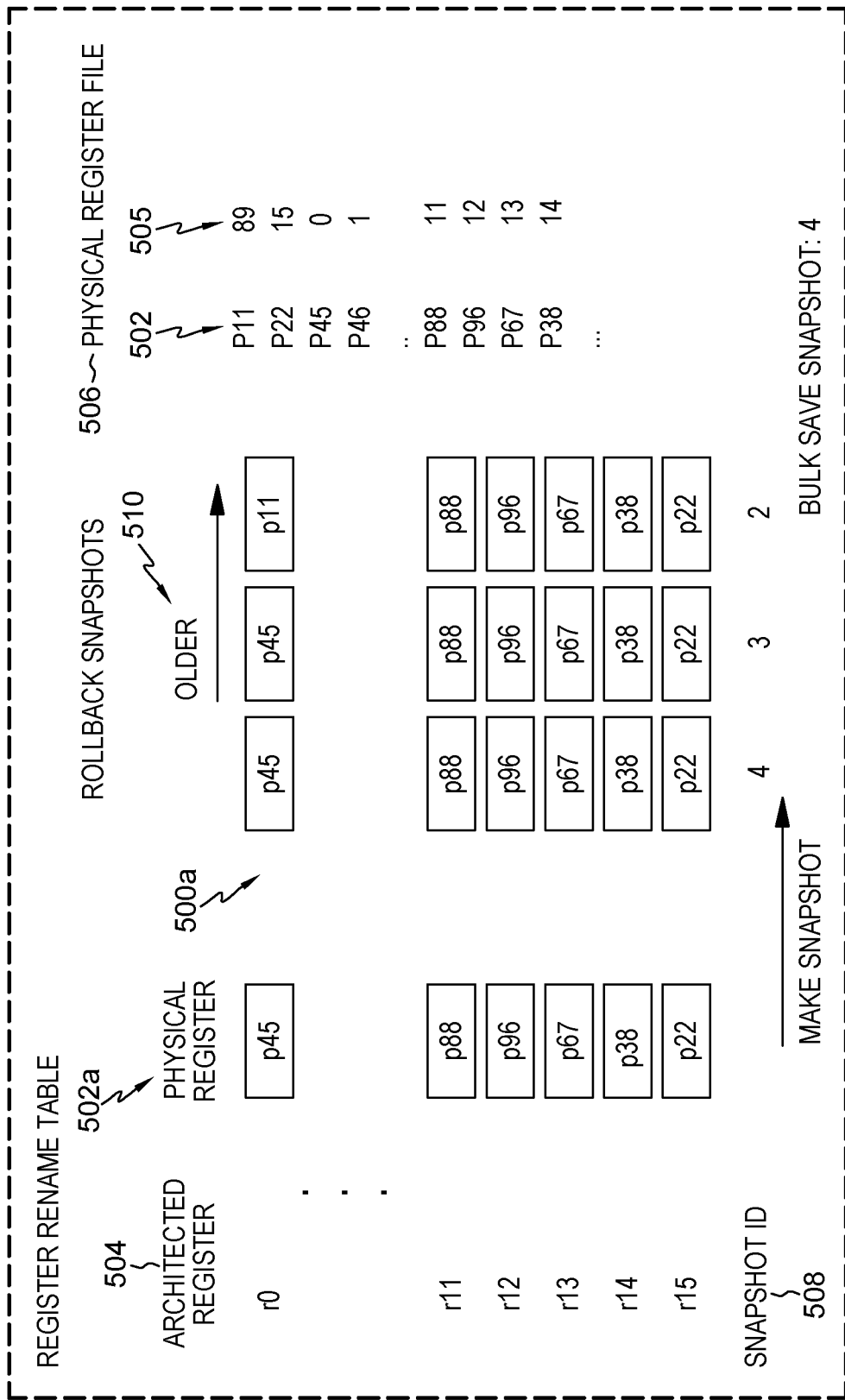
FIG. 5A depicts one example of a register rename table, a plurality of snapshots, and a physical rename file used in accordance with one or more aspects of the present invention.

One example of a snapshot is shown in FIG. 5A. As shown, a snapshot 500a is taken of the mapping of physical registers 502a to architected registers 504. In this example, physical register 45 is assigned to architected register 0; physical register 88 is assigned to architected register 11; physical register 96 is assigned to architected register 12; physical register 67 is assigned to architected register 13; physical register 38 is assigned to architected register 14; and physical register 22 is assigned to architected register 15. A mapping of these physical registers to the architected registers is captured by snapshot 500a.

A physical register file 506 indicates for each physical register 502 the value 505 stored within that register.

In one embodiment, a snapshot identifier 508 (e.g., ID 4) is assigned to snapshot 500a. Further, in one example, there may also be a plurality of older snapshots 510 (e.g., snapshots 2 and 3).

Figure 5B:
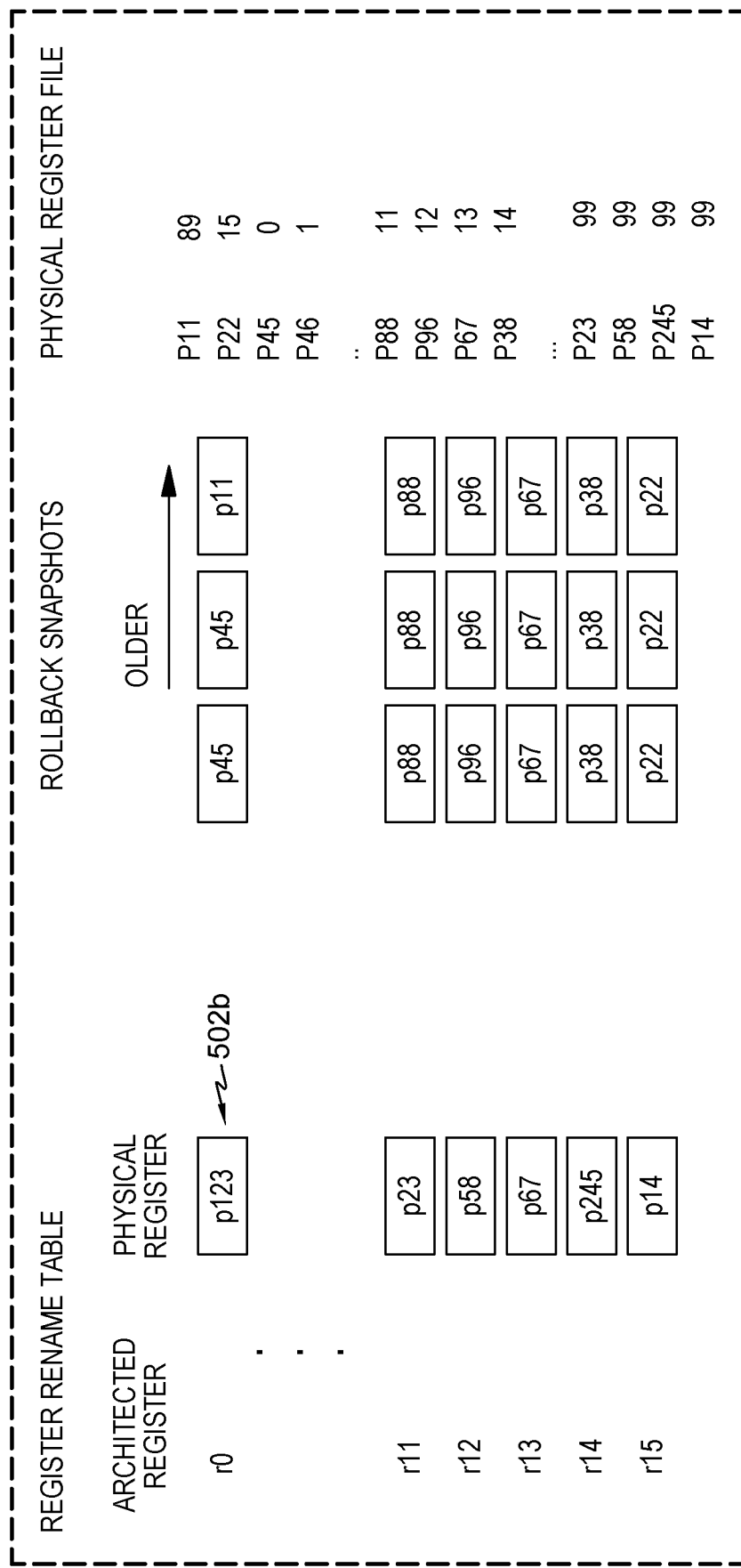
FIG. 5B is a further example of a register rename table, a plurality of snapshots, and a physical rename file used in accordance with one or more aspects of the present invention.

As described above, based on recognizing that a bulk save is to be performed, a snapshot of the registers participating in the bulk save is taken (e.g., snapshot 500a). Then, processing continues, and as shown in FIG. 5B, new physical registers 502b are allocated, and the function is executed.

Thereafter, when the function is complete, the snapshot may be recovered. One example of bulk restore processing is described with reference to FIG. 4B. Initially, in one example, a bulk restore request is obtained (e.g., received, determined, provided, have, retrieved, etc.), STEP 450. The bulk restore request may be, for example, a Load Multiple instruction that loads multiple registers. A determination is made as to whether a corresponding snapshot is available, INQUIRY 452. If a corresponding snapshot is unavailable, then the values are reloaded from memory, STEP 454. However, if a corresponding snapshot is available, then a further determination is made as to whether the bulk restore matches the bulk save, INQUIRY 456. That is, are the registers to be restored the same registers that were saved. If they are, then the snapshot is restored, STEP 458. Additionally, in one example, the restored snapshot is verified, STEP 460. This is pictorially depicted in FIGS. 5C-5D.

Figure 5C:
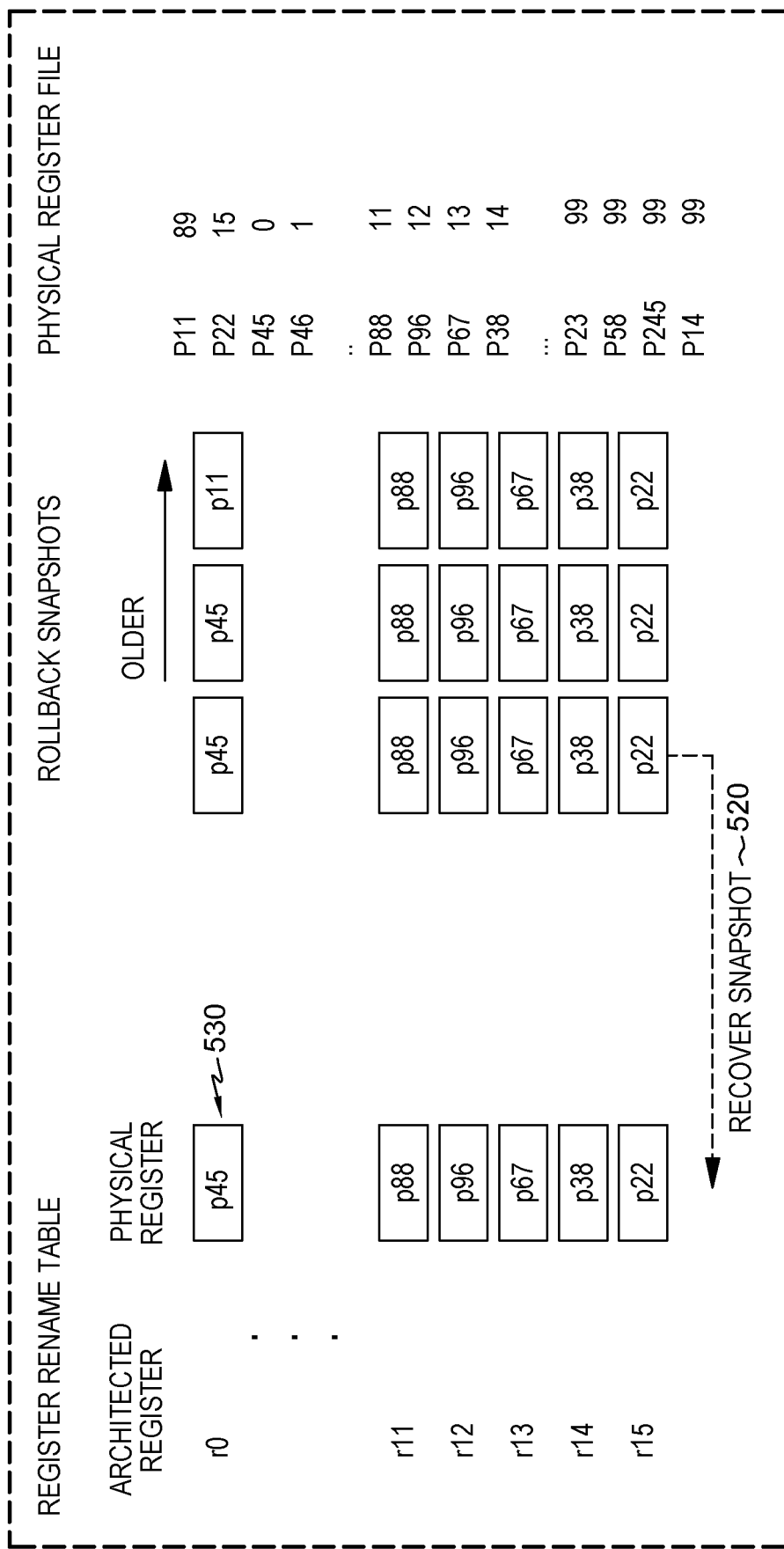
FIG. 5C pictorially depicts one example of rolling back a snapshot, in accordance with an aspect of the present invention.

As shown in FIG. 5C, the mapping of the physical registers is restored by recovering 520 the snapshot, resulting in a restored snapshot. A restored snapshot 530 maps to the same architected registers that were previously saved. Thus, referring to FIGS. 5B-5C, p123 assigned to r0 is replaced with p45; p23 assigned to r11 is replaced with p88; p58 assigned to r12 is replaced with p96; p67 assigned to r13 is replaced with p67 (or no replace is performed); p245 assigned to r14 is replaced with p38; and p14 assigned to r15 is replaced with p22.

Figure 5D:
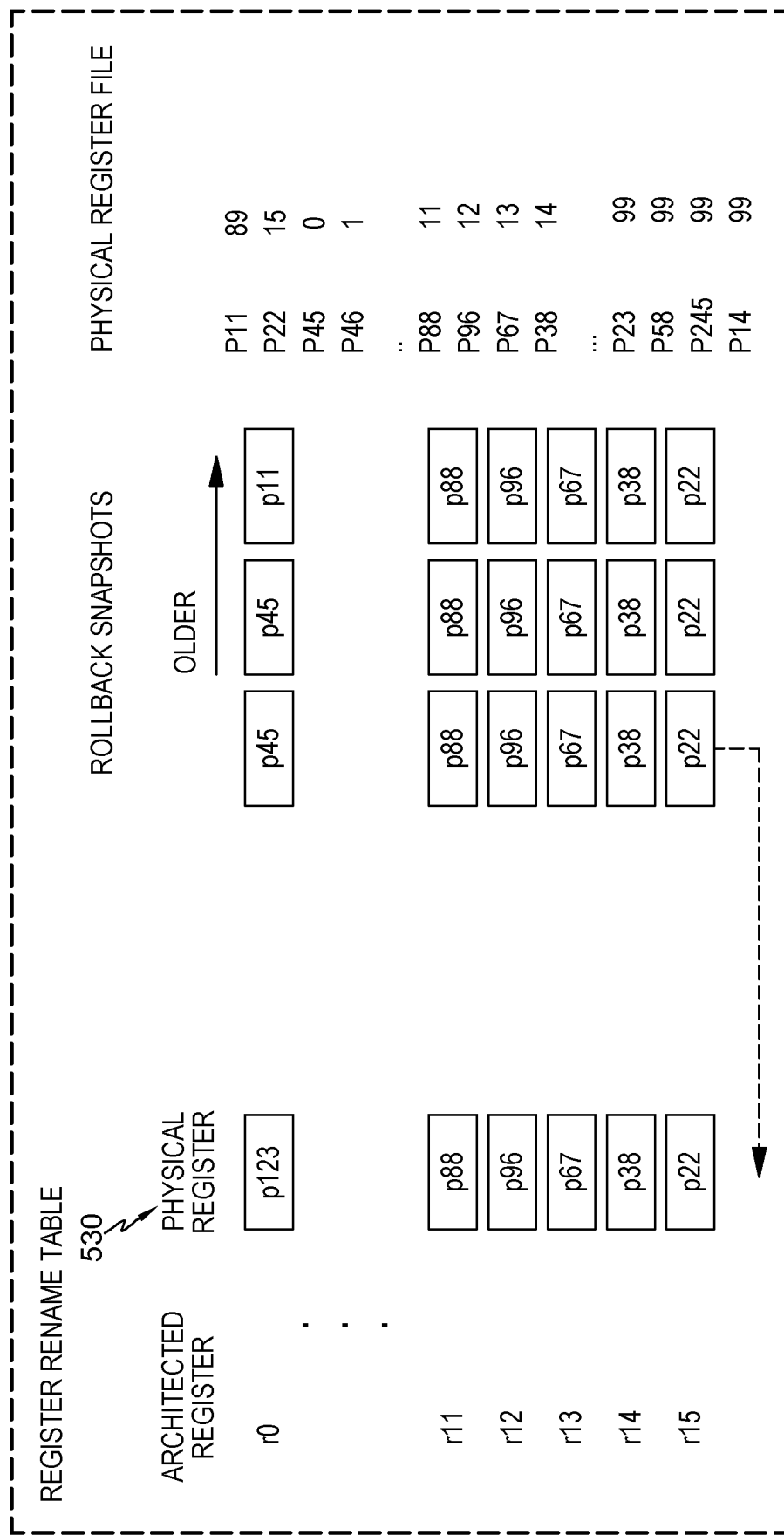
FIG. 5D pictorially depicts another example of rolling back a snapshot, in accordance with an aspect of the present invention.

In one example, as depicted in FIG. 5D, only a subset of the registers is recovered. For instance, architected registers 11-15 are recovered, while architected register 0 is not.

As indicated above, in one embodiment of recovering a snapshot, a determination is made as to whether there is a corresponding snapshot. To determine which snapshot corresponds to a given save/restore pair, a number of techniques may be used. One technique includes remembering the last snapshot that was taken. For instance, based on a store multiple, a snapshot is taken, the identifier of that snapshot is remembered, and the snapshot is marked as available. Then, if another store multiple is performed, another snapshot is taken, the snapshot id is incremented and that identifier is remembered, etc. Further, based on a bulk restore, the snapshot id of the last bulk save is recovered and that snapshot is marked as unavailable.

The tracking of a single snapshot offers a simplified design and enables rapid snapshot-based register restoration for leaf functions (i.e., those functions not calling another function). Leaf functions are a sizeable fraction of all functions (typically about 50%), which are also among the shortest functions, thus, save and restore processing represent a significant fraction of execution time for such functions, which is reduced using the snapshot.

Another technique is to maintain a snapshot stack that can remember a number of snapshots. As shown in FIG. 6, a snapshot stack 600 includes one or more snapshot identifiers (snapshot ID) 602, one for each snapshot taken with the latest snapshot on top, as indicated by a top-of-stack (TOS) pointer 604. In addition to the snapshot ID, in one or more embodiments, the snapshot stack may optionally include additional information. For instance, the values of the registers are saved to memory (STEP 402) for a number of situations, including, for instance, in case the snapshot is lost (STEP 454), or if there is a need to confirm if the snapshot contains the latest values (STEP 460). Thus, the additional information may include an address or address range 606 of where the value or values of the snapshot registers are stored in memory.

Additionally, in another embodiment, the snapshot may not be valid for all of the registers contained within the snapshot, but instead only for a subset of the registers. Thus, in one example, the snapshot stack may include for each snapshot, a register from indication 608 and a register to indication 610 that provide the registers that are valid for the snapshot.

Further, a valid indicator 612 may optionally be provided to indicate whether the snapshot is valid. Other, additional and/or less information may be provided in other embodiments.

To manage the snapshot stack, the top-of-stack pointer is adjusted. For instance, based on creating a snapshot, a new entry is added to the stack, and the top-of-stack pointer is incremented. Further, when restoring a snapshot, the entry corresponding to the top-of-stack pointer is removed from the stack, and the top-of-stack pointer is decremented. If, for instance, there is a branch misprediction or an exception, then multiple entries may be removed and the top-of-stack pointer is appropriately adjusted.

Other techniques for determining corresponding Store Multiple/Load Multiple pairs may be used.

In one aspect, the save and restore of the registers are based on performing Store Multiple or Load Multiple instructions (or similar instructions). However, these instructions may be used for many purposes, and therefore, checking and/or heuristics may be used to ensure correct execution is preserved. That is, a determination is made of the store/load pairs, which then may be optimized using the saving and restoring aspects of the present invention. Unmatching store/load pairs are not optimized using the saving/restoring aspects of the present invention. Thus, to facilitate processing and to reduce the checking or heuristics associated with, e.g., finding the matching pairs to ensure correct execution, new instructions are defined that behave differently than the load multiple/store multiple instructions. For instance, the new instructions, referred to herein as Spill Multiple (Spillm) and Reload multiple (Reloadm) are defined such that they do not consider modifications to memory that occur between the spill and reload. That is, in accordance with one architectural definition of those instructions, the user of Spillm/Reloadm is not to modify the in-memory values corresponding to those registers between the spill and the reload. Thus, if an in-memory image is modified, the new instructions are not obligated to consider that value.

One example of a Spill Multiple instruction is described with reference to FIG. 7A. In one example, a Spill Multiple (Spillm) instruction 700 includes at least one operation code field 702 that includes an operation code (opcode) indicating a spill multiple operation; a first register ($R_1$) field 704; a second register ($R_3$) field 706; a base field ($B_2$) 708; and a displacement field ($D_2$) 710 (e.g., a 12-bit unsigned binary integer). In another embodiment, the displacement field may include multiple fields (e.g., $DL_2$ and $DH_2$) and may be, e.g., a 20-bit unsigned binary integer (other sizes are also possible). Each of the fields is separate from one another, in one example. However, in other examples, one or more of the fields may be combined. Further, in one example, the subscript number associated with a field designates the operand to which that field corresponds. For instance, a field having a subscript number 1 corresponds to a first operand; a field having a subscript number 2 corresponds to a second operand; and so on.

In operation, the contents of bit positions of the set of general registers starting with general register $R_1$ and ending with general register $R_3$ are preserved for later restoration. The storage area beginning at the location designated by the second operand address (e.g., provided by the contents of the register designated by $B_2$ plus the contents of $D_2$ or $DL_2$ plus $DH_2$) and continuing through as many locations as needed may be used as a buffer to store some or all of the registers. The corresponding buffer storage address is to be specified for a corresponding recovery address. In one example, the contents of bit positions 32-63 of the general registers are stored in successive four-byte fields beginning at the second operand address. The general registers are preserved for later restoration. In another format of Spillm, the contents of bit positions 0-63 of the general registers are preserved for later restoration. A buffer corresponding to 4 bytes (or in the other embodiment, 8 bytes) per register may be used and are to be accessible. The content of the buffer is undefined and may change from system generation to system generation. In another embodiment, the buffer is defined and contains a value corresponding to the value of the storage area in accordance with the definition of a corresponding Store Multiple instruction.

Further, in operation, in accordance with one aspect, a snapshot of the one or more registers indicated by the instruction is taken to have a mapping of the physical registers to the specified architected registers.

One example of a Reload Multiple instruction is described with reference to FIG. 7B. In one example, a Reload Multiple (Reloadm) instruction 750 includes at least one operation code field 752 that includes an operation code (opcode) indicating a reload multiple operation; a first register ($R_1$) field 754; a second register ($R_3$) field 756; a base field ($B_2$) 758; and a displacement field ($D_2$) 760 (e.g., a 12-bit unsigned binary integer). In another embodiment, the displacement field may include multiple fields (e.g., $DL_2$ and $DH_2$) and may be, e.g., a 20-bit unsigned binary integer (other sizes are possible). Each of the fields is separate from one another, in one example. However, in other examples, one or more of the fields may be combined. Further, in one example, the subscript number associated with the field designates the operand to which that field corresponds. For instance, a field having a subscript number 1 corresponds to a first operand; a field having a subscript number 2 corresponds to a second operand; and so on.

In operation, in accordance with an aspect of the present invention, bit positions of the set of general registers starting with general register $R_1$ and ending with general register $R_3$ are restored from the most recent snapshot, removing the most recent snapshot and making its preceding snapshot available as most recent snapshot for subsequent Reload Multiple instructions. In one example, bit positions 32-63 of the general registers are reloaded from a previously stored value, and bits 0-31 remain unchanged. In another embodiment, bit positions 0-63 of the general registers are restored from a previously stored value. The general registers are loaded in the ascending order of their register numbers, starting with general register $R_1$ and continuing up to and including general register $R_3$, with general register 0 following general register 15.

If a snapshot is unavailable, then the registers are loaded from storage beginning at the location designated by the second operand address (e.g., provided by the contents of the register designated by $B_2$ plus the contents of $D_2$ (or $DL_2$ plus $DH_2$).

The result of this operation can be undefined for a variety of reasons, including: a preceding Spill Multiple instruction did not specify the same register range to be prepared for restore. (In another embodiment, the result is undefined when a previous Spill Multiple instruction did not specify a superset of the register range to be prepared for restore); the Reload Multiple Instruction does not specify the same buffer (In one embodiment, this is to be the same address. In another embodiment, this is to be an adjusted address when a subset of registers are restored); or the buffer has been modified by intervening instructions.

Figure 8A:
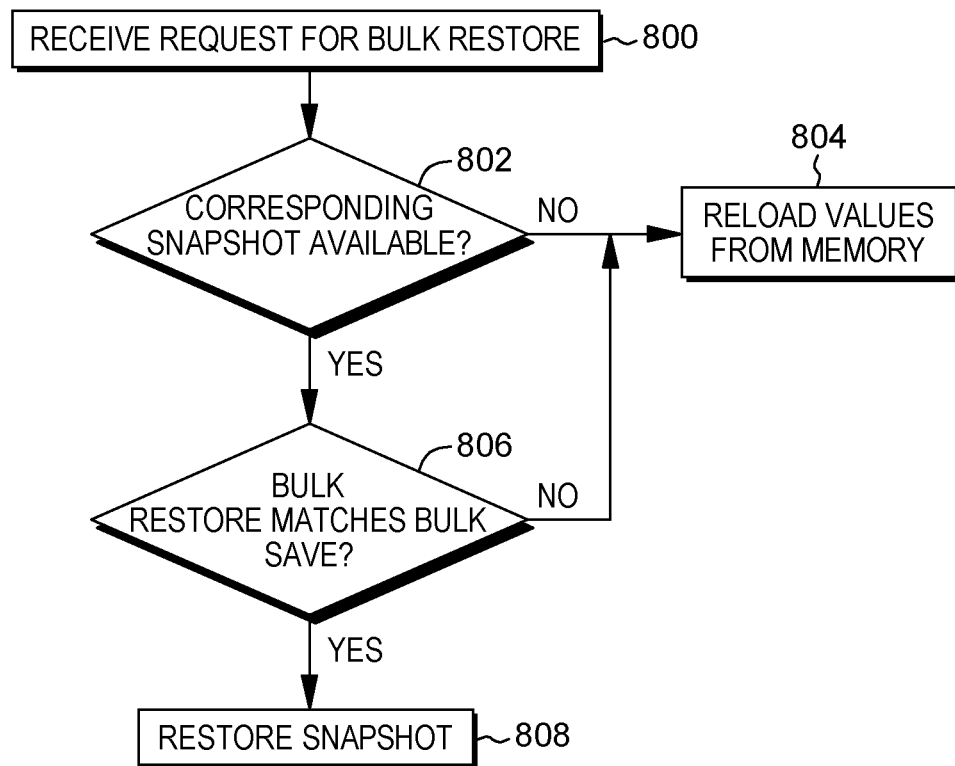
FIG. 8A depicts another example of processing associated with a bulk restore request, in accordance with an aspect of the present invention.

With the use of Reloadm, in one embodiment, the snapshot is not verified (as in FIG. 4B), since in accordance with the architectural definition of Reloadm, the user is not to modify the stored data corresponding to those registers. Thus, as shown in FIG. 8A, there is no verify snapshot after the restore snapshot.

For instance, as described with reference to FIG. 8A, a bulk restore request (e.g., a Reloadm instruction) is obtained (e.g., received, determined, provided, have, retrieved, etc.), STEP 800. A determination is made as to whether a corresponding snapshot is available, INQUIRY 802. This determination may be made using the techniques described above, such as remembering the last snapshot id, using a snapshot stack, and/or other techniques.

If a corresponding snapshot is unavailable, then the values are reloaded from memory, using for instance, a Load Multiple or similar instruction, STEP 804. However, if a corresponding snapshot is available, then a further determination is made as to whether the bulk restore matches the bulk save (e.g., performed by Spillm), INQUIRY 806. That is, are the registers to be restored the same registers that were saved. If they are, then the snapshot is restored, STEP 808. For instance, the mapping of the physical registers to the architected registers is changed to reflect the last snapshot. Since Reloadm was used in the restoration, the snapshot is not verified, as is when a Load Multiple is used.

Figure 8B:
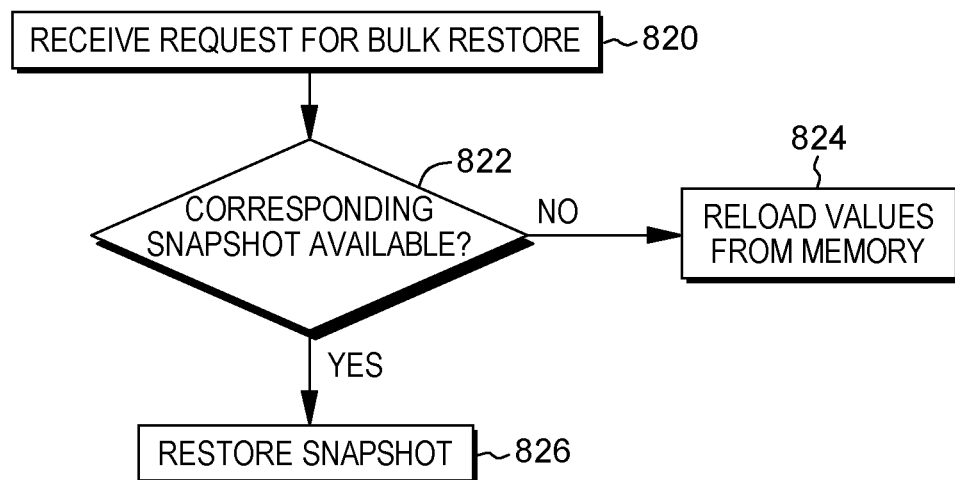
FIG. 8B depicts yet another example of processing associated with a bulk restore request, in accordance with an aspect of the present invention.

Further, in one example, since a Reloadm instruction is architecturally guaranteed to match a previous Spillm instruction, the match verification may also be suppressed, as shown in FIG. 8B. More specifically, it is the programmer's responsibility to match corresponding pairs of Spillm and Reloadm, at the penalty of an undefined result when such a match is not guaranteed by the programmer. In this embodiment, a bulk restore request (e.g., Reloadm) is obtained (e.g., received, determined, provided, have, retrieved, etc.), STEP 820, and a determination is made as to whether a corresponding snapshot is available, INQUIRY 822. If a corresponding snapshot is unavailable, then the values are reloaded from memory (e.g., using Load Multiple), STEP 824. Otherwise, the snapshot is restored, STEP 826 (an inquiry corresponding to INQUIRY 806 is not performed).

In one embodiment, support for bulk saves/restores in accordance with conventional store multiple and load multiple bulk requests (e.g., using the STMG and LMG instructions in accordance with the z/Architecture, or using the STM and LM—or STMW and LMW and STMD and LMD instructions, respectively, in the Power ISA, in example embodiments) may be combined with the new Spillm/Reloadm facility in at least one embodiment. In accordance with such an embodiment, code in accordance with conventional ISA (instruction set architecture) definitions may be accelerated, but use additional checking to ensure adherence to the architectural compliance with the conventional instruction definition, whereas providing even higher performance due to reduced checking for the code using the new Spillm/Reloadm instructions in accordance with aspects of the present invention.

In accordance with another aspect of the present invention, snapshots may be shared between adjacent register restoration points. These snapshots are taken of at least a portion of a register rename map, of other register restoration information, or of the full register state, as examples.

A function call is often associated with two sets of matched register spill and register reload pairs (e.g., STMG and LMG, or Spillm and Reloadm)—one associated with the saving of caller-saved registers at the call site, and another one associated with the saving of callee-saved registers in the called function. The spills (i.e., the saving of multiple architected registers) usually execute in close dynamic proximity, and similarly, the restores or reloads of the registers are usually dynamically close, as well. Further, the registers are mutually exclusive, and the registers to be saved by the second spill operation are commonly not modified by code between the first and second spill. Example code, in pseudo-code notation, is below:

```
caller_function( )
{
    various computation
    spillm r10-r15, offset1(sp)      // Spillm is one example
    jsr called_function
    reloadm r10-r15, offset1(sp)     // Reload is one example
    various computation
}
called_function( )
{
    sub sp, sp, framesize            // allocate framesize
    spillm r16-r20, offset2(sp)
    various computation
    reloadm r16-r20, offest2(sp)
    ret
}
```

Based on the foregoing, in accordance with an aspect of the present invention, at least part of a register restoration snapshot may be shared between dynamically adjacent instances of spill operations (e.g., Spillm instructions). In one example, a processor may create a restoration snapshot that includes a single snapshot of the register state used for restoring both r10-r15 of the caller function and r16-r20 of the callee function. It should be noted that the ranges of saved registers do not have to be adjacent.

To accomplish this, in one embodiment, a restoration snapshot includes two separate records: an address to which a spill has occurred and a register snapshot to be used in restoration. The register snapshot is shared, but separate address values are maintained for each Spillm/Reloadm pair: <address, snapshot-ID>.

The processor maintains, in accordance with an aspect of the present invention, a reference to the last restoration snapshot taken (which includes registers that may be referenced by a plurality of spill operations), in conjunction with a bitmap of register values that have not been written to since the last restoration snapshot. Thus, when a new restoration snapshot is to be taken, if the register range to be snapshot has not been modified since the last restoration snapshot, the present spill operation can reuse the previous restoration snapshot. Otherwise, a new restoration snapshot may be created.

One example of instruction decode and snapshot logic for sharing snapshots is provided below:

```
last_snapshot = null;
unmodifiedregs = { };
Repeat Indefinitely {
    ni = obtain instruction
    if ni is a spill instruction {
        if spill_range(ni) not in unmodifiedregs {
            last_snapshot = take_snapshot( )
            unmodifiedregs = {r0...rmax}; // all registers are unmodified
        }
        rr = create_restoration_record (spill_to_address, last_snapshot);
        push_restoration_record(rr);
        emit spill iops( );
    } else if ni is a reload instruction {
        rr = pop_restoration_record( );
        emit reload iops(rr);
    } else {
        unmodifiedregs := unmodifiedregs and not (target(ni));
        handle other instructions
    }
}
```

Figure 9:
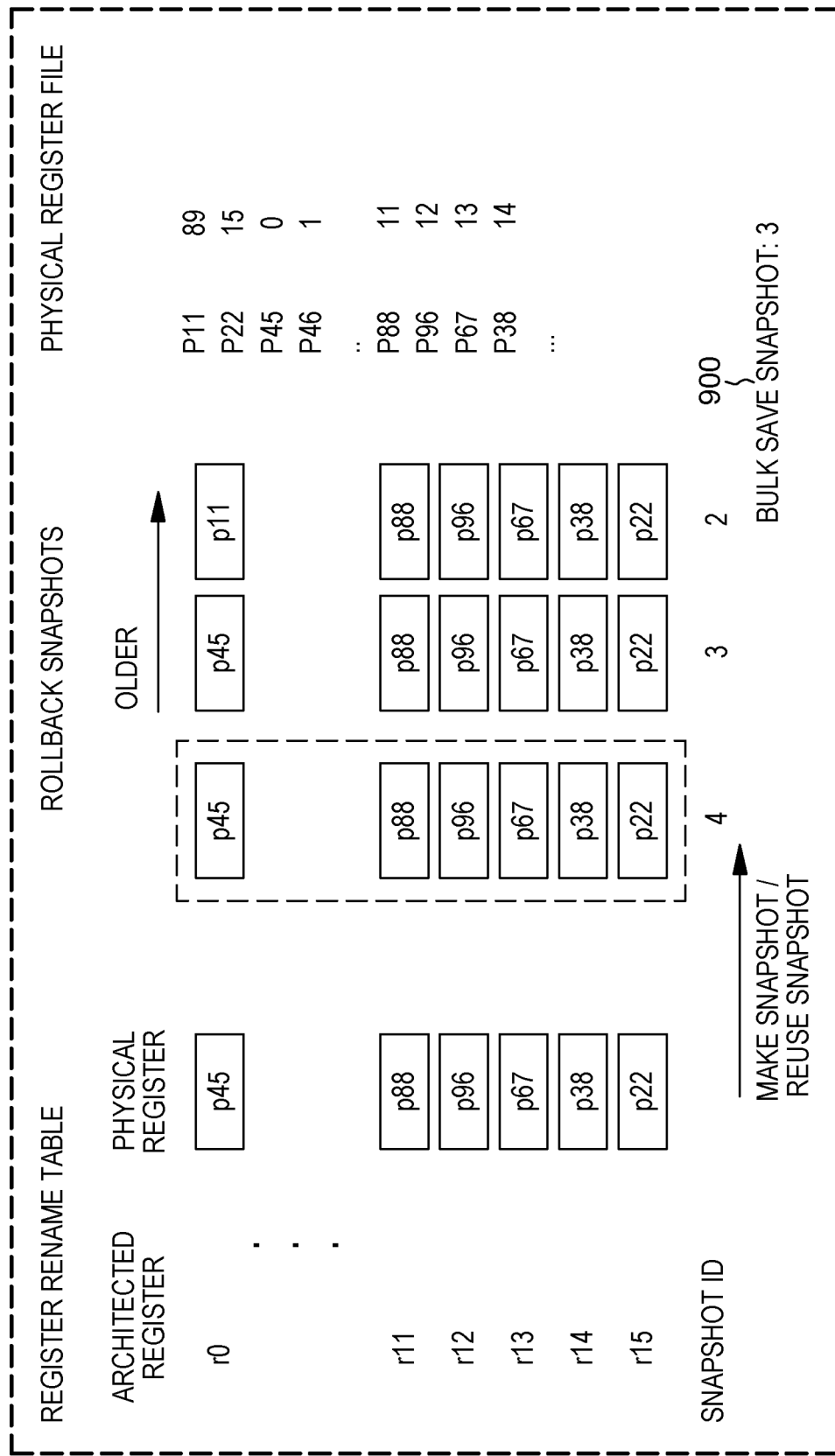
FIG. 9 pictorially depicts one example of reusing a snapshot, in accordance with an aspect of the present invention.

As shown in FIG. 9, since would-be snapshot 4 is the same as snapshot 3, in one embodiment, snapshot 4 is not taken and snapshot 3 is reused. This is shown by a dotted line around snapshot 4 and an indication of the last snapshot taken, bulk save snapshot 900, being set to 3.

Further details regarding managing restoration snapshots, in accordance with one or more aspects of the present invention, are described with reference to FIGS. 10A-10E. In FIGS. 10A-10E, snapshot refers to a restoration snapshot; i.e., a snapshot taken based on execution of one or more bulk saves (e.g., Spillm and/or Store Multiple). Initially, one embodiment of sharing a restoration snapshot is described with reference to FIG. 10A. In this embodiment, snapshot_regs is set to those registers that are to be included in a restoration snapshot, STEP 1000. For instance, a determination is made of the registers to be included, such as those to be included in one or more Spillm or Store Multiple instructions, and an indication of those registers is provided in snapshot_regs.

A check is made as to whether a previous snapshot is usable, STEP 1002. This includes determining whether the registers specified for the present snapshot include only unmodified registers from the previous snapshot since that snapshot was taken. Unmodified_regs is used to track which registers have not been modified since the last snapshot. In one example, prev_snapshot_usable is set to an indication of whether the intersection of the snapshot registers for the present snapshot and the unmodified registers, i.e., (snapshot_regs & unmodified_regs), contains all registers for the present snapshot, i.e., is the same as (i.e., ==) snapshot_regs. If there are no modified registers included in snapshot_regs, then the previous snapshot is usable. If the previous snapshot is usable, INQUIRY 1004, then this_snapshot_ID is set equal to the identifier of the previous snapshot identifier, prev_snapshot_ID, STEP 1006.

If, however, the previous snapshot is not usable, INQUIRY 1004, then another snapshot is taken, and this_snapshot_ID is updated (e.g., incremented by 1), STEP 1010. Further, unmodified_regs is set to include all of the registers, since it is initialized with no registers having been modified, STEP 1012. Additionally, prev_snapshot_ID is set equal to this_snapshot_ID, such that this snapshot is remembered for further use, STEP 1014.

Figure 10A:
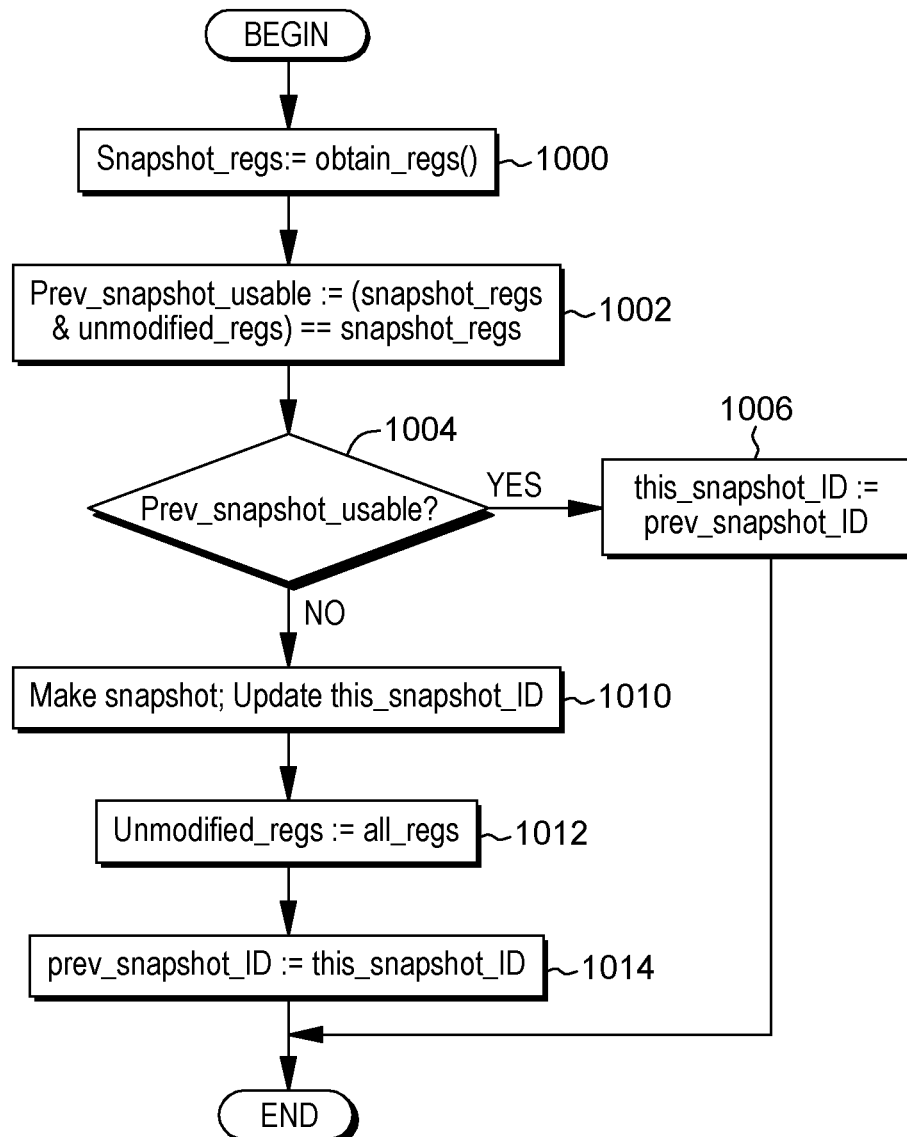
FIGS. 10A-10E depict examples of processing associated with managing restoration snapshots, in accordance with one or more aspects of the present invention.
Figure 10B:
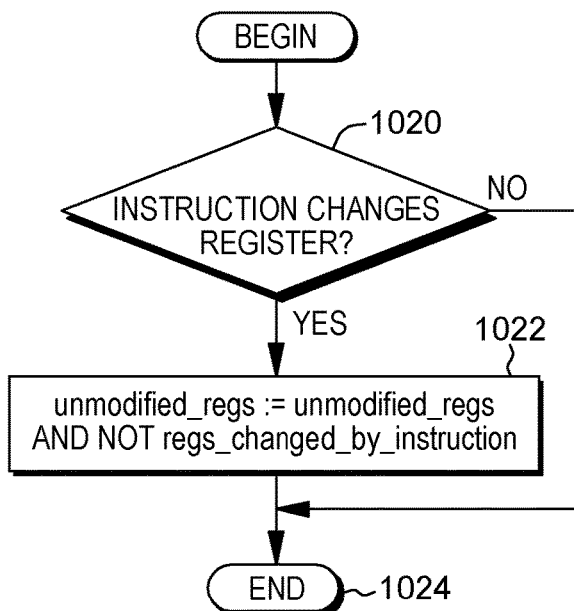
Figure 10C:
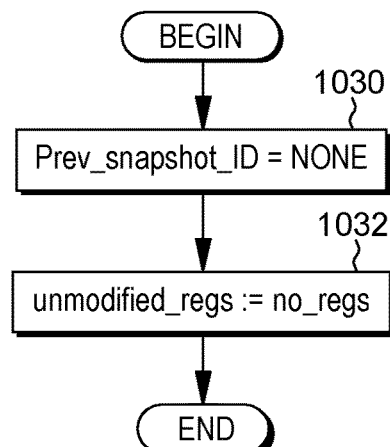

In a further embodiment, referring to FIG. 10B, the registers that are modified by an instruction are tracked. In one example, a determination is made as to whether an instruction changes the contents of one or more registers, INQUIRY 1020. If one or more registers are modified by the instruction, then those registers are tracked, STEP 1022. For instance, unmodified_regs is set to exclude those one or more registers that were modified (e.g., unmodified_regs:=unmodified_regs AND NOT regs_changed_by instruction). Subsequent to updating unmodified_regs or if the instruction has not changed any registers, INQUIRY 1020, this processing is complete, STEP 1024.

In addition to the above, in a further embodiment, if the instruction pipeline rewinds to a previous point due to an event (e.g., flush, branch misprediction, exception, etc.), then a new snapshot is forced. One example of processing associated with forcing a snapshot due to a flush/branch misprediction/exception is described with reference to FIG. 10C. In this example, prev_snapshot_id is set to NONE indicating there is no previous snapshot that may be shared, STEP 1030, and unmodified_regs is set to no_regs, STEP 1032. That is, there is no indication of a usable previous snapshot, and there are no registers considered unmodified.

Figure 10D:
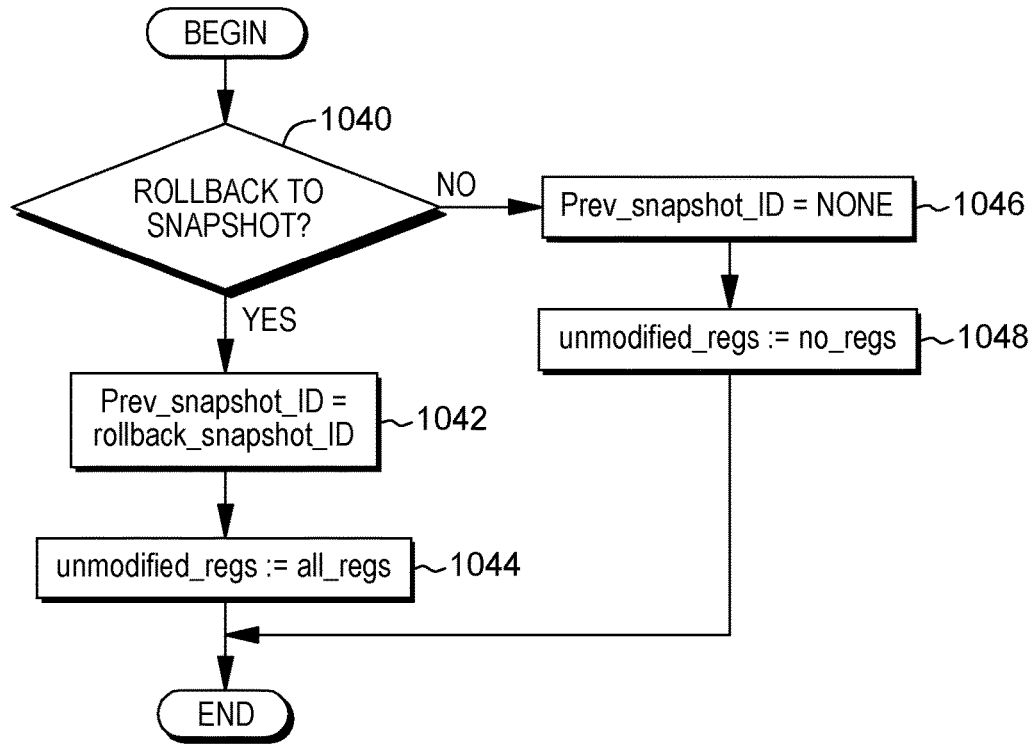

Further, in one example, if the instruction rewinds to a previous point due to an event (e.g., flush, branch misprediction, exception, etc.), rollback to a previous snapshot may be performed, as described with reference to FIG. 10D. Initially, a determination is made as to whether processing Multiple, Spillm, etc.); and snapshots for recovery are those snapshots taken based on a change to execution flow, such as a branch or a situation where an address may be mispredicted, as examples.

Consider the following example function:

```
caller_function( )
{
  various computation
  bcond <cond> skip:          // snapshot for branch misprediction/exceptions
  spillm r10-r15, offset1(sp) // snapshot for spill multiple
  jsr called_function         // snapshot—address may be mispredicted
  reloadm r10-r15, offset1(sp)
  various computation
skip:
}
``` should roll back to a snapshot, INQUIRY 1040. That is, has an event occurred that suggests rollback and is there an appropriate snapshot to which to roll back. If there is to be a rollback to a snapshot, then prev_snapshot_ID is set equal to rollback_snapshot_ID, which is the snapshot to which processing is rolled back, STEP 1042. Additionally, unmodified_regs is set to all of the registers, since at this point, no registers have been modified, STEP 1044.

Returning to INQUIRY 1040, if there is no rollback to a snapshot, then prev_snapshot_ID is set to NONE, STEP 1046, and unmodified registers is set to no registers, STEP 1048.

Figure 10F:
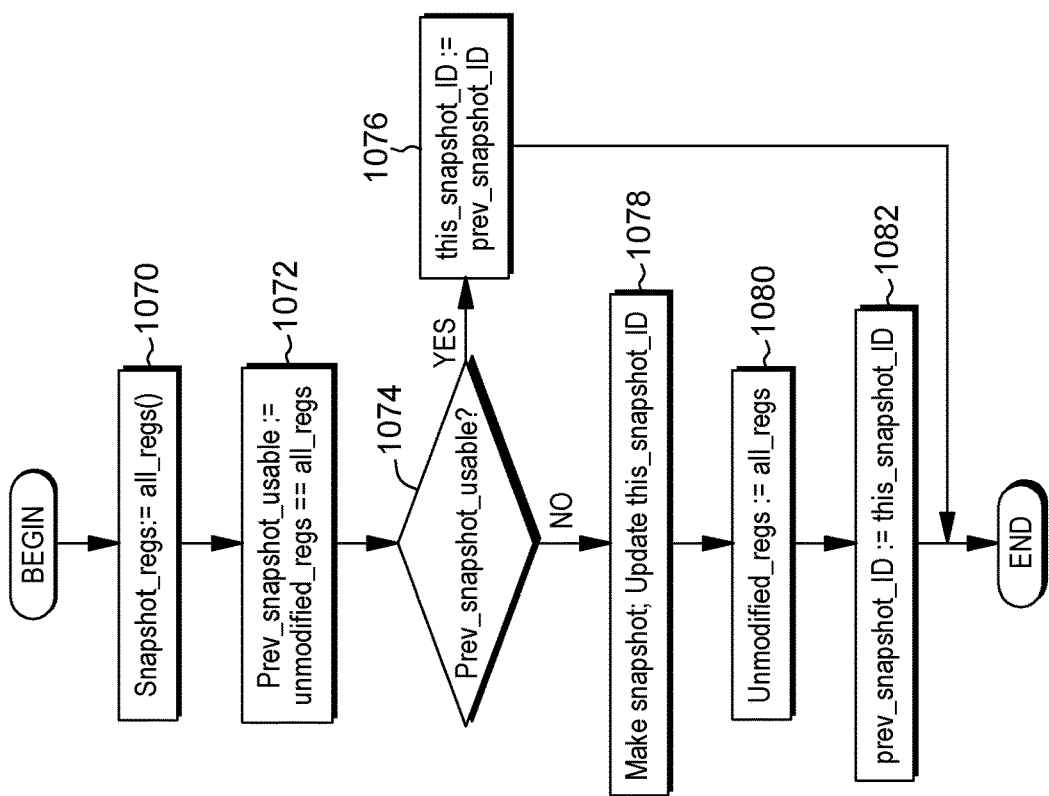
FIG. 10F depicts one example of performing recovery using shared snapshots for recovery and/or restoration, in accordance with an aspect of the present invention.
Figure 10E:
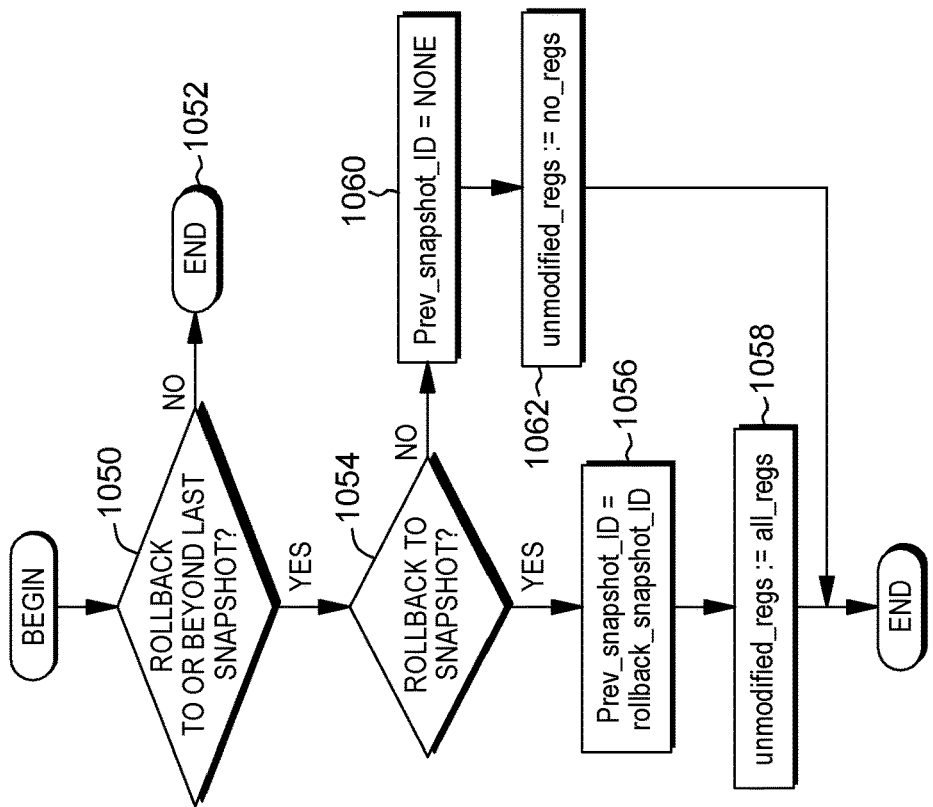

A further example of processing associated with rolling back to a snapshot due to an event, such as a flush, branch misprediction, exception, is described with reference to FIG. 10E. Initially, a determination is made as to whether processing is to roll back to or beyond the last snapshot, INQUIRY 1050. If not, this processing is complete and the last snapshot may be used, STEP 1052. In one embodiment, with processing of rolled back instructions, the set of unmodified registers may contain a subset of the truly unmodified registers, as processing of rolled back instructions in accordance with the technique of FIG. 10B may have removed registers from the unmodified register set. However, this is a conservative definition of the subset, i.e., in the worst case there may be more snapshots taken than necessary, thereby preserving correctness. At the same time, the set of snapshots that may be taken is fewer than those in accordance with FIG. 10C or FIG. 10D, in which each snapshot request triggers a snapshot being taken in accordance with the technique of FIG. 10C, and in accordance with choosing STEPS 1046 and 1048 of FIG. 10D.

Otherwise, a determination is made as to whether processing is to roll back to a snapshot, INQUIRY 1054. If there is to be a rollback to a snapshot, then prev_snapshot_ID is set equal to rollback_snapshot_ID, which is the snapshot to which processing is rolled back, STEP 1056. Additionally, unmodified_regs is set to all of the registers, since at this point, no registers have been modified, STEP 1058.

Returning to INQUIRY 1054, if there is no rollback to a snapshot, then prev_snapshot_ID is set to NONE, STEP 1060, and unmodified registers is set to no registers, STEP 1062.

Although various embodiments are provided above, other embodiments may be used to manage which snapshot to be used in particular circumstances.

In a further aspect of the invention, in addition to using shared snapshots for restoration, shared snapshots may be used in recovery. As used herein, snapshots for restoration are those snapshots taken based on a bulk save (e.g., Store In the above example, recovery snapshots are taken for the branch conditional (bcond) instruction and the jump (jsr) instruction, and restoration snapshots are taken for the Spillm instruction. In this example, the recovery snapshots (e.g., for the branch conditional and the jump) may be shared, similar to the sharing of the snapshots for restoration (e.g., multiple spill operations). This is described further with reference to FIG. 10F.

One example of sharing a recovery snapshot is described with reference to FIG. 10F. In one example, the processing of FIG. 10F is performed when a recovery snapshot is to be made, e.g., to create a rollback point for branch misprediction recovery implementing precise exceptions, handling pipeline flushes, or other such events. Initially, the set of registers to be snapshot for a recovery snapshot, snapshot_regs, is set equal to all of the registers (all_regs( )), e.g., all of the registers to be saved for recovery in the event of a precise exception, branch misprediction, or other such event (e.g., the registers associated with the conditional branch bcond and subroutine call jsr, in this example), STEP 1070. A check is made as to whether a previous snapshot is usable, STEP 1072. This includes determining whether the registers to be used for the present snapshot (which corresponds to all registers, in accordance with STEP 1070, in one example) includes only unmodified registers since the previous snapshot was taken. In one example, the indicator, prev_snapshot_usable, is set equal to an indication of whether unmodified_regs==all_regs. If there are no modified registers in snapshot_regs, then the previous snapshot is usable. If the previous snapshot is usable, INQUIRY 1074, then this_snapshot_ID is set equal to prev_snapshot_ID, STEP 1076, (i.e., the previous snapshot is usable for providing a snapshot for the present snapshot request). Otherwise, if a previous snapshot is not usable, then a snapshot is made, and this_snapshot_ID is updated (e.g., incremented by one), STEP 1078. Further, unmodified_regs is set equal to all registers, STEP 1080, and prev_snapshot_ID is set equal to this_snapshot_ID, STEP 1082, such that the present snapshot may be reused for future snapshot requests, e.g., at least with one or more of a recovery and a restoration snapshot request in accordance with embodiments of aspects of the present invention.

In one embodiment, the processing of FIG. 10F implemented for sharing recovery snapshots may operate in conjunction with the processing of one or more of FIGS. 10A-10E implemented for sharing restoration snapshots. In one aspect, snapshots may be shared for recovery, for restoration or for a combination of recovery and restoration.

The technique of FIG. 10F, as one example, can be used for sharing snapshots, regardless of the type.

While FIGS. 10A-10F have been described with respect to a single snapshot for a register file, in accordance with embodiments of aspects of the present invention, the register snapshot techniques described herein may be performed for a variety of register types, including but not limited to general registers, integer registers, address registers, data registers, fixed point registers, floating point registers, vector registers, vector-scalar registers, condition registers, predicate register, control registers, special purpose registers, etc. In accordance with one embodiment, multiple register types may be supported in a single implementation, so as to provide, for example, snapshots for general purpose and vector registers (or other combinations of register types). Further, a plurality of register types may share a snapshot mechanism, in accordance with one or more embodiments.

In one example embodiment, snapshots for floating point and vector registers may be shared, e.g., with an implementation in accordance with the z/Architecture providing for shared vector and floating point registers. In another example embodiment, snapshots for floating point, vector registers and vector-scalar registers may be shared, e.g., with an implementation in accordance with the Power ISA providing for shared vector-scalar, vector, and floating point registers. Other examples are also possible.

In a further aspect of the present invention, changes to memory are tracked in order to determine, if desired, whether restored registers are correct (i.e., does the snapshot used to recover the registers have the most current information). For instance, in one embodiment in which Store Multiple and Load Multiple instructions (or other such instructions) are used, changes to memory that occur between the load and store are captured to be able to determine correctness, if desired, of the restored registers in accordance with the values previously stored by a store multiple request and to be reloaded by a load multiple instruction, when the registers are restored from a register restoration snapshot rather than from memory. (Using Spillm/Reloadm provides a benefit here in which the correctness of a register restoration snapshot with respect to an in-memory buffer is not a concern of this processing, since by architectural definition, memory changes are not to be made by a programmer and represent a programming error resulting in undefined behavior. Thus, if memory changes are made between Spillm and Reloadm to a memory buffer used by these instructions, by architectural definition, such a change is considered a programming error, and the programmer is responsible for handling such an error, not this processing associated with the Spillm/Reloadm instructions.)

One example of code including save and restore operations is depicted below:

```
called function( )
{
  sub sp, sp framesize        // allocate framesize
  STM r16-r20, offset2(sp)    // Store Multiple; create snapshot
  various computation
  LM r16-r20, offset2(sp)     // Load Multiple; restore snapshot
  ret
}
```

The restore recovers the value of the callee-saved registers at the point where the function was entered and the callee-saved registers were saved. However, instructions between STM and LM may change memory which affects the callee-saved registers when restored. This is demonstrated in the example below:

Example 1

```
called function( )
{
  sub sp, sp, framesize       // allocate framesize; sp is stack pointer
  STM r16-r20, offset2(sp)    // save registers 16-20 to memory at offset from sp
  ...various computation...
  L1 r1, 99                   // load 99 into register 1
  ST r1, offset2(sp)          // store value of register 1 to memory at offset from sp
  LM r16-r20, offset2(sp)     // restore registers 16-20 from memory -- value 99
                              // stored
                              // at offset from stack pointer being loaded into r16;
  ret
}
```

Restoring the registers, based on receiving the Load Multiple, from a snapshot, instead of loading the registers from memory would restore the value originally in the register at the snapshot point corresponding to the values at the STM instruction, not the modified value 99 stored into the in-memory register restoration buffer location corresponding to register r16. Therefore, one or more aspects are provided to determine whether the memory has changed compromising the integrity of the snapshot.

In accordance with aspects of the present invention, various embodiments are provided to address possible memory changes between save and restore operations, including for instance: (1) restoring, checking and recovering, if necessary; (2) using Spillm/Reloadm, wherein by definition, the memory is not modified in-between the save and restore; and (3) tracking any changes without explicit checking. Each of these aspects is described further below.

As indicated above, one embodiment to address the scenario in which a register value is changed in memory between a store and a load is to use a restore, check and recover technique in accordance with an aspect of the present invention. In accordance with this aspect, a register snapshot is restored based on receiving a register restoration request. Further, based on the request and restoring registers from a snapshot, each of the registers restored from a register snapshot is checked by loading the corresponding register value from the memory buffer corresponding to the register save/restore pair, and comparing the value restored from the register snapshot to the value loaded from the memory buffer. If a mismatch is detected, the restored registers are recovered from the in-memory buffer. Otherwise, the restored registers from the snapshot are used. Advantageously, the checking of the registers can be performed in parallel to performing computation using the restored values, thereby enabling the application program to proceed with computation even if the checking has not completed.

As described herein, in one example, if a check fails, then all of the registers are recovered using the memory values. This is described further with reference to FIG. 11A.

Initially, a restore operation is obtained (e.g., received, provided, determined, retrieved, have, etc.), STEP 1100. For instance, a Load Multiple instruction is received. A determination is made as to whether the restore operation matches the previous save operation (e.g., do the registers of the Load Multiple match the registers of the Store Multiple paired with the Load Multiple; are the addresses the same; is a subset of the registers or addresses the same; etc.), INQUIRY 1102. If the registers to be restored correspond to those that were saved, then the last snapshot is obtained and used to restore the registers, STEP 1104.

Subsequent checking is performed to determine correctness of the restored values. Serialization for the subsequent checking is provided to ensure that checking commences after a snapshot has been restored, STEP 1106, and an indicator indicating whether a mismatch in which recovery of values from memory is to be performed, referred to as mismatch, is initialized to FALSE, STEP 1108. A stored value corresponding to a selected register is loaded from memory using, e.g., a micro-operation, STEP 1110. That loaded value is compared to the restored value of the selected register being checked, STEP 1112. If the compare fails, i.e., the loaded value does not match the restored value, mismatch is set to TRUE. The processor checks the mismatch indicator and if it indicates a failed compare, INQUIRY 1114, then the pipeline is flushed and a restart is performed after the restore operation, STEP 1116. Additionally, the values for the registers being restored are reloaded from memory, STEP 1118.

In one example, the flush is performed in order to cause all instructions that may have executed speculatively using the values from the restored snapshot to be re-executed with the values obtained from memory when a mismatch was detected. In at least one embodiment, the flush can be more selective, causing, e.g., only a flush and re-execution of instructions depending on the restored registers.

Returning to INQUIRY 1114, if, however, mismatch indicates a successful compare, then a determination is made as to whether there are more restored registers to be checked, INQUIRY 1120. If there are more restored registers to be checked, then processing continues to STEP 1110. Otherwise, processing is complete.

Returning to INQUIRY 1102, if the restore request does not match the store request, then the values of the registers are reloaded from memory, STEP 1118.

Figure 11A:
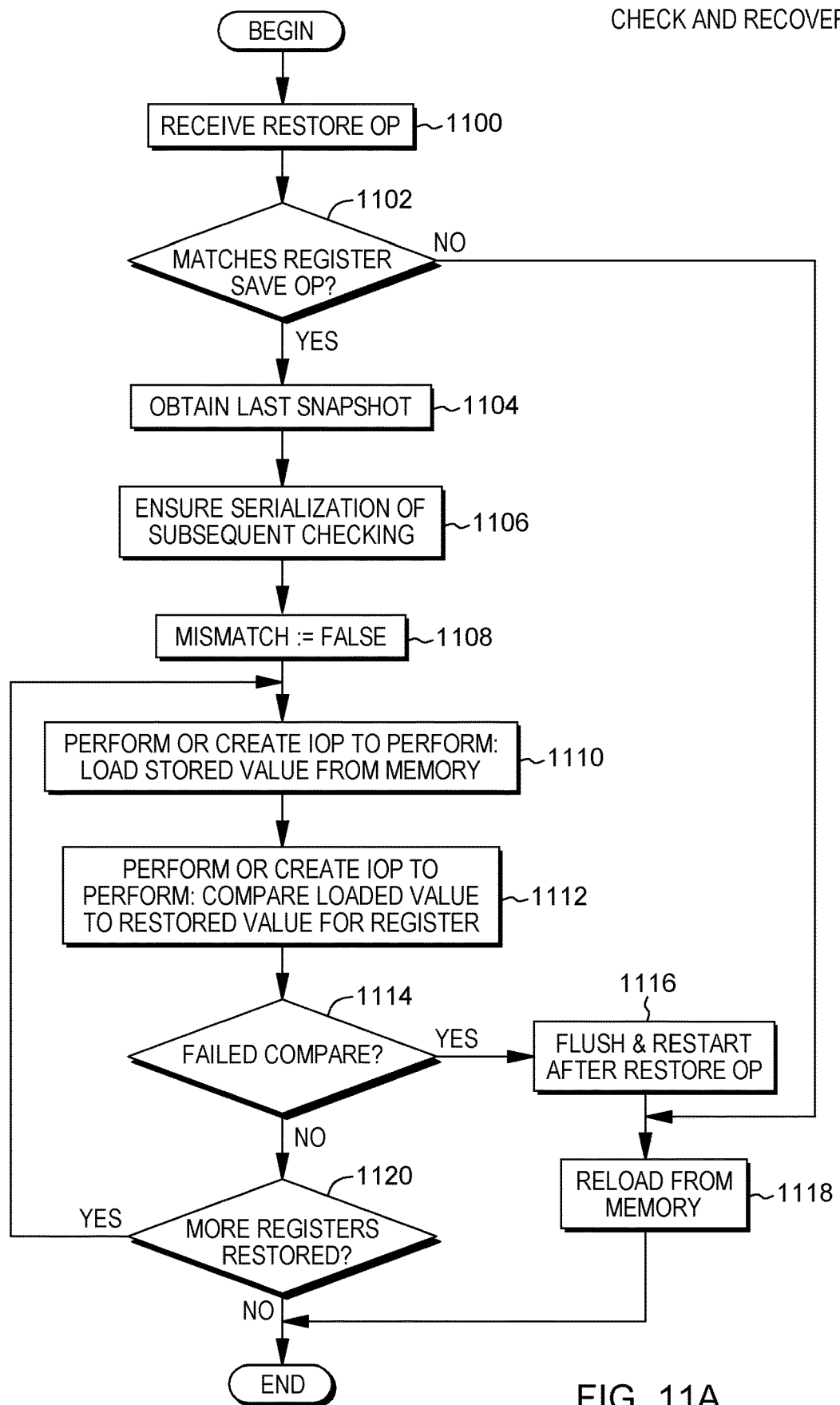
FIGS. 11A-11C depict embodiments of checking for memory changes and optionally recovering, in accordance with one or more aspects of the present invention.

In one embodiment, one or more steps of FIG. 11A are implemented by expanding a restore operation into one or more multiple internal operations (iops) corresponding to one or more of the steps of FIG. 11A that may be executed out-of-order with respect to other instructions and/or internal operations corresponding to other instructions. In another aspect of the present invention, iops generated corresponding to the present instruction may be executed out-of-order relative to each other. In accordance with this implementation, out-of-order execution logic provides suitable interlocks so as to ensure that subsequent operations are only executed when a snapshot has been restored, and further any speculative executed instructions that have been executed based on a restored value are invalidated, flushed and re-executed when a mismatch is detected.

In another embodiment, the steps of FIG. 11A are implemented as steps of dedicated circuitry for register restoration and validation. In at least one embodiment, the logic corresponding to FIG. 11A is performed in parallel to executing subsequent instructions using restored values while the circuitry implementing the technique herein continues to verify the restored registers. Furthermore, there is provided suitable interlocks so as to ensure that subsequent operations are only executed when a snapshot has been restored, and further any speculatively executed instructions that have been executed based on a restored value are invalidated, flushed and re-executed when a mismatch is detected.

Figure 11B:
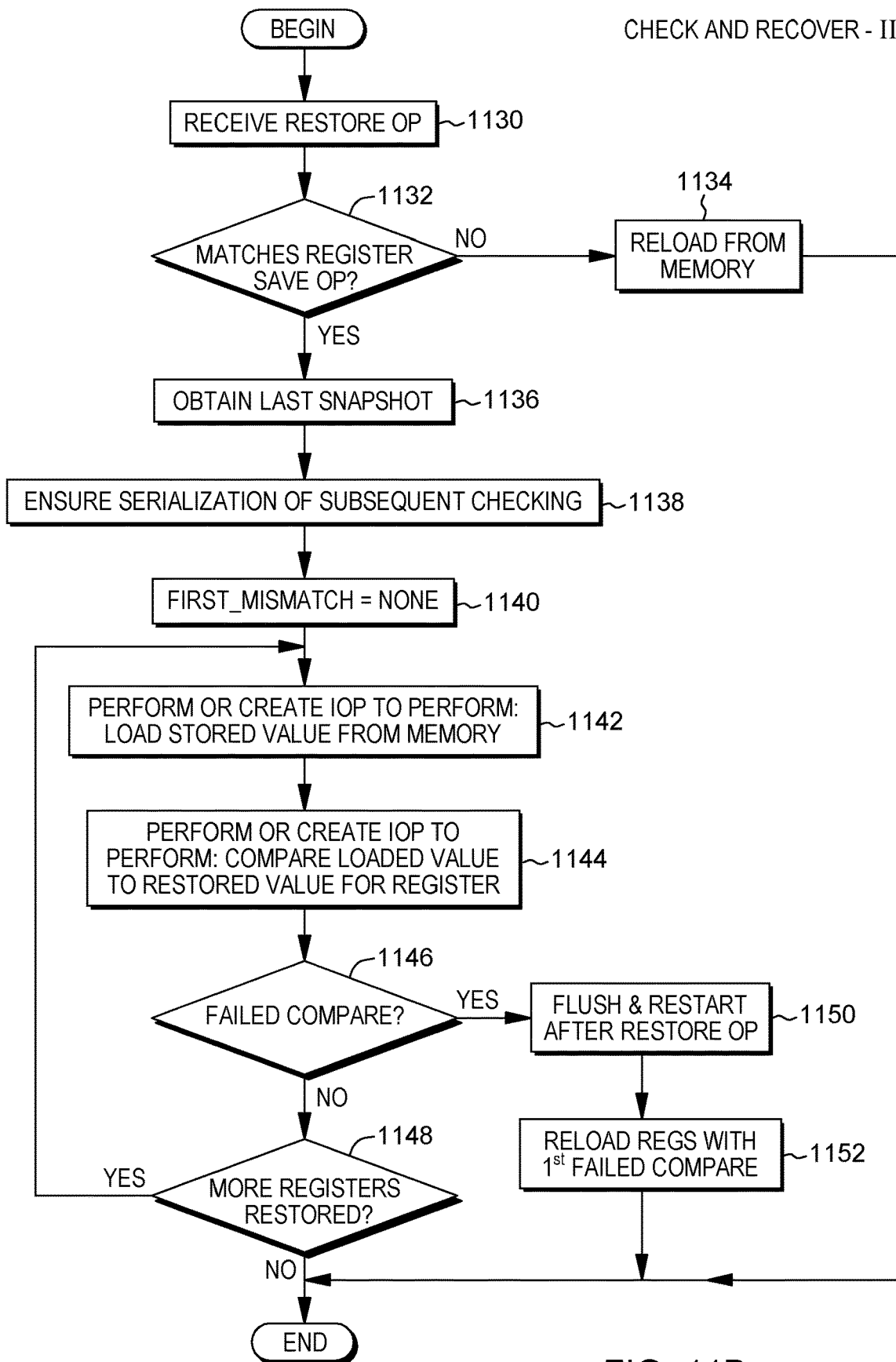

Another embodiment of the restore, check and recover technique is described with reference to FIG. 11B. In this embodiment, it is possible that one or more registers are restored from a snapshot, but one or more other registers are restored from memory. Referring to FIG. 11B, a restore operation, such as a Load Multiple, is obtained (e.g., received, provided, retrieved, determined, have, etc.), STEP 1130. A determination is made as to whether the restore operation matches the previous save operation (e.g., do the registers of the Load Multiple match the registers of the Store Multiple paired to the Load Multiple; are the addresses the same; is a subset of the registers or addresses the same; etc.), INQUIRY 1132. If the registers to be restored correspond to those that were saved, then the last snapshot is obtained and used to restore the registers, STEP 1136.

Thereafter, subsequent checking is performed to determine correctness of the restored values. Serialization for the subsequent checking is provided to ensure that checking commences after a snapshot has been restored, STEP 1138, and first_mismatch is set to NONE, STEP 1140. A stored value corresponding to a selected register is loaded from memory using, e.g., a micro-operation, STEP 1142. That loaded value is compared to the restored value of the selected register being checked, STEP 1144. If the compare fails, i.e., the loaded value does not match the restored value, first_mismatch is set to the register that failed the compare. If first_mismatch is no longer equal to NONE, the processor determines there is a mismatch. INQUIRY 1146, and the pipeline is flushed and a restart is performed after the restore operation, STEP 1150. Additionally, the values in the register of the failed compare and subsequent registers are reloaded from memory, STEP 1152.

In one example, the flush is performed in order to cause all instructions that may have executed speculatively using the values from the restored snapshot to be re-executed with the values obtained from memory when a mismatch was detected. In at least one embodiment, the flush can be more selective, causing, e.g., only a flush and re-execution of instructions depending on the restored registers, or depending on the restored registers that are recovered from memory, starting with the first_mismatch register.

Returning to INQUIRY 1146, if, however, the compare is successful, then a determination is made as to whether there are more restored registers to be checked, INQUIRY 1148. If there are more restored registers to be checked, then processing continues to STEP 1142. Otherwise, processing is complete.

Returning to INQUIRY 1132, if the restore request does not match the store request, then the values of the registers are reloaded from memory, STEP 1134.

In one embodiment, one or more steps of FIG. 11B are implemented by expanding a restore operation into one or more multiple internal operations (iops) corresponding to one or more of the steps of FIG. 11B that may be executed out-of-order with respect to other instructions and/or internal operations corresponding to other instructions. In another aspect of the present invention, iops generated corresponding to the present instruction may be executed out-of-order relative to each other. In accordance with this implementation, out-of-order execution logic provides suitable interlocks so as to ensure that subsequent operations are only executed when a snapshot has been restored, and further any speculative executed instructions that have been executed based on a restored value are invalidated, flushed and re-executed when a mismatch is detected.

In another embodiment, the steps of FIG. 11B are implemented as steps of dedicated circuitry for register restoration and validation. In at least one embodiment, the logic corresponding to FIG. 11B is performed in parallel to executing subsequent instructions using restored values while the circuitry implementing the technique herein continues to verify the restored registers. Furthermore, there is provided suitable interlocks so as to ensure that subsequent operations are only executed when a snapshot has been restored, and further any speculatively executed instructions that have been executed based on a restored value are invalidated, flushed and re-executed when a mismatch is detected.

Another embodiment of restoring, checking and recovering is described with reference to FIG. 11C. In this example, individual registers are tracked and may be restored using the snapshot, while others may be restored from memory.

Figure 11C:
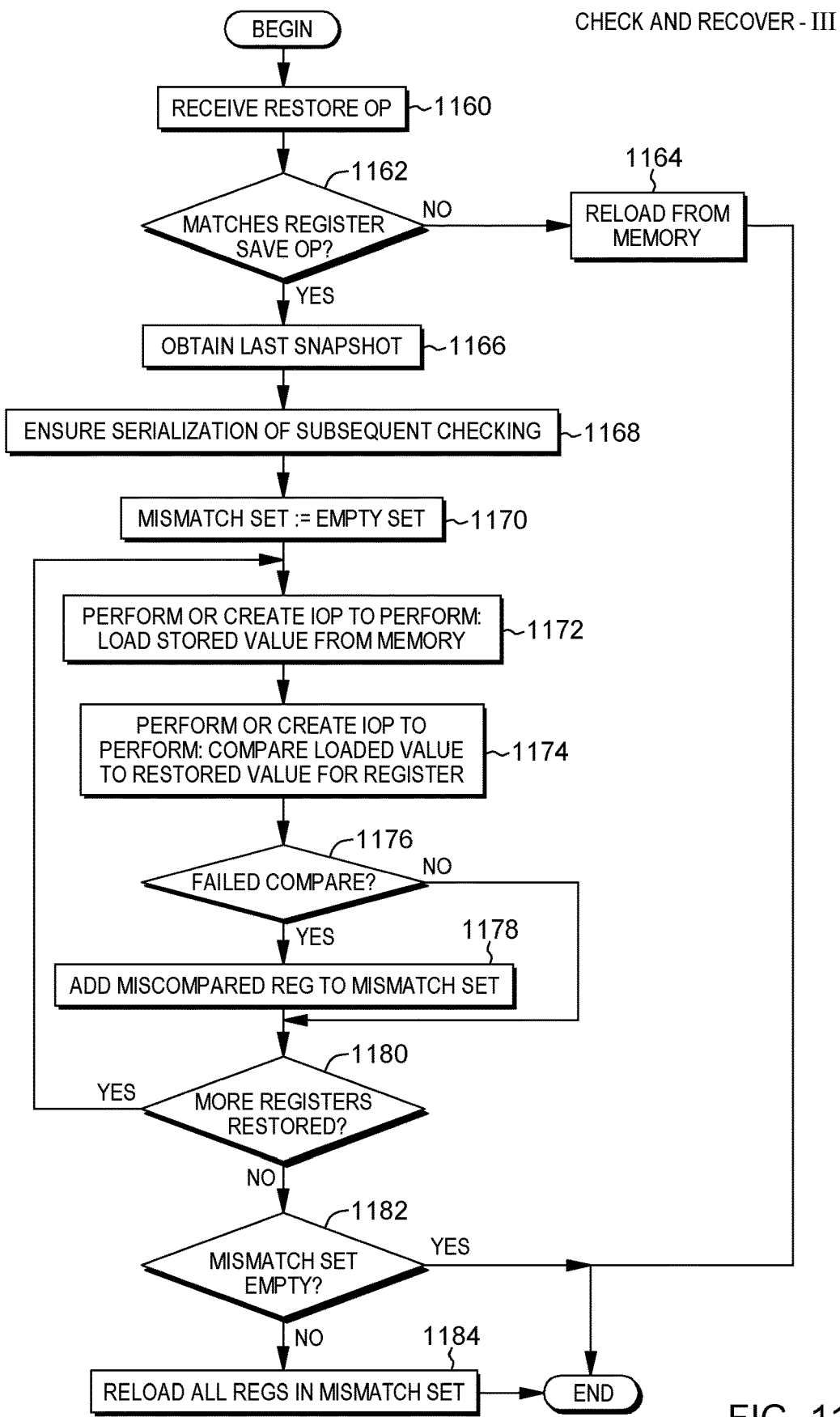

Referring to FIG. 11C, initially, a restore operation (e.g., a Load Multiple) is obtained (e.g., received, provided, determined, retrieved, have, etc.), STEP 1160. A determination is made as to whether the restore operation matches the previous save operation (e.g., do the registers of the Load Multiple match the registers of the Store Multiple paired to the Load Multiple; are the addresses the same; is a subset of the registers or addresses the same; etc.), INQUIRY 1162. If the registers to be restored correspond to those that were saved, then the last snapshot is obtained and used to restore the registers, STEP 1166. Thereafter, subsequent checking is performed to determine correctness of the restored values. Serialization for the subsequent checking is provided to ensure that checking commences after a snapshot has been restored, STEP 1168, and a mismatch set is set to an empty set, STEP 1170.

A stored value corresponding to a selected register is loaded from memory using, e.g., a micro-operation, STEP 1172. That loaded value is compared to a restored value of the selected register being checked, STEP 1174. If the compare fails, i.e., loaded value does not match the restored value, INQUIRY 1176, then the miscompared register is added to the mismatch set, STEP 1178.

Thereafter, or if the compare is successful, INQUIRY 1176, then a determination is made as to whether there are more restored registers to be checked, INQUIRY 1180. If there are more restored registers to be checked, then processing continues to STEP 1172. Otherwise, a determination is made as to whether the mismatch set is empty, INQUIRY 1182. If the mismatch set is empty, processing is complete. Otherwise, the registers in the mismatch set are reloaded with the values from memory, STEP 1184.

In one example, reload in accordance with STEP 1184 may cause re-execution of some or all of the instructions either following the restore instruction, or depending on one of the restored values. In one embodiment, this is achieved by causing a full or partial flush in order to cause all instructions that may have executed speculatively using the values from the restored snapshot to be re-executed with the values obtained from memory when a mismatch was detected. In at least one embodiment, the flush is selective, causing, e.g., only a flush and re-execution of instructions depending on the restored registers of the instruction, or depending on the restored registers that are recovered from memory, as represented by the registers in the mismatch set.

Returning to INQUIRY 1162, if the restore request does not match the store request, then the values of the registers are reloaded from memory, STEP 1164.

In one embodiment, one or more steps of FIG. 11C are implemented by expanding a restore operation into one or more multiple internal operations (iops) corresponding to one or more of the steps of FIG. 11C that may be executed out-of-order with respect to other instructions and/or internal operations corresponding to other instructions. In another aspect of the present invention, iops generated corresponding to the present instruction may be executed out-of-order relative to each other. In accordance with this implementation, out-of-order execution logic provides suitable interlocks so as to ensure that subsequent operations are only executed when a snapshot has been restored, and further any speculative executed instructions that have been executed based on a restored value are invalidated, flushed and re-executed when a mismatch is detected.

In another embodiment, the steps of FIG. 11C are implemented as steps of dedicated circuitry for register restoration and validation. In at least one embodiment, the logic corresponding to FIG. 11C is performed in parallel to executing subsequent instructions using restored values while the circuitry implementing the technique herein continues to verify the restored registers. Furthermore, there is provided suitable interlocks so as to ensure that subsequent operations are only executed when a snapshot has been restored, and further any speculatively executed instructions that have been executed based on a restored value are invalidated, flushed and re-executed when a mismatch is detected.

Although various techniques are described above, variations to those techniques may be made without departing from the spirit of aspects of the invention.

In accordance with another aspect, the checking for memory changes is not performed, since the saving and restoring are performed using Spillm and Reloadm instructions (or similar instructions), which are architecturally defined to not allow, between the spillm and reloadm, memory changes to the register values stored in memory. In this approach, the instruction definition indicates that the restored register values are undefined if the memory is modified. In accordance with the definition of the instructions, the user is not to modify the corresponding stored area. If the user does modify the area, this is considered a programming error and correctness is not guaranteed.

Example definitions of the Spillm and Reloadm instructions are described above. However, further details are provided herein. In one embodiment, Spillm saves the register values to memory so that they can be used as, for instance, a fallback in case of snapshot invalidation. Snapshot invalidation may occur, for example, if the processor runs out of physical registers, the processor runs out of storage for snapshots, there is a context switch, etc.

Figure 4B:
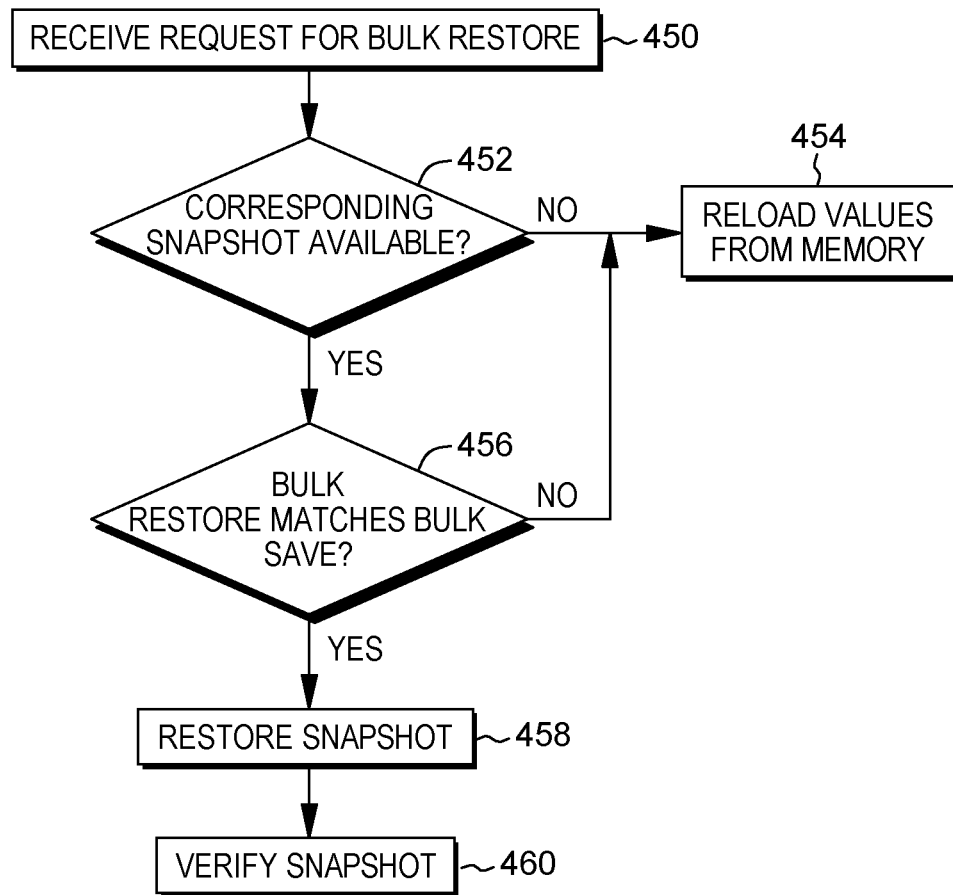
FIG. 4B depicts one example of processing associated with a bulk restore request, in accordance with an aspect of the present invention.

In one embodiment, when using Spillm and Reloadm, it is architecturally defined that the verify snapshot of FIG. 4B is not needed. Therefore, as shown in FIG. 8A, there is no snapshot verification performed. Similarly, in accordance with another aspect, the bulk restore may be performed without using the matching inquiry (e.g., INQUIRY 806), since it may be architecturally defined that the Reloadm is to match the Spillm. One example of this is described above with reference to FIG. 8B, in which no matching inquiry is performed.

Although the architectural definitions of Spillm/Reloadm allow the skipping of the matching inquiry, there may be situations in which Spillm and Reloadm become unmatched. For instance, the pairs may become unmatched based on setjump/longjump functions in a program in accordance with the C/C++ and POSIX definitions of the setjump and longjump functions and/or responsive to structured exception handling, e.g., such as used in accordance with exception handling as represented in C++ and Java, as examples. One example of exception handling and resulting unmatched Spillm/Reloadm instructions is shown below:

```
Caller( )
{
  Spillm
  try {
     callee( )              // See Callee( ) below
  } catch (Exception e)...  // Stack unwind is performed;
                            // Reloadm in callee not executed, so
  Reloadm                   // This Reloadm is matched with callee's Spillm
}
Callee( )
{
  Spillm
  if (condition)
       throw exception;    // The callee's Reloadm is not executed
  Reloadm
}
```

Based on the example herein, when an exception is thrown in the callee function callee( ), the Reloadm instruction of the callee function's prologue may not be executed, causing the subsequent Reloadm in the caller to mismatch with the most recent Spillm of the callee.

Similarly, a mismatch may occur with Setjump/Longjump, as indicated below:

```
Caller( )
{
  Spillm
  if (buf=Setjump( )) {
     callee( )              // See Callee( ) below
  } else {
     alt code;
  }                         // Reloadm in callee not executed, so
  Reloadm                   // This Reloadm is matched with callee's Spillm
}
Callee( )
{
  Spillm
  if (condition)
       Longjump(buf)       // Stack unwind performed; Reloadm is not executed
  Reloadm
}
```

Since certain programming may lead to mismatched Spillm/Reloadm instructions, in one aspect, a capability is provided to ensure that a particular Reloadm matches a particular Spillm. The capability includes invalidating, if need be, a snapshot to be used for recovery and/or ensuring that the caller's Reloadm is not satisfied using the callee's Spillm snapshot. To invalidate a snapshot, a number of techniques may be used, in accordance with aspects of the present invention, including performing a Reloadm into, for example, one single register simply to remove a snapshot; unstacking a Spillm snapshot using, for instance, an invalidate snapshot, Invsnap, instruction; or otherwise, removing a snapshot from the snapshot stack or ignoring a snapshot.

In one example, the number of Reloadm instructions that are skipped is determined by scanning the code of the function, and then that number of snapshots is invalidated. In one embodiment, code analysis for invalidated snapshots and snapshot invalidation may be performed in conjunction with conventional unwind processing, e.g., to restore registers in the presence of structured exception handling. This is shown in the below code provided in pseudocode notation:

```
Unwind_and_invalidate ( )
{
```
-continued
```
Repeat {
  Scan to end of this function and determine number of Reloadm
  instructions
      skipped and invalidate that many snapshots
```

-continued
```
  Do other processing associated with unwind: recovery of registers etc
  Unwind this ("prey") function's stack
  Set next processing point to caller ("next" function) at the point
  where it
      had called "prey" function
  } until target function reached;
  Scan in target function until target point and determine number of
  Reloadm
      instructions skipped and invalidate that many snapshots
}
```

Figure 12:
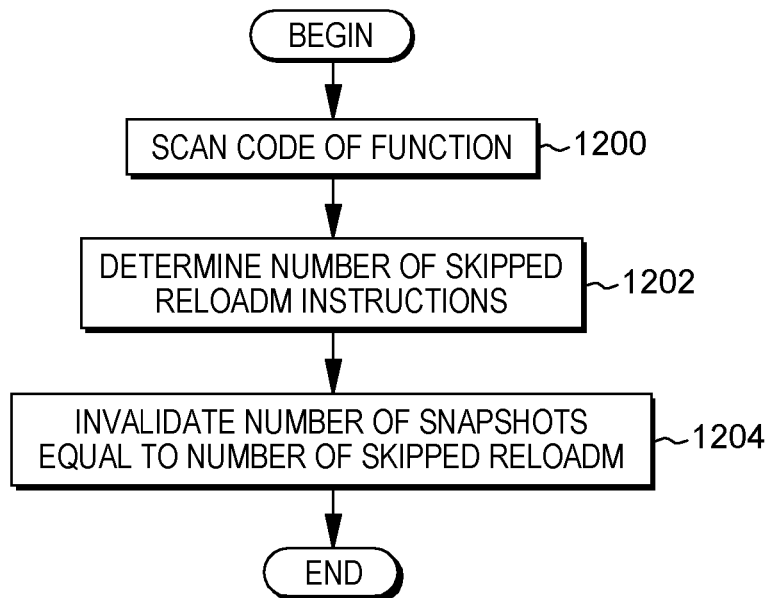
FIG. 12 depicts one example of processing associated with mismatched Spill Multiple/Reload Multiple pairs, in accordance with an aspect of the present invention.

Referring to FIG. 12, and as described with reference to the pseudocode notation, the processor scans the code of the function looking for Spillm/Reloadm pairs, STEP 1200. The number of skipped Reloadm instructions is counted, STEP 1202, and a corresponding number of snapshots is invalidated, STEP 1204.

Although one example of managing mismatched pairs is provided, other techniques may be used.

In accordance with another aspect of the present invention, changes are tracked as they occur, instead of performing the recovery and checking as described with reference to FIGS. 11A-11C. In this aspect, each time a processor updates memory, a check is made to determine if the update impacts the validity of a snapshot. If it does, then the requested values are obtained from memory, instead of the snapshot registers.

In one example, cache lines subject to a store multiple are marked as being in a write-set. When interference from another processor is diagnosed, then a store has occurred to a memory buffer that is subject to register restoration. In one embodiment, the interference is used to invalidate in-flight forwarding opportunities. In another embodiment, the cache lines of the write-set may be associated with a corresponding identifier to indicate which store/load pair is to be excluded from register restoration. In at least one embodiment, the write-set indication is not cleared until all intervening store memory operations (or other synchronizing operations) have completed. In another embodiment, the write-set for a buffer is not cleared until the corresponding load has completed. In at least one weak memory ordering embodiment, the write-set reservation is cleared immediately when the load has completed.

In one embodiment, such as in strong memory ordering which may delay the ability to complete the first save/restore sequence, two register restoration sequences may be in-flight for the same memory location. For instance, a function is called, a store multiple is performed for callee-saved registers, the callee-saved registers are reloaded using load multiple, the function returns, the function is immediately called again, and another store multiple and load multiple occur to the same address.

In one example, the second pair is held until the first one completes. In one embodiment, write-set cache lines can be associated with multiple pairs. In another embodiment, when multiple cache lines are associated, a single bit is used to force the clearance of all store/load register restoration pairs. Various examples exist.

Further, in another aspect, interference with stored register in-memory buffers from local accesses are to be considered. This may be accomplished by obtaining a base address and a range (either as a length or as an end address) for a memory buffer associated with a snapshot, and comparing the address of subsequent store operations against the range of the memory buffer to detect an interference. In one embodiment, this interference test is performed for instructions such as store-multiple bulk save, whereas interference for individual stores is tracked using an indicator associated with a cache line, or cache subline. In one embodiment, a single snapshot and associated in-memory buffer range for the most recent store/load pair is maintained. In other embodiments, additional snapshots and associated in-memory buffer ranges are supported to allow the maintenance of more pairs.

As local and remote accesses are to be checked, in one embodiment, against the buffer address range for each active register restoration snapshot to detect buffer modifications, address checking can incur significant area, power and/or delay costs either by implementing concurrent checking logic or by forcing serial checking of interference at the risk of incurring queuing delays as requests are processed. To reduce these costs, a variety of approaches may be used in conjunction with embodiments of aspects of the present invention. In one embodiment, only remote accesses that hit in the first level data cache are compared against tracked memory ranges, when the L1 cache is inclusive. In another embodiment, additional filtering is provided by tracking the presence of buffers in specific cache lines, e.g., using marker bits. In yet another embodiment, marker bits may be used to indicate active buffers and buffers may be deactivated responsive to writes to cache lines and subcache lines responsive to a plurality of access types without comparing to tracked address ranges corresponding to snapshots, thereby invalidating snapshots without incurring the overhead of comparing tracked ranges corresponding to all snapshots. In yet another embodiment, snapshots corresponding to a cache line may be identified by the cache directory or a separate table, further reducing the number of comparisons that are to be performed.

In yet one or more other embodiments, memory addresses may be filtered using a memory address filter to reduce the number of memory accesses that are to be compared. A variety of address filters (e.g., address range filters, Bloom filters, and so forth) may be used for address filtering in conjunction with one or more aspects of the present invention. By using address filtering, more address ranges may be tracked without a commensurate cost in area, power and delay for memory checking. Thus, for example, more snapshots, e.g., corresponding to multiple ranges for deeper levels of a call hierarchy may be tracked using a variety of filters and digests to give a conservative answer. In one embodiment, this is achieved by tracking the address of the first buffer to the last buffer. This range may, for example, correspond to a number of stack frames holding memory buffers for register save and restore in function calls, while filtering out memory requests corresponding to heap, static variables, file buffers, and so forth. In another embodiment, the filter may capture additional information to differentiate buffer accesses from local variable accesses, and filter local variable accesses to further reduce the number of accesses that are compared against tracked memory buffer ranges corresponding to in-memory register spill buffers. In at least one embodiment, one or more filters may be periodically reset, in conjunction with invalidating pending register restoration snapshots, or when no register restoration snapshots are active. In another embodiment, a range filter is employed in accordance with one or more known snoop filter architectures.

In one embodiment, the interference determination of transactional write sets to detect modifications of buffer memory for store/load instructions is used as a filter, and offending remote accesses are then compared against the exact buffer boundaries used in the core to check against interference from stores of the thread itself.

Figure 13A:
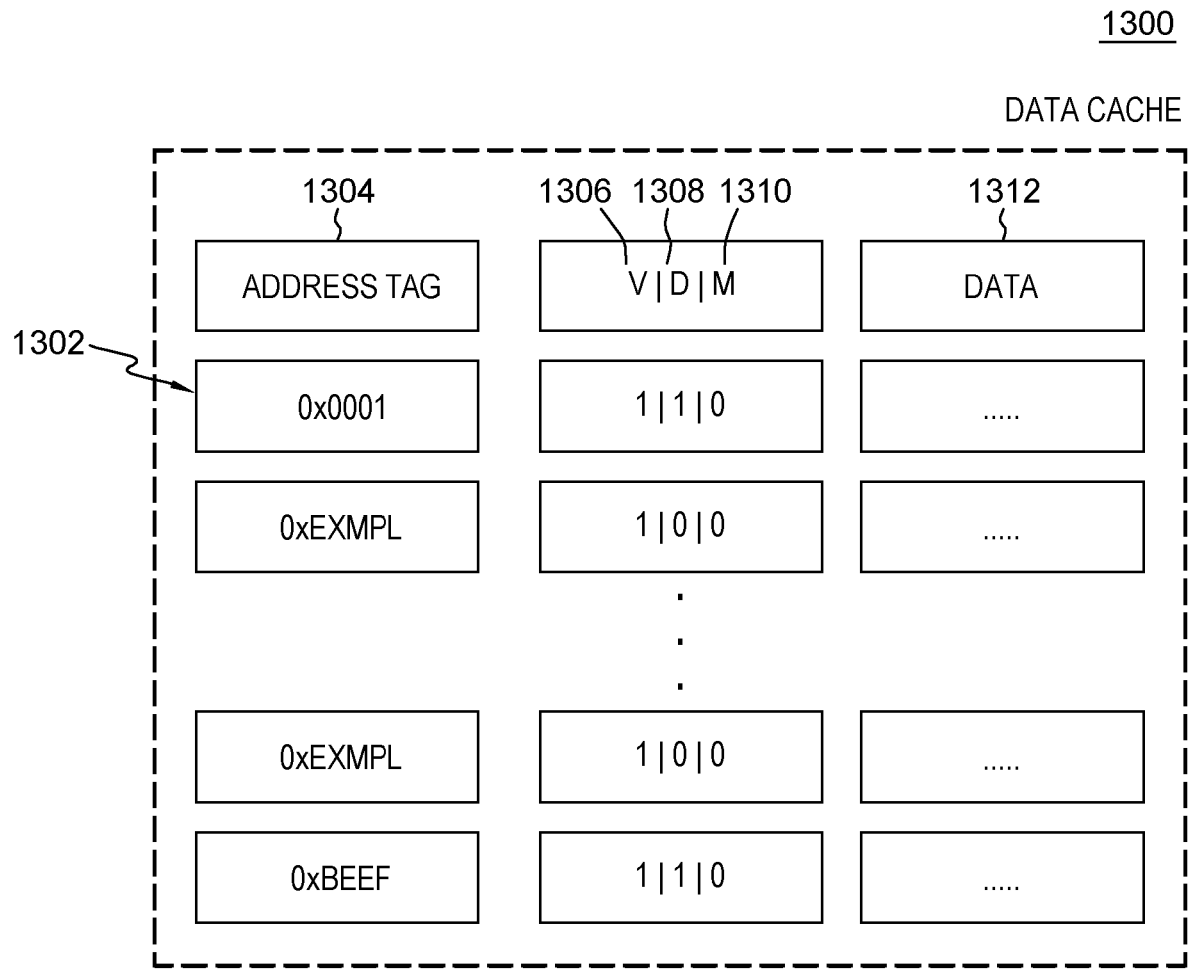
FIG. 13A depicts one example of entries in a data cache with associated indicators, in accordance with an aspect of the present invention.

In one particular example, as shown in FIG. 13A, a data cache 1300 includes a plurality of cache lines 1302, and each cache line 1302 (or in another embodiment, selected portions of cache lines) is marked. For instance, each cache line or a portion of a cache line in those embodiments that mark cache line portions has an address tag 1304 indicating the memory address to which the cache line or cache line portion corresponds; a validity (V) indicator 1306 indicating whether the cache line or portion is valid; a dirty (D) indicator 1308 indicating whether the data from the cache line or portion is to be written back to memory; and a marking (M) indicator 1310, in accordance with an aspect of the present invention, used to indicate whether the snapshot is valid for the cache line or cache line portion. Further, the cache line or cache line portion includes the data 1312.

Figure 13B:
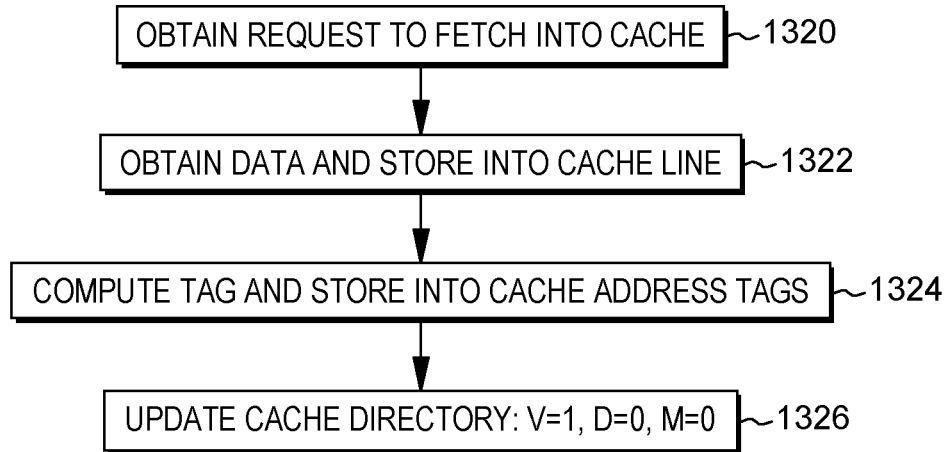
FIGS. 13B-13D depict examples of processing associated with the indicators depicted in FIG. 13A, in accordance with one or more aspects of the present invention.
Figure 13C:
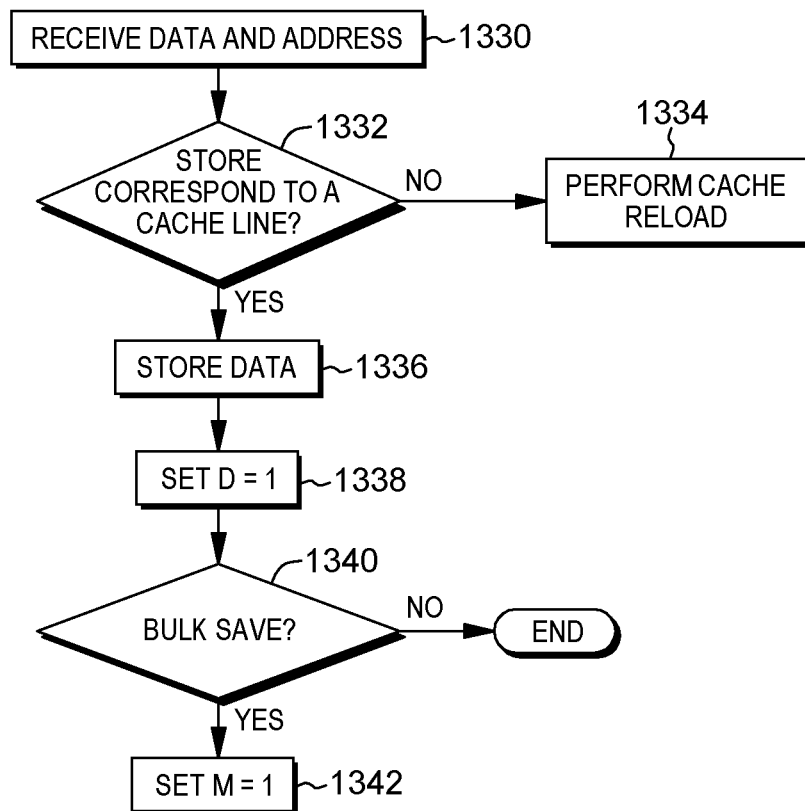
Figure 13D:
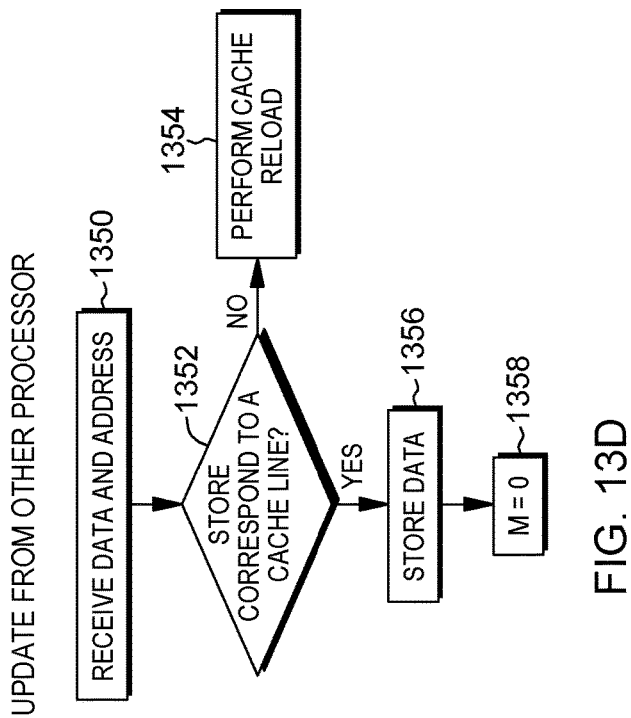

The various indicators, including valid indicator 1306, dirty indicator 1308 and marking indicator 1310 are set or reset, as described with the example techniques described with reference to FIGS. 13B-13D.

For instance, one example of updating the indicators during cache reload is described with reference to FIG. 13B. Initially, a request is obtained (e.g., received, provided, retrieved, have, determined, etc.) to fetch data from memory into a data cache, STEP 1320. Based on the request, data is obtained from memory and stored into a cache line, STEP 1322. An address tag is computed for the data obtained from memory and stored in the corresponding address tag field 1304, STEP 1324. Additionally, valid indicator 1306 is set to one, since the cache line is now valid; dirty indicator 1308 is set to zero, since the data was just loaded, and thus, not dirty; and marking indicator 1310 is set to zero, since registers have not been stored that have a corresponding snapshot, STEP 1326.

In addition to updating the indicators during a cache reload, the indicators are also updated during a store into the cache, as described with reference to FIG. 13C. Initially, data and an address are obtained (e.g., received, provided, retrieved, have, determined, etc.), STEP 1330. A determination is made as to whether the store corresponds to an existing cache line within the cache, INQUIRY 1332. If not, then the cache reload procedure of FIG. 13B is performed, STEP 1334. However, if the store does correspond to a cache line, then the data is stored, STEP 1336, and the corresponding dirty indicator is set to one, STEP 1338. Further, if this is a bulk save, e.g., a STMG instruction to spill a plurality of caller-saved or callee-saved registers to a stack frame, INQUIRY 1340, then the marking indicator is set to one, STEP 1342. Otherwise, it is zero.

Moreover, one or more of the indicators may be updated based on receiving an update request from another processor, as described with reference to FIG. 13D. Initially, data and a memory address are obtained (e.g., received, provided, retrieved, have, determined, etc.), STEP 1350. A determination is made as to whether the store corresponds to an existing cache line within the cache, INQUIRY 1352. If not, then the cache reload procedure of FIG. 13B is performed, STEP 1354. However, if the store does correspond to a cache line, then the data is stored, STEP 1356, and the marking indicator is set to zero, STEP 1358. The marking indicator is set to zero, since a write access from a remote processor may have modified the in-memory register buffer, thereby making the register snapshot stale with respect to the in-memory buffer.

In another embodiment, when a marker indicating the presence of a buffer in a cache line or a portion of a cache line is detected during a store into the cache, the request range may be compared against the tracked addresses for snapshots to determine whether a specific access interferes with a snapshot. In at least one embodiment, this reduces the number of snapshot invalidations when an update corresponds to a portion of a memory buffer's cache line that does not correspond to the memory buffer. In yet another embodiment, the cache directory or logic associated therewith may be used to identify specific snapshots of the plurality of active snapshots which correspond to a cache line to reduce the number of interference checks to be performed. In yet another embodiment, using marker bits as a filter to reduce the number of interference checks is used to filter updates from the local processor. Other possibilities also exist.

Figure 14A:
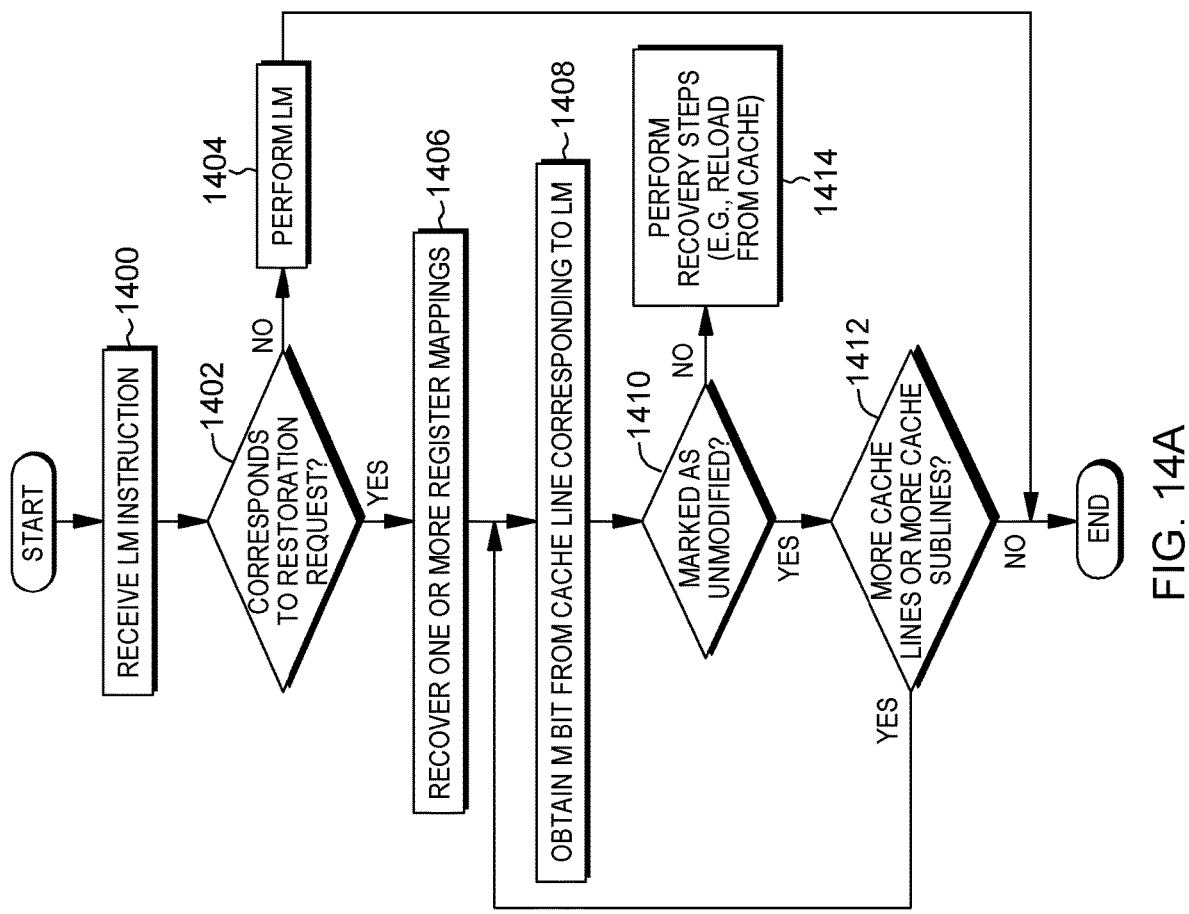
FIGS. 14A-14B depict examples of processing associated with register restoration, in accordance with one or more aspects of the present invention.

One or more of the above cache techniques work in conjunction with register restoration. One example of a register restoration technique is described with reference to FIG. 14A. Initially, a Load Multiple (LM) instruction (or similar instruction) is obtained (e.g., received, determined, retrieved, provided, have, etc.), STEP 1400. A determination is made as to whether the Load Multiple instruction corresponds to a restoration request, INQUIRY 1402. This may be determined by checking, for instance, the additional fields of the snapshot stack (e.g., the address field) to determine if registers that were previously stored are being restored. If the Load Multiple instruction does not correspond to a restoration request, then the load multiple operation is performed, STEP 1404. If the Load Multiple instruction does correspond to a restoration request, then one or more register mappings are recovered, STEP 1406. For instance, one or more snapshots are used to recover the specified registers. Thereafter, or in parallel, the marking indicator (M) is obtained from the cache line (or cache line portion) corresponding to the registers indicated by the load multiple, STEP 1408, and a determination is made as to whether the cache line is marked as unmodified, INQUIRY 1410. If it is marked as unmodified, then a further determination is made as to whether there are more cache lines or cache portions are to be processed, INQUIRY 1412. If so, processing continues to STEP 1408. Otherwise, the register restoration processing is complete.

Returning to INQUIRY 1410, if the marking indicator is marked as modified (e.g., M is set to 0), then recovery steps are performed (e.g., reload from the cache), STEP 1414. That is, the values are loaded from memory, replacing the values of a snapshot.

Figure 14B:
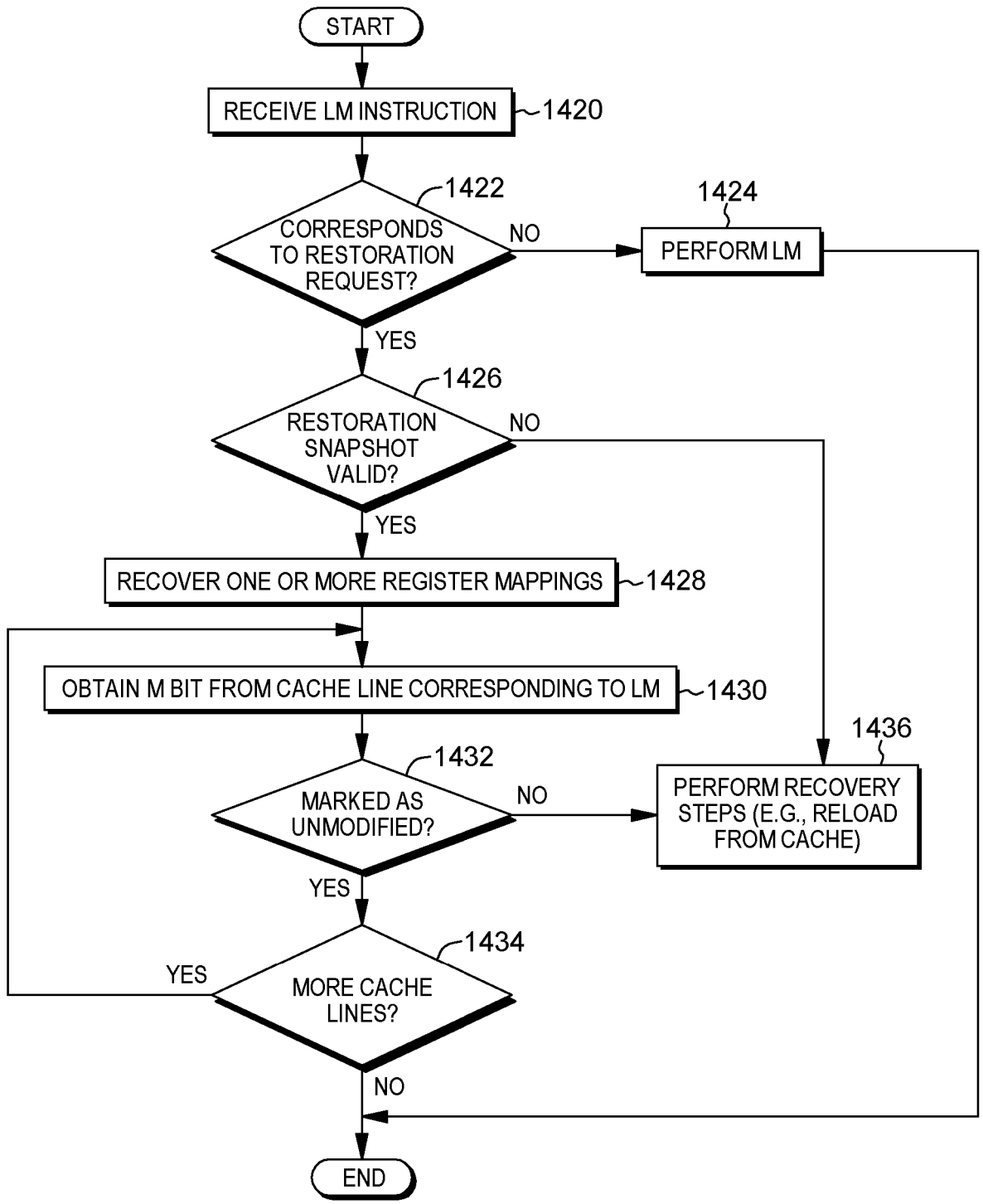

Another example of register restoration is described with reference to FIG. 14B. In this example, a check is made as to the validity of the snapshot to be used for restoration. For instance, a Store Multiple may have overwritten another Store Multiple. When this occurs, the first Store Multiple is no longer a valid restoration candidate for a Store Multiple/Load Multiple used for register restoration. To determine this, the snapshot stack may be traversed to determine if the current snapshot overlaps a previous snapshot in response to a store multiple request. In other embodiments, this check is performed for other memory update operations, or for other memory update operations when one or more filter criteria indicate that a check is to be performed. If a match is found, the entry in the stack of the previous snapshot is invalidated. Thus, in one embodiment, for each entry on the stack, if stack addresses on the snapshot overlap the current store request, the valid indicator for that snapshot stack entry is set to invalid. This indicator is then checked during restoration processing. One example of this processing is described with reference to FIG. 14B.

Initially, a Load Multiple instruction (or similar instruction) is obtained (e.g., received, retrieved, determined, provided, have, etc.), STEP 1420. A determination is made as to whether the Load Multiple instruction corresponds to a restoration request, INQUIRY 1422. This may be determined by checking, for instance, the additional fields of the snapshot stack (e.g., the address field) to determine if registers that were previously stored are being restored. If the Load Multiple instruction does not correspond to a restoration request, then the load multiple operation is performed by loading the plurality of registers to be loaded by the Load Multiple instruction from memory, STEP 1424. If the Load Multiple instruction does correspond to a restoration request, then a determination is made as to whether one or more restoration snapshots to be used are valid (i.e., to confirm that the in-memory buffer has not been overwritten), INQUIRY 1426. If the one or more valid indicators indicate that the one or more restoration snapshots are valid, then one or more register mappings are recovered, STEP 1428. For instance, one or more snapshots are used to recover the specified registers. Thereafter, or in parallel, the marking indicator (M) is obtained from the cache line (or cache line portion) corresponding to the registers of load multiple, STEP 1430, and a determination is made as to whether the cache line is marked as unmodified, INQUIRY 1432. If it is marked as unmodified, then a further determination is made as to whether there are more cache lines or cache portions are to be processed, INQUIRY 1434. If so, processing continues to STEP 1430. Otherwise, the register restoration processing is complete.

Returning to INQUIRY 1432, if the marking indicator is marked as modified (e.g., M is set to 0), then recovery steps are performed (e.g., reload from the cache), STEP 1436. That is, the values are loaded from memory, replacing the values of a snapshot.

In accordance with a further aspect, another mechanism for tracking modifications to memory includes using transactional memory hardware to track changes to memory. Transactional memory has the capability to track interference, to track access to a range of memory locations that correspond to transactional state, and that capability may be used to track whether the buffer corresponding to the in-memory image of the saved registers is being modified. The transactional memory facility may track whether an in-memory change affects a register included in a particular snapshot.

A capability is provided, in one aspect, for saving registers for transactional memory rollback recovery and function call register preservation using a shared register restore capability. The facility is initiated by a bulk-save indicating event, e.g. receiving a bulk-save indicating instruction. In one embodiment, a TBegin (begin transactional execution instruction) is a first indicating instruction, and a Store Multiple or Spill Multiple instruction is a second indicating instruction.

If a store multiple is received, in one embodiment, stores are immediately performed, but incremental register checkpointing is also performed. For Spill Multiple, only in-core checkpointing may be performed, in one example.

Based on receiving an indicating event, a test is made as to whether the present request is compatible with pre-existing requests. When compatibility is determined, processing proceeds. Otherwise, if the initial request corresponds to a transactional memory rollback request, a bulk save is directly performed, and in-core register preservation is used exclusively for transactional memory. If the first request is a register save request, then in-core register preservation for a function call bulk restore is terminated, and transactional memory saving is initiated.

When a restore event occurs, the subset of tracked registers which have been saved are restored. In one embodiment, only modified registers are saved. In another embodiment, all tracked registers are saved.

In accordance with one embodiment, register restoration is implemented as a modified transactional execution register rollback operation. For instance, when a bulk store is identified, a snapshot is made of the registers to be spilled into transactional memory (TM) register restoration state. Further, in one example, when a bulk restore is identified, the register snapshot is restored in a manner otherwise restored during a transaction abort.

In one example, when multiple register snapshots are not supported, a previous TM register snapshot is discarded when a new bulk store is identified, and the most recent bulk store can be received using the TM register restoration. In another embodiment, e.g., an embodiment supporting nested transactions, multiple spill snapshots are stored in register restoration snapshots corresponding to multiple nested transactions.

When a transaction is encountered, and storage for another register recovery state is available (e.g., when nested transactions are supported), a next register recovery level is used. Otherwise, a previous register snapshot corresponding to a bulk store (e.g., either a most or least recent snapshot) is invalidated, to save a TM register restoration state instead. In another embodiment, a nested transaction may be flattened, into an outer transaction to avoid deallocating a bulk store snapshot.

In one embodiment, when the TM facility is enabled, using the TM register recovery mechanism for spill register restoration is disabled. Other variations are possible.

In one embodiment, a transaction rollback, transaction failure, transaction interference, transaction abort, or other operation terminating and invalidating an operation triggers a restore event, when the initiating event is a TBegin. Further, a Load Multiple or Reload multiple is considered a restore event, when the initiating event is a Store Multiple, Spill Multiple request, or similar request.

Tracking of state modification ends, and a state preservation operation is terminated either when a transaction fails (a transaction rollback, transaction failure, transaction interference, transaction abort, or other operation terminating and invalidating an operation) or succeeds (Tend-transaction end occurs), when bulk saving has been initiated by TBegin. A register bulk reload is performed when the register bulk save has been initiated by a Store Multiple, Spill Multiple, or similar request.

In at least one instance, the saving of registers occurs incrementally, and the incrementally saved registers may be restored.

Further details relating to transactional memory and register restoration are described with reference to FIGS. 15A-15E.

Figure 15C:
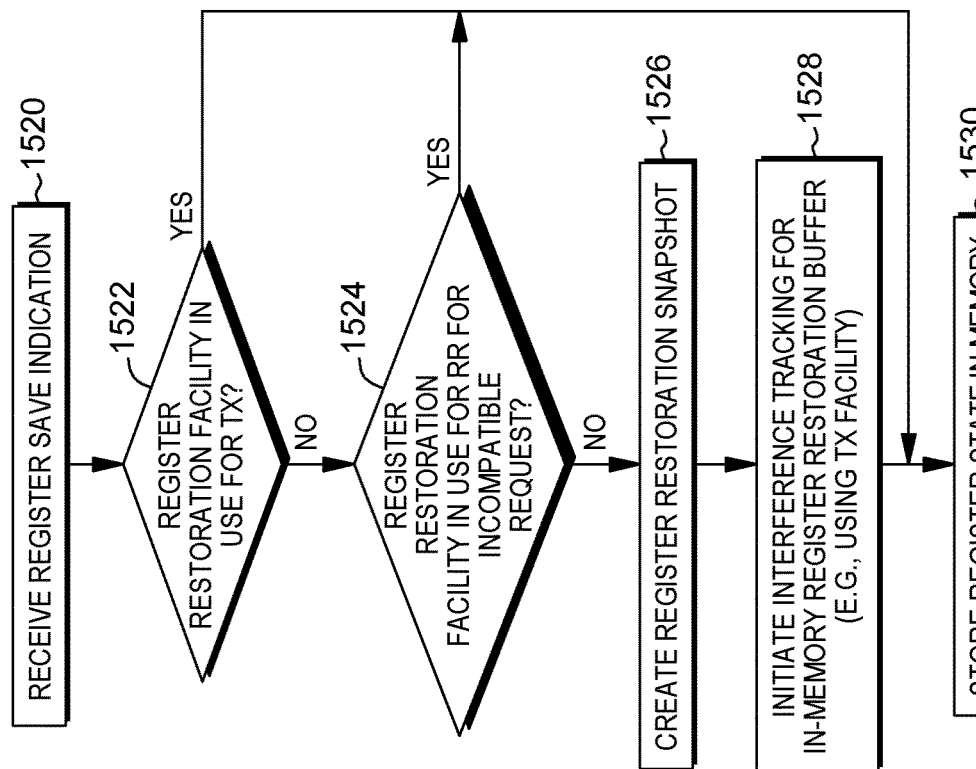
FIGS. 15C-15E depict aspects of processing associated with transactional memory and restoration, in accordance with one or more aspects of the present invention.
Figure 15A:
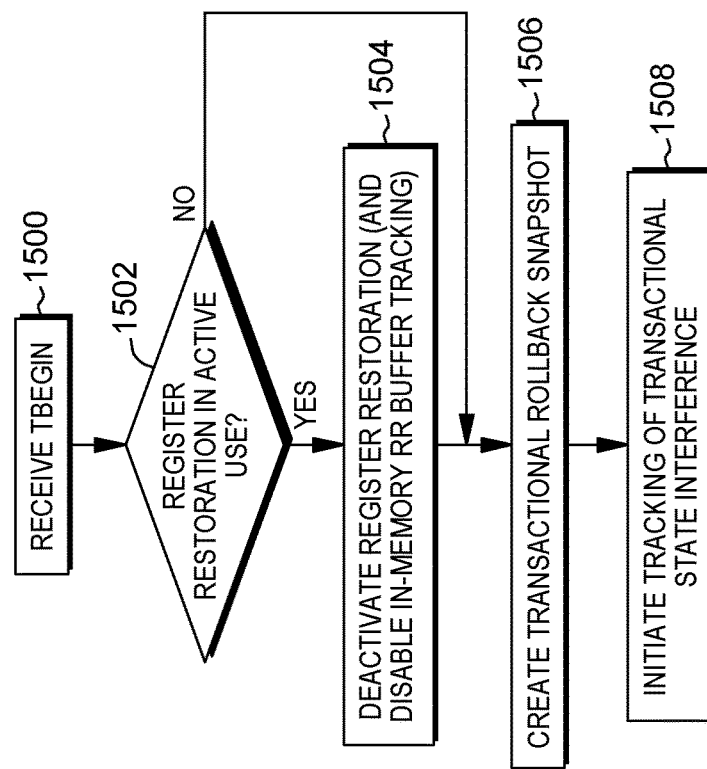
FIG. 15A depicts an example of processing associated with transactional memory and restoration, in accordance with one or more aspects of the present invention.
Figure 15B:
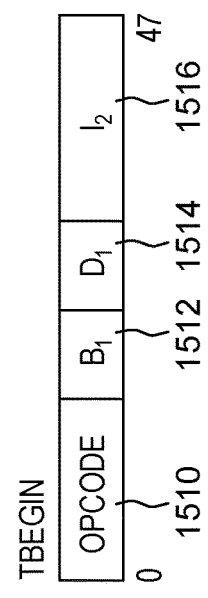
FIG. 15B depicts one example of a Transaction Begin instruction, in accordance with one or more aspects of the present invention.

Referring initially to FIG. 15A, processing associated with initiating a snapshot based on a TBegin instruction is described. In one embodiment, a TBegin instruction is obtained (e.g., received, provided, determined, retrieved, have, etc.), STEP 1500. The TBegin instruction initiates a transaction, and, in one example, as shown in FIG. 15B, includes, for instance, an operation code (opcode) field 1510 that includes an opcode specifying a transaction begin operation; a base field ($B_1$) 1512; a displacement field ($D_1$) 1514; and an immediate field ($I_2$) 1516.

When the $B_1$ field is nonzero, the contents of the general register specified by $B_1$ 1512 are added to $D_1$ 1514 to obtain a first operand address.

When the $B_1$ field is nonzero, the following applies, in one example:

When the transaction nesting depth is initially zero (transactions may be nested), the first operand address designates the location of a 256 byte transaction diagnostic block, called a TBEGIN-specified TDB into which various diagnostic information may be stored if the transaction is aborted.

The bits of $I_2$ field 1516 are defined as follows, in one example:

General Register Save Mask (GRSM): Bits 0-7 of the $I_2$ field contain the general register save mask (GRSM). Each bit of the GRSM represents an even-odd pair of general registers, where bit 0 represents registers 0 and 1, bit 1 represents registers 2 and 3, and so forth. When a bit in the GRSM of the outermost TBegin instruction is zero, the corresponding register pair is not saved. When a bit in the GRSM of the outermost TBegin instruction is one, the corresponding register pair is saved in a model dependent location that is not directly accessible by the program.

If the transaction aborts, saved register pairs are restored to their contents when the outermost TBegin instruction was executed. The contents of all other (unsaved) general registers are not restored when a transaction aborts.

The general register save mask is ignored on all TBegins except for the outermost one.

Allow AR Modification (A): The A control, bit 12 of the I₂ field, controls whether the transaction is allowed to modify an access register.

Allow Floating Point Operation (F): The F control, bit 13 of the I₂ field, controls whether the transaction is allowed to execute specified floating point instructions.

Program Interruption Filtering Control (PIFC): Bits 14-15 of the I₂ field are the program interruption filtering control (PIFC). The PIFC controls whether certain classes of program exception conditions (e.g., addressing exception, data exception, operation exception, protection exception, etc.) that occur while the CPU is in the transactional execution mode result in an interruption.

The I₂ field may include more, fewer or different controls than described herein.

Returning to FIG. 15A, based on obtaining the TBegin instruction, a determination is made as to whether a register restoration facility, e.g., the register restoration snapshot facility, is in active use, INQUIRY 1502. This may be determined based on, for instance, a facility indication being set to a particular value (e.g., 1) or by checking whether such snapshots are in use, etc. If the facility is in active use, register restoration is deactivated and in-memory register restoration buffer tracking is disabled, STEP 1504. This is because the TBegin takes priority, in this example. Thereafter, or if the register restoration facility is not active, a transactional rollback snapshot is created, STEP 1506. For instance, a snapshot of the registers to be saved as indicated by the TBegin instruction (e.g., specified by GRSM) is taken. Further, the tracking of transactional state interference is initiated, STEP 1508. For instance, transactional state buffer and TBegins are tracked.

In a further aspect, a snapshot may be taken based on a register save request, as described with reference to FIG. 15C. A register save indication (e.g., Store Multiple) is obtained (e.g., received, provided, have, retrieved, determined, etc.), STEP 1520. A determination is made as to whether the register restoration facility is in use for transactional execution (e.g., by checking an indicator), INQUIRY 1522. If it is in use for transactional execution, then the register state is stored in memory, STEP 1530. However, if the register restoration facility is not in use for transactional execution, then a further determination is made as to whether the register restoration facility is in use for register restoration of incompatible requests (e.g., of different registers), INQUIRY 1524. If it is in use for incompatible requests, then processing continues to STEP 1530, in which the register state is stored in memory.

However, if the register restoration facility is not in use for transactional execution or for register restoration for incompatible requests, a register restoration snapshot is created (e.g., a snapshot of the registers specified by the Store Multiple), STEP 1526, and interference tracking for in-memory register restoration buffers is initiated using, for instance, logic of the transactional facility adapted to identify interference with a transaction's transactional state in memory, STEP 1528. Further, the register state is stored in memory, STEP 1530.

In accordance with the use of the transactional state interference tracking logic for tracking changes to a memory buffer in accordance with an aspect of the present invention, the in-memory register buffer of STEP 1530 is tracked for interference by the interference checking logic. Consequently, when a remote access to the in-memory buffer containing a copy of the saved registers is received, interference is registered. In accordance with one aspect of the present invention, when interference is registered, no rollback occurs when the interference tracking logic is used to determine modification of register save buffers. In accordance with this aspect of the present invention, when interference is detected, the in-processor register snapshot is not used when the registers are being restored, and the registers are instead retrieved from the in-memory register save buffer. In accordance with at least one embodiment, additional tracking is performed to track in-memory register save buffer modification by processor-local memory write instructions, e.g., by comparing writes to the address range of one or more memory buffers in accordance with one aspect of the present invention.

Figure 15D:
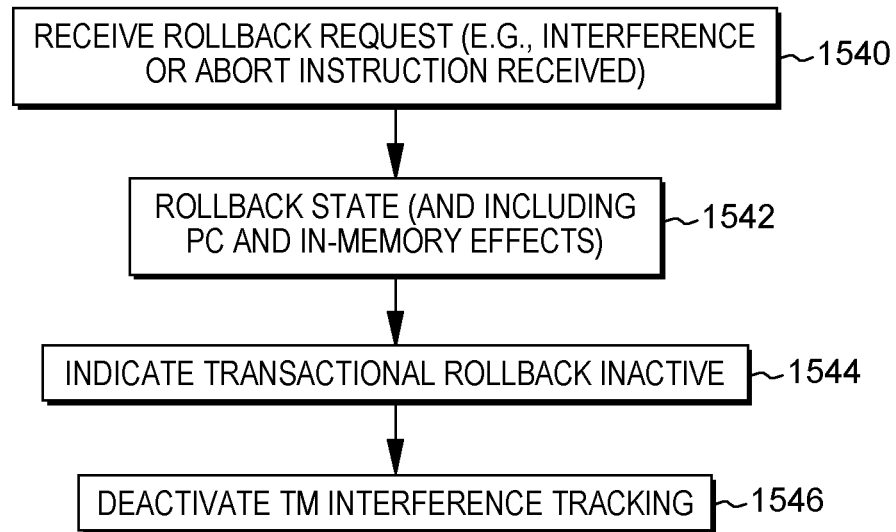

Additionally, in one aspect, a snapshot is recovered based on a transactional rollback, as described with reference to FIG. 15D. A rollback request (e.g., responsive to interference with a transaction's transactional state or execution of a Transaction Abort (TAbort) instruction) is obtained (e.g., received, have, provided, retrieved, determined, etc.), STEP 1540. The state is rolled back to the starting point of the transaction, STEP 1542. In accordance with this rollback of the transaction, the register state is restored to the state at the beginning of the transaction (i.e., where the TBegin was executed to create the rollback snapshot for transactional execution in accordance with FIG. 15A). Performing a transactional rollback includes, for instance, restoring a program counter and canceling the in-memory effects of an aborted transaction in accordance with the known implementation of transactional memory. Transactional rollback is indicated as inactive, STEP 1544, and transactional memory interference tracking is deactivated, STEP 1546.

Figure 15E:
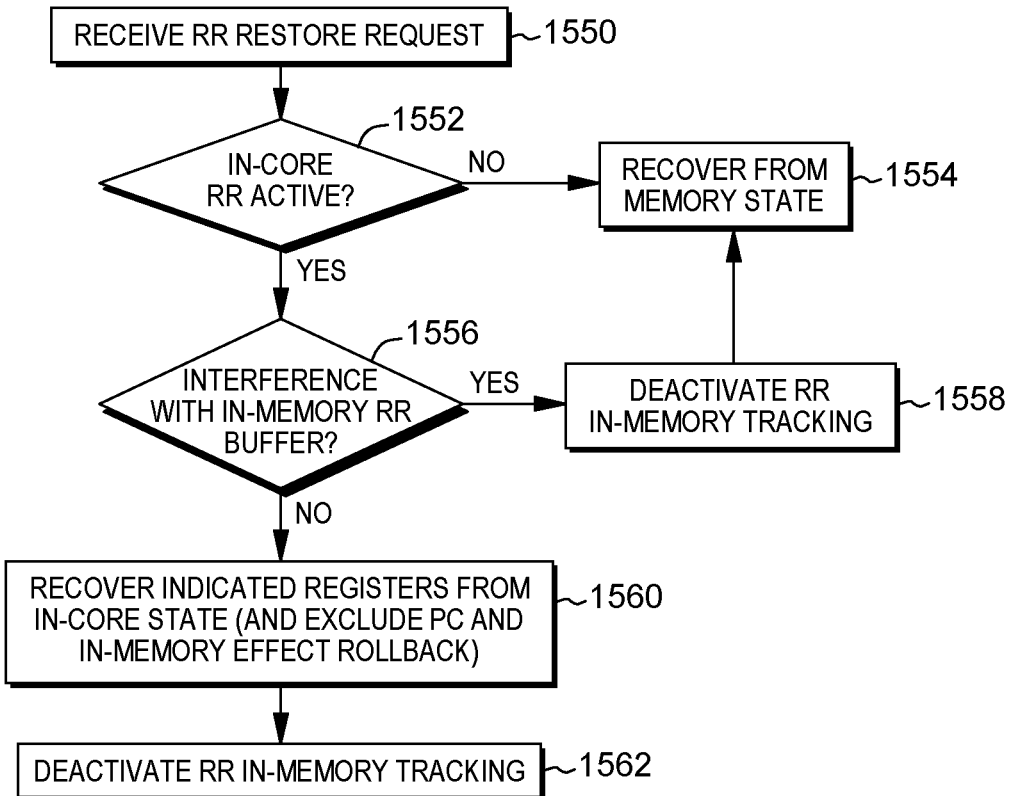

Further, in one aspect, a snapshot is recovered based on a register restoration restore request, as described with reference to FIG. 15E. A register restoration restore request (e.g., Load Multiple) is obtained (e.g., received, provided, have, etc.), STEP 1550, and a determination is made as to whether an in-core register restoration facility is active, INQUIRY 1552. If it is not active, then recovery is performed from memory state, STEP 1554. However, if in-core register restoration is active, then a further determination is made as to whether there is or has been interference with an in-memory register restoration buffer, INQUIRY 1556. If there is interference, then register restoration in-memory tracking is deactivated, STEP 1558, and processing continues to STEP 1554.

Should there be no interference with the in-memory register restoration buffer, the indicated registers are recovered from in-core state (e.g., a snapshot), STEP 1560. In one example, the program counter and in-memory effect rollback are excluded. Register restoration in-memory tracking is deactivated, STEP 1562.

As described above, the transactional memory facility may be used to track changes. In one aspect, transactional state is re-used by mirroring the actions used for transactional execution to achieve the goals of register restoration; however, transactional rollback processing and register restoration are triggered by different instructions; they are mutually exclusive in that when one is active for restoration, the other is not; and register restoration (e.g., based on a LM) does not recover the program counter or undo in-memory changes, as does transactional rollback processing, as examples.

In one or more further aspects, tracking of memory changes is performed in conjunction with a snapshot stack. As described above, a snapshot stack provides a list of buffers since each entry includes an address or address range of its buffer. Thus, each time there is a write, the address or address range of the write is compared against the address or address range of the buffers in the stack. In accordance with at least one embodiment, the snapshot stack used for tracking memory save changes corresponds to and is shared with a snapshot stack in accordance with FIG. 6 used for storing snapshot IDs created by register save operations for corresponding register restore operations in accordance with aspects of the present invention. Examples of various techniques used to track memory changes are described with reference to FIGS. 16A-16D.

Figure 16A:
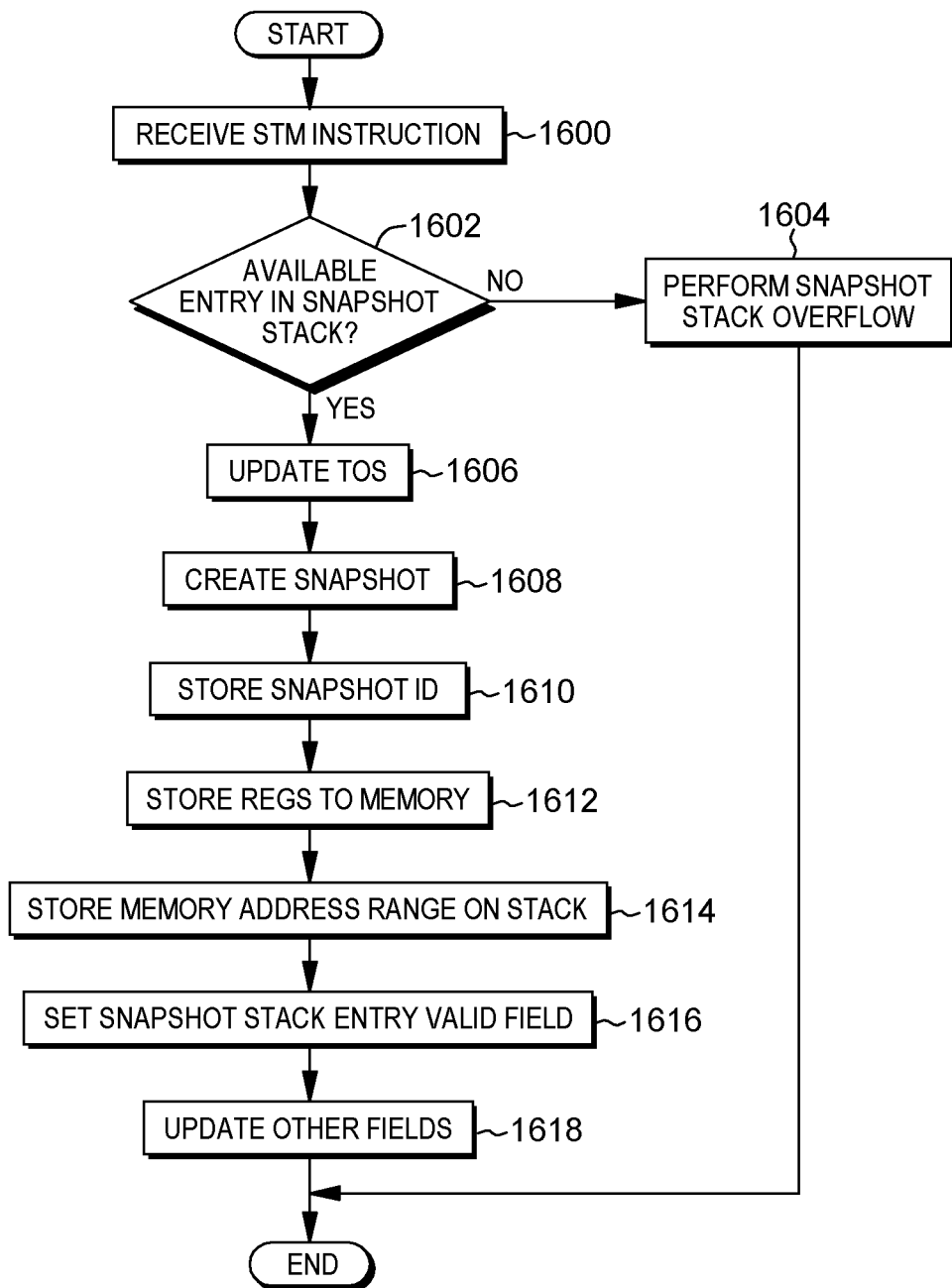
FIGS. 16A-16D depict examples of techniques used to track memory changes, in accordance with one or more aspects of the present invention.

A first technique described with reference to FIG. 16A relates to taking a new snapshot. For instance, in one embodiment, a Store Multiple (STM) instruction (or similar instruction) is obtained (e.g., received, provided, have, retrieved, determined, etc.) by the processor, STEP 1600, and a determination is made as to whether there is an available entry in the snapshot stack, INQUIRY 1602. If there is no available entry, then a snapshot stack overflow is performed, STEP 1604. For example, an error is indicated. If there is an available entry, the top-of-stack pointer is updated (e.g., incremented by 1), STEP 1606.

Further, a snapshot is created, STEP 1608, and a snapshot identifier is stored in the entry, STEP 1610. Additionally, the contents of the registers specified by the Store Multiple are stored in memory, STEP 1612, and the memory address range of where the contents are stored is included in the entry (e.g., address), STEP 1614. Further, the valid indicator is set (e.g., to 1) in the entry, STEP 1616, and other fields, if any, are also updated, STEP 1618.

In addition to the above, a technique for tracking changes if executing an individual store request, is described with reference to FIG. 16B. In this embodiment, for each store of this processor, a check of the stack is performed to determine whether there is any overlap. Initially, a memory write request with a store address is obtained (e.g., received, is provided, have, determined, retrieved, etc.) by this processor, STEP 1620. Then, for each entry in the snapshot stack, STEP 1622, a determination is made as to whether the address range for this entry matches the store address, INQUIRY 1624. If so, then the valid bit for the current entry is reset (e.g., to zero), STEP 1626. Thereafter, or if the address range for this entry does not match the store address, a check is made as to whether there are more entries in the snapshot stack to be processed, INQUIRY 1628. If there are more entries, then processing continues to STEP 1622. Otherwise, processing ends.

Figure 16C:
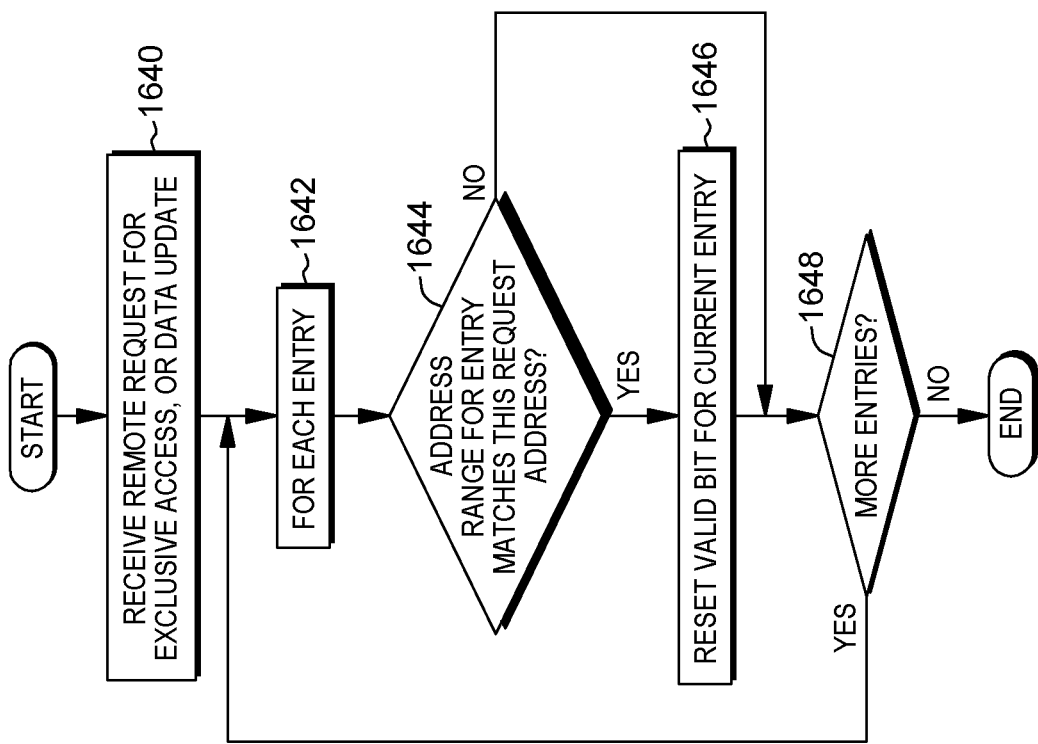

Similarly, referring to FIG. 16C, checks are performed for write requests received from other processors. Initially, a processor obtains (e.g., received, provided, retrieved, determined, have, etc.) a remote memory write request with a store address from another processor requesting exclusive access or a data update, STEP 1640. Then, for each entry in the snapshot stack, STEP 1642, a determination is made as to whether the address range for this entry matches the address of the store request, INQUIRY 1644. If so, then the valid bit for the current entry is reset (e.g., to zero), STEP 1646. Thereafter, or if the address range for this entry does not match the address of the store request, a check is made as to whether there are more entries in the snapshot stack to be processed, INQUIRY 1648. If there are more entries, then processing continues to STEP 1642. Otherwise, processing ends.

Figure 16B:
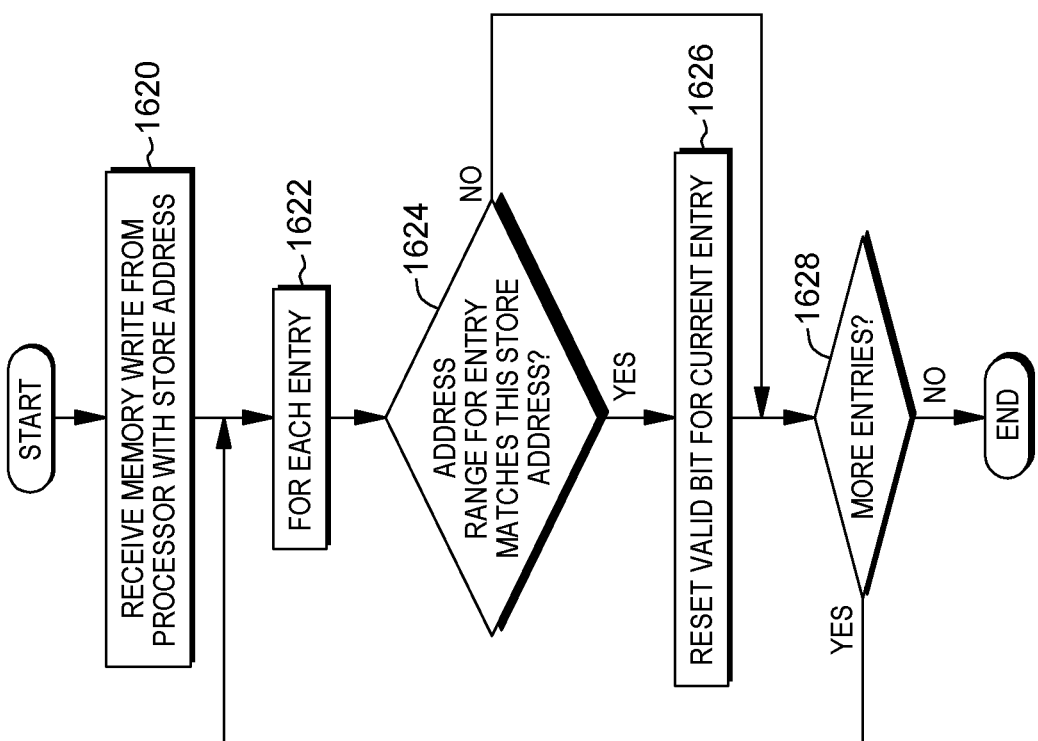

While the techniques of FIGS. 16B and 16C are described with respect to checking the addresses of all entries in a snapshot stack, in optimized embodiments, the number of writes to be compared and entries on the snapshot stack may be reduced to reduce the cost of performing the test for snapshot invalidation. For example, a variety of filtering techniques, such as snoop filters, are to be compared against the snapshot stack entries. Some example filters may be range filters, filtering by way of mark bits associated with a data cache, e.g., in conjunction with a cache in accordance with FIG. 13A, and so forth. In another optimized embodiment, a subset of stack entries may be identified, e.g., by determining which entries are to be tested based on an address received. In one such embodiment, snapshot entries may have entry indicators associated to cache lines containing a corresponding memory buffer.

Figure 16D:
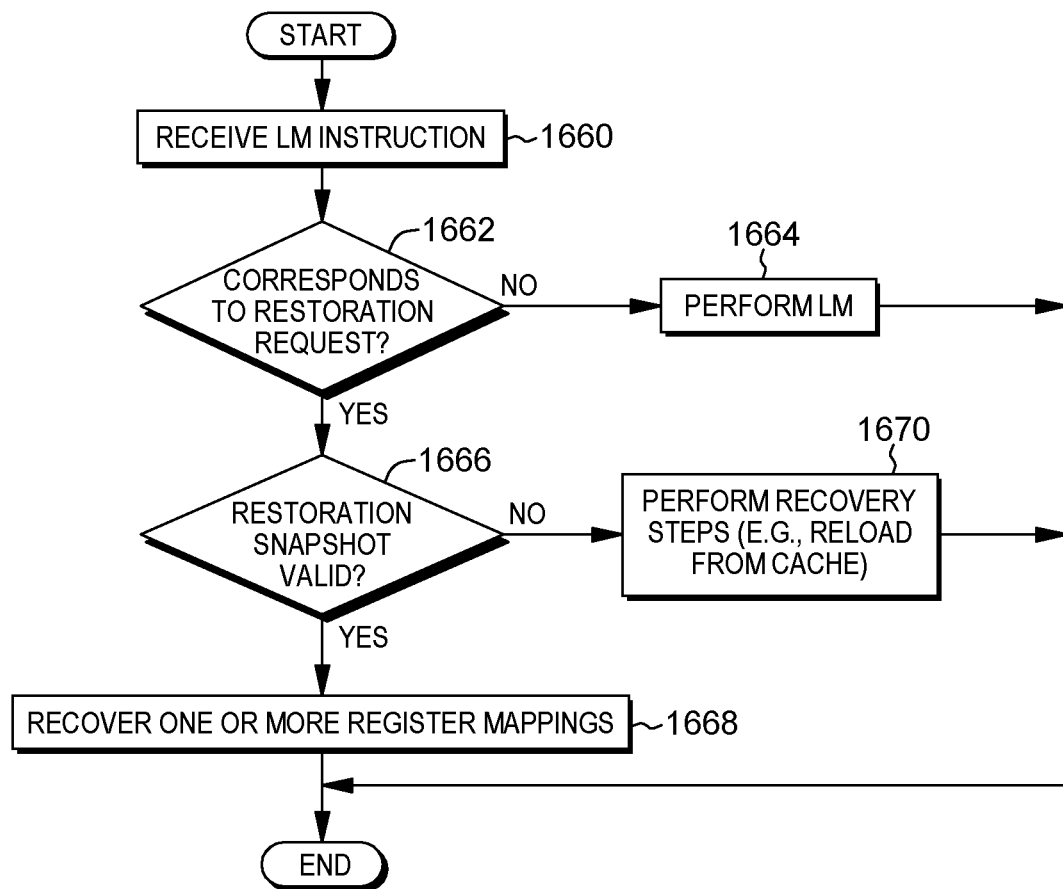

In a further embodiment, a technique for performing register restoration based on receipt of a bulk restore is described with reference to FIG. 16D. Initially, a Load Multiple (LM) instruction or similar instruction is obtained (e.g., received, provided, retrieved, have, determined, etc.) by the processor, STEP 1660. The processor obtaining the request determines whether the load multiple operation corresponds to a restoration request, INQUIRY 1662. If it does not correspond to a restoration request, then the load multiple operation is performed, STEP 1664. However, if the load multiple operation corresponds to a restoration request, then a determination is made as to whether the corresponding restoration snapshot is valid, INQUIRY 1666. If it is valid, then one or more register mappings are recovered using the snapshot, STEP 1668. If it is not valid, the recovery is performed using another technique, such as loading the values from a memory buffer, either from a cache or system memory, STEP 1670.

Although various embodiments and techniques are provided herein for tracking memory changes, other variations, embodiments and/or techniques may be provided without departing from a spirit of aspects of the present invention.

In accordance with another aspect of the present invention, a capability is provided to manage the losing of a portion of a snapshot. Register restoration from in-core values represents a technique to recover values from in-core data stores. In one example, these data stores are shared with micro-architectural structures used to implement other processor mechanisms (e.g., branch misprediction recovery and precise exceptions). Examples of the in-core data stores are recovery files and register rename maps (e.g., snapshots). However, in one embodiment, not all values can be restored. For example, some registers may no longer be available to recover from, because they have been reallocated to hold new architected values. In one embodiment, values that have been overwritten are tracked, e.g., by allocation time tracking or tracking liveness.

In one example, for the last allocation (or in another embodiment, write time) time tracking, each physical register is associated with a time when it was last allocated (written) to hold an architected value. Then, if that allocated time (tag) is later than the time (tag) of the created restore point, the value is not available.

In a further embodiment, a bitmap of all (or a subset of) values is created, or a register rename map is updated. Each time a register becomes unavailable, it is removed from a bit map, or a register rename map, so that during recovery, the unrestorable registers are known. In one embodiment, the bit map or register rename map corresponds to a register restoration snapshot.

In accordance with an aspect of the present invention, there is provided a hybrid technique for register restoration. Register restoration from in-core values is provided when in-core values can be determined to be available, in accordance with a liveness/availability tracking mechanism. The remaining values are loaded from memory.

Figure 17:
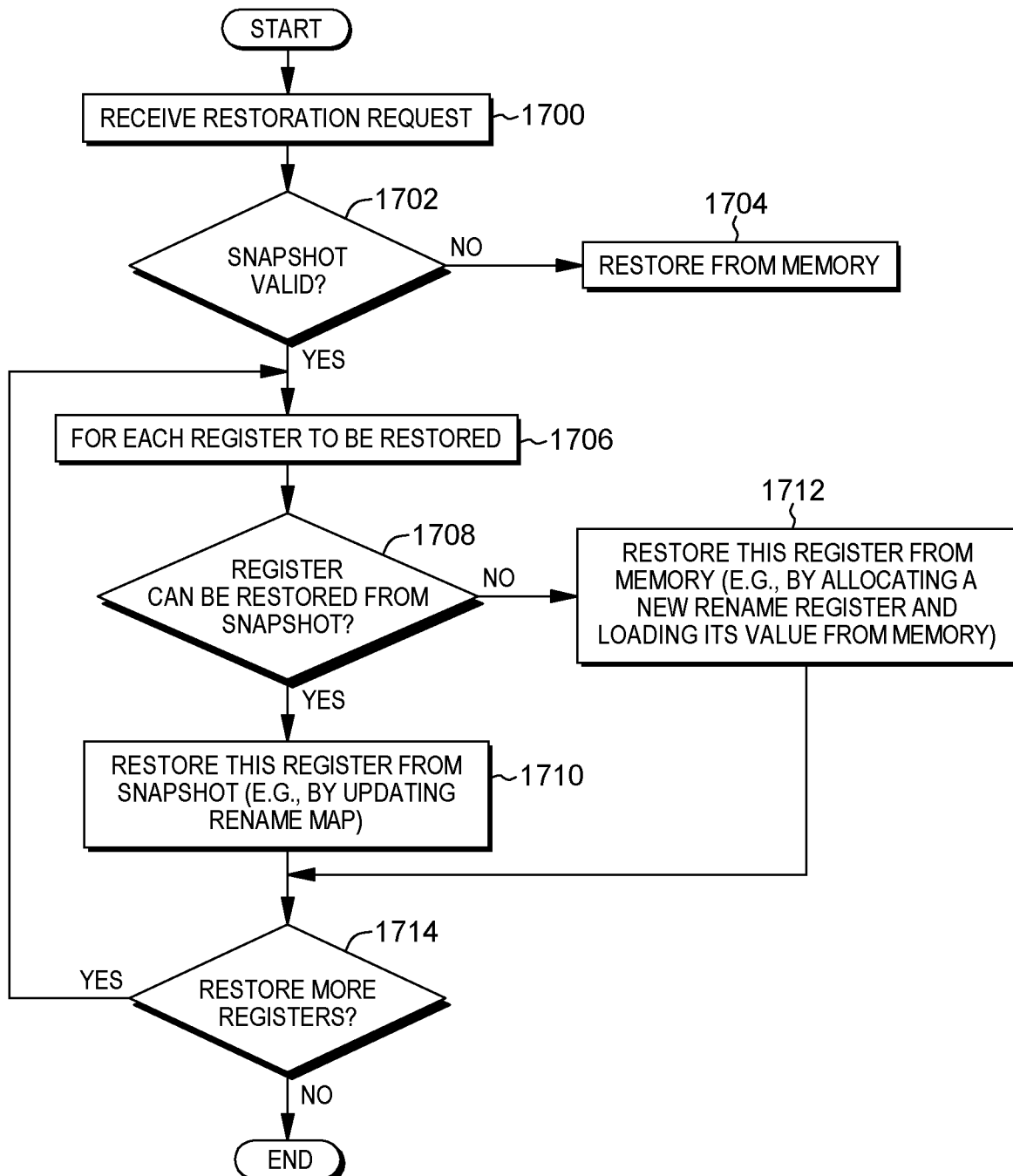
FIG. 17 depicts one example of handling a restoration request, in accordance with an aspect of the present invention.

One embodiment of handling a restoration request, in accordance with an aspect of the present invention, is described with reference to FIG. 17. Initially, a restoration request (e.g., a Load Multiple instruction) is obtained (e.g., received, provided, retrieved, determined, have, etc.), STEP 1700, and based thereon, the processor determines whether the snapshot corresponding to the registers to be restored is valid, INQUIRY 1702. If the snapshot is invalid, then the values are restored from memory, STEP 1704. However, if the snapshot is valid, for each register to be restored, STEP 1706, a determination is made, e.g., via time tracking, a bit map, etc., as to whether the particular register can be restored from the snapshot, INQUIRY 1708. If the register can be restored from the snapshot, then it is restored from the snapshot, by, for instance, updating a rename map, STEP 1710. However, if the register cannot be restored from the snapshot, then the register is restored from memory, e.g., by allocating a new rename register to the corresponding architected register and loading its value from memory, STEP 1712.

In one embodiment, a determination is made as to whether there are more registers to be restored, INQUIRY 1714. If there are one or more registers to be restored, processing continues to STEP 1706.

As described above, in this aspect of restoring registers, if an in-core value exists, the in-core value is retrieved, and if the in-core value does not exist, the value is loaded from memory.

Register rename restoration captures processor state for later restoration based on explicit or inferred restoration point indicators (e.g., Spillm instruction, Store Multiple instruction, Store Multiple instructions using one of a well-defined base register, such as a frame pointer or stack pointer, etc.). Further, register restoration is performed upon an explicit or an inferred restoration request (e.g., Reloadm instruction, Load Multiple instruction, Load Multiple instructions using one of a well-defined base register, such as a frame pointer or stack pointer, etc.).

A restore point used by one application, however, may be incorrectly used by another application after a context switch. In particular, this may even occur when the identification of snapshot locations identify a particular binary, e.g., even using detailed fingerprints of binaries, as multiple instances of the same binary or library may be executing, or a fingerprint may be matching, and a restoration point from a function in one context may be used to perform restoration in the function of another process of the same binary or library matching the fingerprint. Thus, in accordance with an aspect of the present invention, an explicit and/or an inferred context switch (e.g., switch from one application or function to another application or function, etc.) cognizance is included within a processor. Based on detection of a possible context switch, all or a subset of restoration points are invalidated, in one embodiment.

In one example, an invalidation instruction is provided that is used to invalidate one or more restoration points, e.g., as part of a context switch routine. In one embodiment, this instruction is executed by an operating system's context switch code. In another embodiment, based on a permission level changing indicating a switch to another application module (e.g., the kernel), and thus, the possible future switch to another application, at least one restoration point is invalidated. In a further embodiment, this does not occur so as to allow register restoration points to be used in the presence of functions which make system calls, when such system calls may be short, e.g., the POSIX getpid system call).

In yet a further embodiment, a change of a value in a register indicative of a process (e.g., one or both of LPID (logical partition id) and PID (process id)) is used to identify a task switch. In another embodiment, register snapshots may be associated to indicia values indicative of a particular process, and an indicia match between the indica associated with a snapshot ID and the indicia of a current process requesting register restoration is to be confirmed before restoring registers using a register restoration snapshot. A variety of indicia may be used in embodiments, such as the LPID and PID in one example embodiment.

Moreover, in one embodiment, the invalidation instruction may also be used for non-traditional control flow in programs, e.g., for setjump/longjump handling, or C++/Java structured exception processing. Other examples also exist.

Further details regarding example techniques for recognizing a context switch and invalidating one or more snapshots (or portions thereof) are described below with reference to FIGS. 18A-18C.

Figure 18A:
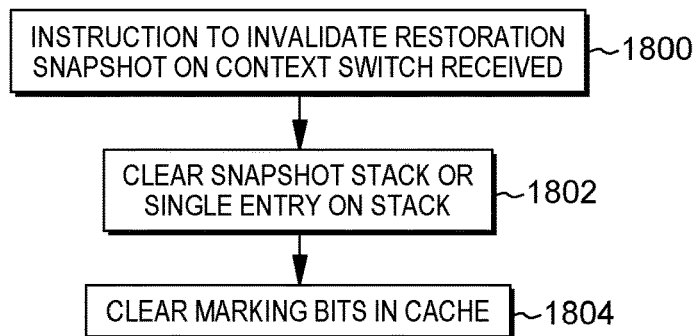
FIGS. 18A-18C depict examples of processing associated with context switches, in accordance with one or more aspects of the present invention.

In the example of FIG. 18A, an invalidate restoration snapshot instruction is used. This instruction is, for instance, an architected instruction having an operation code indicating it is an invalidate restoration snapshot instruction, and one or more fields used to indicate or determine one or more snapshots to be invalidated. Since this is a new instruction, the operating system, in one example, is modified to recognize and use the instruction.

Referring to FIG. 18A, the processor obtains (e.g., received, provided, retrieved, determined, have, etc.) an invalidate restoration snapshot instruction, STEP 1800. This instruction may be initiated based on determining a context switch, as described herein. Based on obtaining the instruction, the processor clears at least one entry on the snapshot stack based on an indication by the instruction of the one or more snapshots to be invalidated, STEP 1802. Additionally, in one example, one or more of the marking bits in the cache entries corresponding to the addresses indicated in the one or more snapshots that are invalidated are cleared (e.g., set to zero), STEP 1804.

Figure 18B:
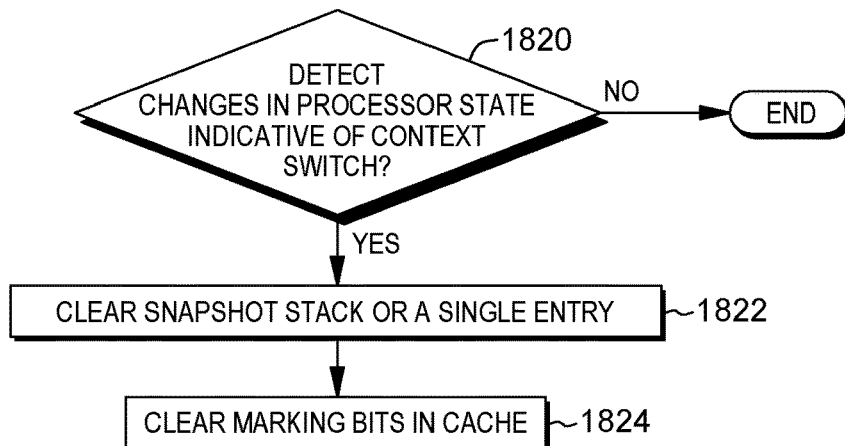
Figure 18C:
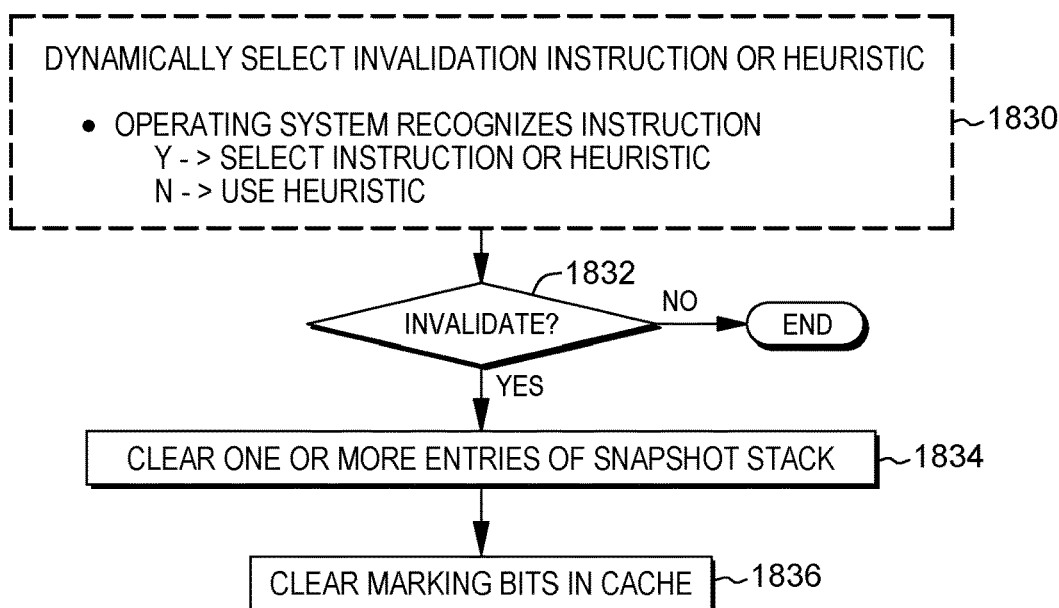

In FIG. 18B, instead of using an architected instruction that requires an update of the operating system, heuristics are used to determine whether there is a context switch, and therefore, one or more snapshots are to be invalidated. Referring to FIG. 18B, initially, a determination is made as to whether the processor detects changes in the processor state that are indicative of a context switch, INQUIRY 1820. For instance, has a program status word (PSW) changed or has the pointer to address translation tables changed, both of which may be indicating a context switch. If a context switch is indicated by one of these mechanisms or another mechanism, the processor clears at least one entry on the snapshot stack of the one or more snapshots to be invalidated, STEP 1822. Additionally, in one example, one or more of the marking bits in the cache entries corresponding to the addresses indicated in the one or more snapshots that are invalidated are cleared (e.g., set to zero), STEP 1824. Otherwise, if a context switch is not indicated, this processing ends.

In yet a further embodiment, the use of the invalidation instruction or heuristics may be dynamically selected by the processor. Referring to FIG. 18C, the processor dynamically selects either the invalidate restoration snapshot instruction or the heuristic technique for determining whether there has been a context switch, STEP 1830. For instance, if the operating system is at a version level that does not recognize such an instruction, then the heuristic approach is selected. However, if the operating system does recognize the instruction, then it may wait for issuance of the instruction or use heuristics to determine if a snapshot is to be invalidated. If it is determined that invalidation is to be performed, either by receiving the instruction or heuristically, INQUIRY 1832, then the processor clears at least one entry on the snapshot stack to be invalidated, STEP 1834. Additionally, in one example, one or more of the marking bits in the cache entries corresponding to the addresses indicated in the one or more snapshots that are invalidated are cleared (e.g., set to zero), STEP 1836. Otherwise, if a context switch is not indicated, this processing ends.

In one aspect, register preservation occurs incrementally for function call bulk state preservation, and registers are not saved to memory immediately upon receiving, for instance, a register Spill Multiple instruction. Correspondingly, registers are saved when in-core preservation is terminated due to, e.g., a switch to transactional memory preservation. This may be implemented, for instance, using a state machine of transitions.

In another aspect, when incremental state preservation is performed for a Store Multiple, as an example, a memory range of Store Multiples is watched by, e.g., marking it as being a part of a write-set even if it has not been written.

In one or more aspects, multiple bulk save requests may be received, and therefore, it is to be determined if a given request is compatible with processing that is being performed. For instance, if no pre-existing bulk save request is present, a new request that is received is compatible. If a pre-existing bulk save request is present, and a bulk save request is received, a further determination is made: If the registers are mutually exclusive, they may be considered compatible. If they refer to one or more registers, and an intervening modification has occurred, they may be considered compatible. If hardware supports multiple bulk save/restores, they may be considered compatible.

If a pre-existing transactional memory rollback request exists, and a transactional memory rollback request is received, a further determination is made: If nested transactions are implemented as flattened transactions, they are compatible. If nested transactions are true nested transactions, and a context (e.g., snapshot or other saving of state) is available, they are compatible. If no more storage to save additional state remains, flattening of nested transactions may be selected to achieve compatibility.

If a pre-existing transactional memory rollback request is present, and a register save request is received, further tests are performed: If multiple bulk requests are supported, and storage is available for additional state, they may be considered compatible. If no intervening modifications have occurred to registers that are shared between transactional memory rollback set and Store Multiple set, they are compatible.

If a pre-existing bulk save request is present, and a transactional memory rollback request is received, further tests are performed: If multiple bulk saves are supported, and storage is available for additional state, they may be considered compatible. If no intervening modifications have occurred to registers that are shared between transactional memory rollback set and Store Multiple set, they are compatible.

Figure 19A:
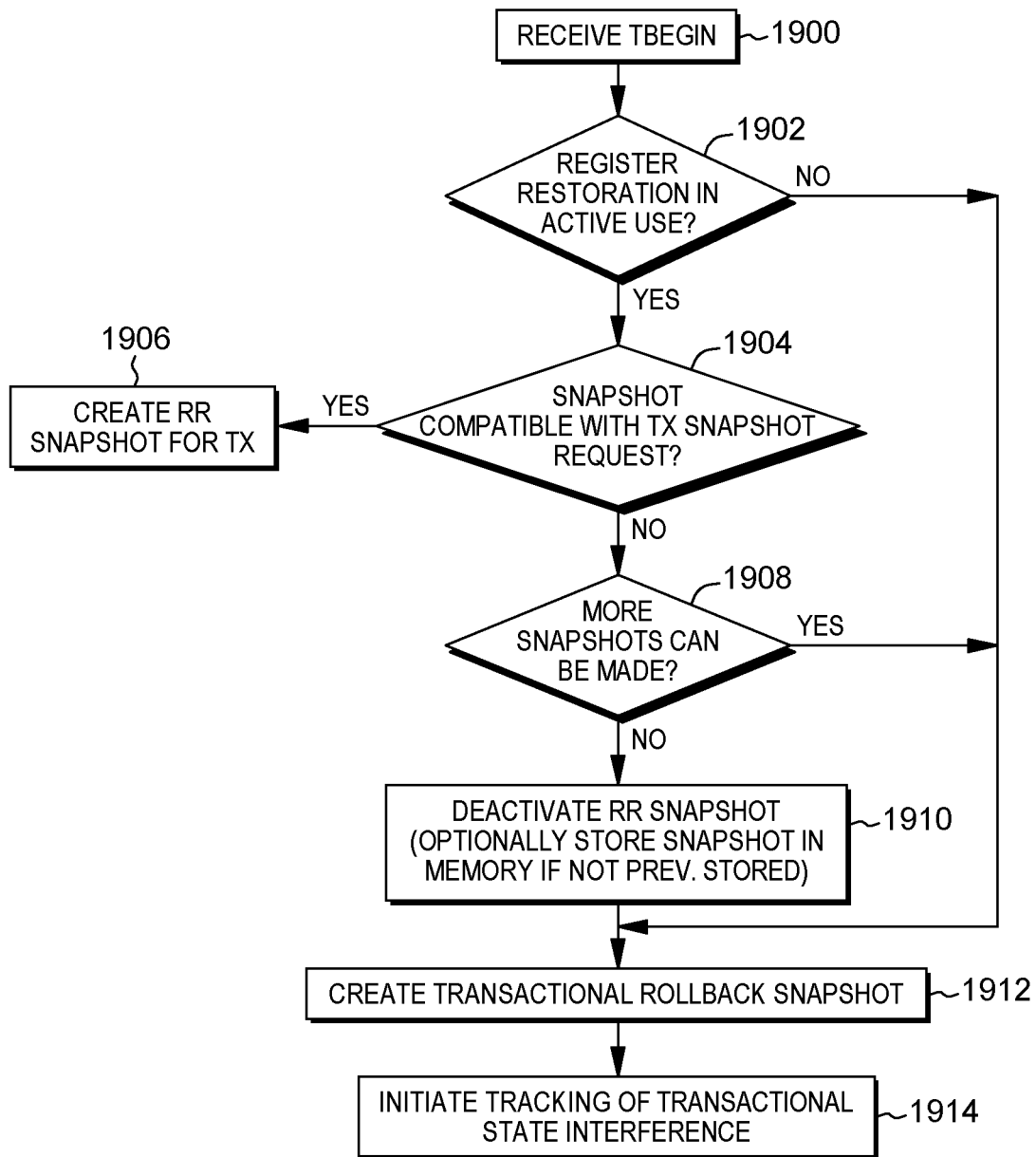
FIG. 19A depicts one example of processing associated with managing snapshots based on executing a Transaction Begin instruction, in accordance with an aspect of the present invention.

One example of processing associated with managing one or more snapshots based on receiving a TBegin instruction is described with reference to FIG. 19A. A TBegin instruction is obtained (e.g., received, provided, have, retrieved, determined), STEP 1900. A determination is made as to whether a register restoration facility is in active use, INQUIRY 1902. If a register restoration facility is not in active use, then a transactional rollback snapshot is created (e.g., a snapshot is taken of the registers indicated to be saved by the TBegin instruction), STEP 1912, and tracking of transactional state interference is initiated (e.g., tracking whether an in-memory write corresponds to one of the registers of the snapshot), STEP 1914.

Returning to INQUIRY 1902, if a register restoration facility is in active use, then a determination is made as to whether a snapshot compatible with the transactional request exists (e.g., are the registers the same), INQUIRY 1904. If the snapshot is compatible with the request, then the register restoration snapshot is used for transactional execution, STEP 1906. However, if the snapshot is not compatible with the request, then a further check is made as to whether more snapshots may be made (e.g., is there room in the snapshot stack), INQUIRY 1908. If more snapshots can be made, then processing continues to STEP 1912. Otherwise, the register restoration snapshot is deactivated, STEP 1910, and optionally, the snapshot is stored in memory if, for instance, it is not previously stored. In another embodiment, there are separate stacks for recovery snapshots and restoration snapshots.

Figure 19B:
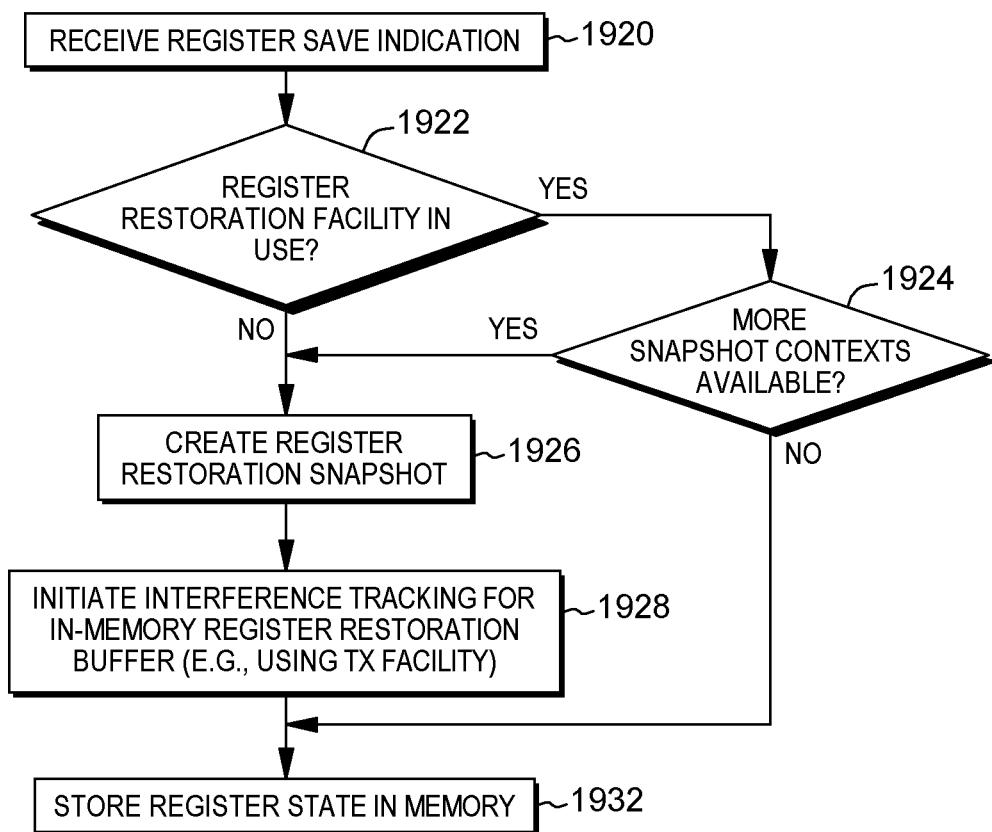
FIG. 19B depicts one example of processing associated with a register save indication, in accordance with an aspect of the present invention.

Another example of processing associated with managing one or more snapshots is described with reference to FIG. 19B. In this example, a register save indication request (e.g., a Store Multiple) is obtained (e.g., received, provided, determined, retrieved, have, etc.), STEP 1920. A determination is made as to whether the register restoration facility is in use for incompatible requests, INQUIRY 1922. If the facility is in use for such requests, a further determination is made as to whether storage is available for additional snapshots (referred to herein as snapshot contexts), INQUIRY 1924. If not, then the register state is stored in memory, STEP 1932. However, if there are more snapshot contexts available or the register restoration facility is not in use for incompatible requests, then a register restoration snapshot is created, STEP 1926. Further, interference tracking for an in-memory register restoration buffer is initiated, STEP 1928. Optionally, the register state is stored in memory, STEP 1932.

In a further aspect, a capability is provided to coalesce a plurality of load and store instructions to determine a range of registers to be restored. For example, the processor is adapted to recognize a sequence of individual load and store operations which may be coalesced into a single restore and save operation, respectively. Coalescing may be performed using a variety of techniques.

In accordance with one or more embodiments of aspects of the present invention, coalescing sequences of loads and stores is used to enable the use of the register restoration techniques described herein in conjunction with legacy code sequences without bulk save and restore instructions, such as STMG and LMG for z/Architecture general purpose registers, or STMW and LMW for Power ISA fixed point registers. In particular, this includes the bulk save of some register types in the z/Architecture and Power ISA, such as, inter alia, floating point registers in z/Architecture and Power ISA, and vector registers in Power ISA for which no store multiple and load multiple floating point instructions exist. Furthermore, some architectures do not provide store multiple and load multiple instructions for any register types In one embodiment, each store request may start a store multiple coalescing sequence that may be recognized. In another embodiment, only certain store requests trigger a coalescing sequence that may be recognized. This is to, for instance, avoid power and other overhead associated with operating additional logic. In one or more embodiments, a coalescing sequence is started only by store requests that use a certain register, e.g., a frame point, stack pointer, or other distinguished register as a base register. In another embodiment, at least a first and second instruction with adjacent addresses (based on the instruction image, i.e., same base and displacement difference corresponding to data size) start a sequence. Other examples are also possible.

In one embodiment, when a first store of a coalescing sequence occurs, the state of the register file (e.g., the register file map, etc.) is snapshot. A bit mask is initialized, in one example, reflecting which registers may be restored from a snapshot. Subsequent writers to registers indicate in the bit mask that a particular register no longer corresponds to the value in the snapshot. Thus, when a subsequent store refers to such a register, it may either be separately performed independent of the coalescing sequence, start a new coalescing sequence, or both. Similarly, one embodiment may require that a store be at an offset commensurate with contiguous storage (e.g., if the first store occurred at displacement d1 for register r1, then register r2 is to be stored at displacement d2=d1+(word size)*(r2−r1) using the same base). In other embodiments, a strict order may be imposed on the instruction sequence, e.g., each store is to store the register R(N+1) if the previous instruction stored register R(N), enabling a single counter to track the embodiment. Other variations are possible. In one embodiment, heuristics are used to limit the stores which may trigger the creation of a snapshot.

In another embodiment, coalescing of individual stores and loads into groups of stores and loads which may then trigger state snapshotting and register restoration in accordance with an aspect of the present invention is performed in conjunction with group formation. In accordance with one aspect, instructions are grouped to keep adjacent stores without intervening modifications of registers in the store range. As one example, control logic ensures that stores occur in a contiguous manner, e.g., at d2=d1+(word size)*(r2−r1) for displacements d1 and d2 associated to a common (unmodified) base (and in one example, no index, or the same unmodified index).

In one embodiment, loads are coalesced in a similar manner as stores. In another embodiment, loads are executed singly wherein for each load a corresponding rename register is retrieved from a register snapshot individually because in at least one embodiment, the overhead of register restoration is primarily associated with storing and maintaining a mechanism to retrieve stored values for in-core restoration.

The recognizing is performed in one of a pre-decode, a group formation and a decode stage. In other embodiments with a trace cache, a loop cache or other such cache, it may operatively be coupled to logic adapted to creating and/or optimizing a loop, trace or iop (internal operation) cache.

In one aspect, a technique for restoring registers from an in-core value pool includes recognizing a sequence of adjacent individual store instructions of adjacent registers, creating and maintaining a single snapshot for restoration, and using a single snapshot to bypass registers from the single snapshot.

Figure 20A:
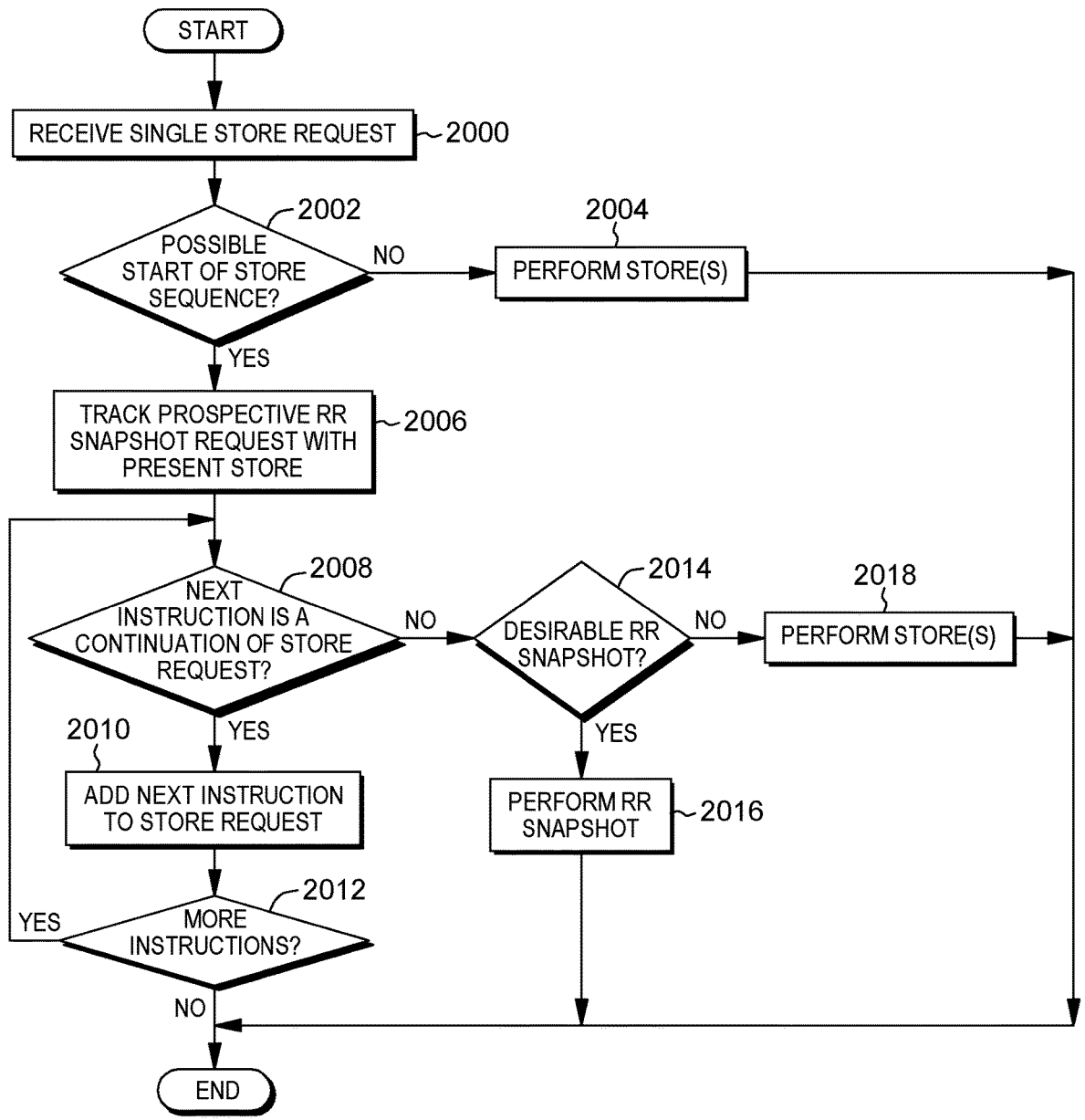
FIGS. 20A-20B depict examples of processing associated with coalescing store/load instructions, in accordance with one or more aspects of the present invention.

One embodiment of coalescing individual register store requests for creation of a snapshot is described with reference to FIG. 20A. A single store request is obtained (e.g., received, have, provided, retrieved, determined, etc.), STEP 2000. A determination is made as to whether this is a possible start of a store sequence (e.g., a multi-store/register spill sequence), INQUIRY 2002. This may include checking for a subset of registers, addressing modes, addressing ranges, or another indication of a register spill sequence. If it is determined that it is not the start of a possible store sequence, then one or more stores are performed, STEP 2004. However, if it is a possible start of a store sequence, then a prospective register restoration snapshot request with the present store request is tracked, STEP 2006.

A determination is made as to whether a next instruction is a continuation of the store request, INQUIRY 2008. If the next instruction is a continuation of a store request, then the next instruction is added to the store request, STEP 2010. A check is made as to whether there are more instructions to be processed, INQUIRY 2012. If so, processing continues to INQUIRY 2008.

If the next instruction is not a continuation of a store request, INQUIRY 2008, then a determination is made as to whether a register restoration snapshot is desirable, INQUIRY 2014. That is, does the prospective snapshot have enough registers to make the snapshot worthwhile? If a snapshot is desirable, then a register restoration snapshot technique is performed to create a snapshot, STEP 2016. However, if a snapshot is not desirable, then one or more stores are performed, STEP 2018. In accordance with at least one embodiment, snapshots saving a certain minimum number of registers are desirable, so as to amortize the cost of creating and managing a snapshot. Thus, in at least one embodiment, when a prospective snapshot has more than a set threshold of registers, it is considered desirable. In another embodiment, desirability of a snapshot is estimated based on possible runtime improvement. In at least one embodiment, when a prospective snapshot offers more than a set threshold of runtime improvement, it is considered desirable. Other possibilities also exist.

Figure 20B:
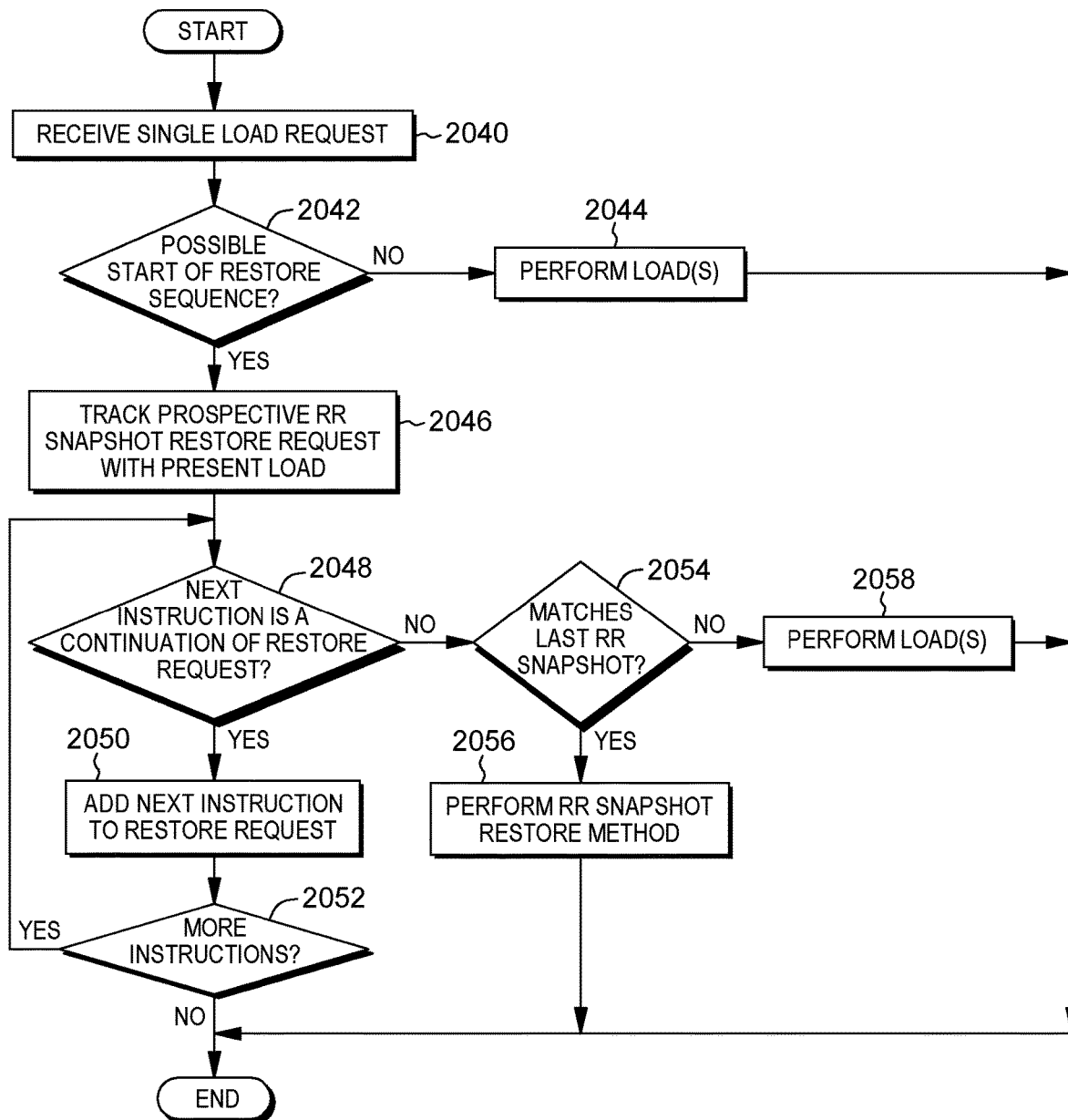

One embodiment of coalescing individual register restore requests is described with reference to FIG. 20B. A single load request is obtained (e.g., received, have, retrieved, determined, provided, etc.), STEP 2040. A determination is made as to whether this is a possible start of a register restore sequence, INQUIRY 2042. This may include checking for a subset of registers, addressing modes, addressing ranges, or another indication of a register reload. In at least one embodiment, INQUIRY 2042 includes a test whether the load request corresponds to the most recent register snapshot with respect to the register being restored and the specified in-memory storage location. If it is determined that it is not the start of a possible restore sequence, then one or more loads are performed, STEP 2044. However, if it is a possible start of a restore sequence, then a prospective register restoration request with the present load request is tracked, STEP 2046.

A determination is made as to whether a next instruction is a continuation of the restore request, INQUIRY 2048. If the next instruction is a continuation of the restore request, then the next instruction is added to the restore request, STEP 2050. A check is made as to whether there are more instructions to be processed, INQUIRY 2052. If so, processing continues to INQUIRY 2048.

If the next instruction is not a continuation of the restore request, INQUIRY 2048, then a determination is made as to whether the restore request(s) match the register restoration snapshot, INQUIRY 2054. If so, then a register restoration snapshot restore technique is performed, STEP 2056. Otherwise, one or more loads are performed, STEP 2058.

In one or more aspects, when a Spillm instruction is encountered, an in-core register restoration snapshot is made. Additionally, spilled registers are stored to a temporary location (commonly the stack frame of the current function) in case the in-core register restoration snapshot is invalidated. Contents of the Spillm registers are placed on a store queue and written to memory.

The registers are restored from the in-core register restoration snapshot by, for instance, the Reloadm instruction, if the register snapshot is valid. Otherwise, Reloadm reloads the values from memory (e.g., the temporary storage area in the current function's stack frame).

In one aspect, when the Reloadm instruction completes, values to be stored based on a Spillm instruction may still be queued in the store queue to be written to caches and eventually system memory. Once the Reloadm has completed, no further reads to the buffer will occur. Consequently, these values use up valuable space in the store queue and cause time delay for subsequent stores in the store queue as well as energy consumption while processing stores that are known to be useless. Thus, in one example, when the Reloadm instruction completes, store queue entries corresponding to the Spillm/Reloadm save/restore sequence are invalidated. For instance, they are removed from the store queue, or when they come to the head of the store queue to be committed to the memory hierarchy, they are not written. Other examples also exist.

In yet another embodiment, when a remote cross-invalidate (XI) is received, store queue entries identified with Spillm are not provided. Further, in another embodiment, when a remote XI is received, store queue entries identified with a Spillm for which the Reloadm has completed are not provided.

Figure 21A:
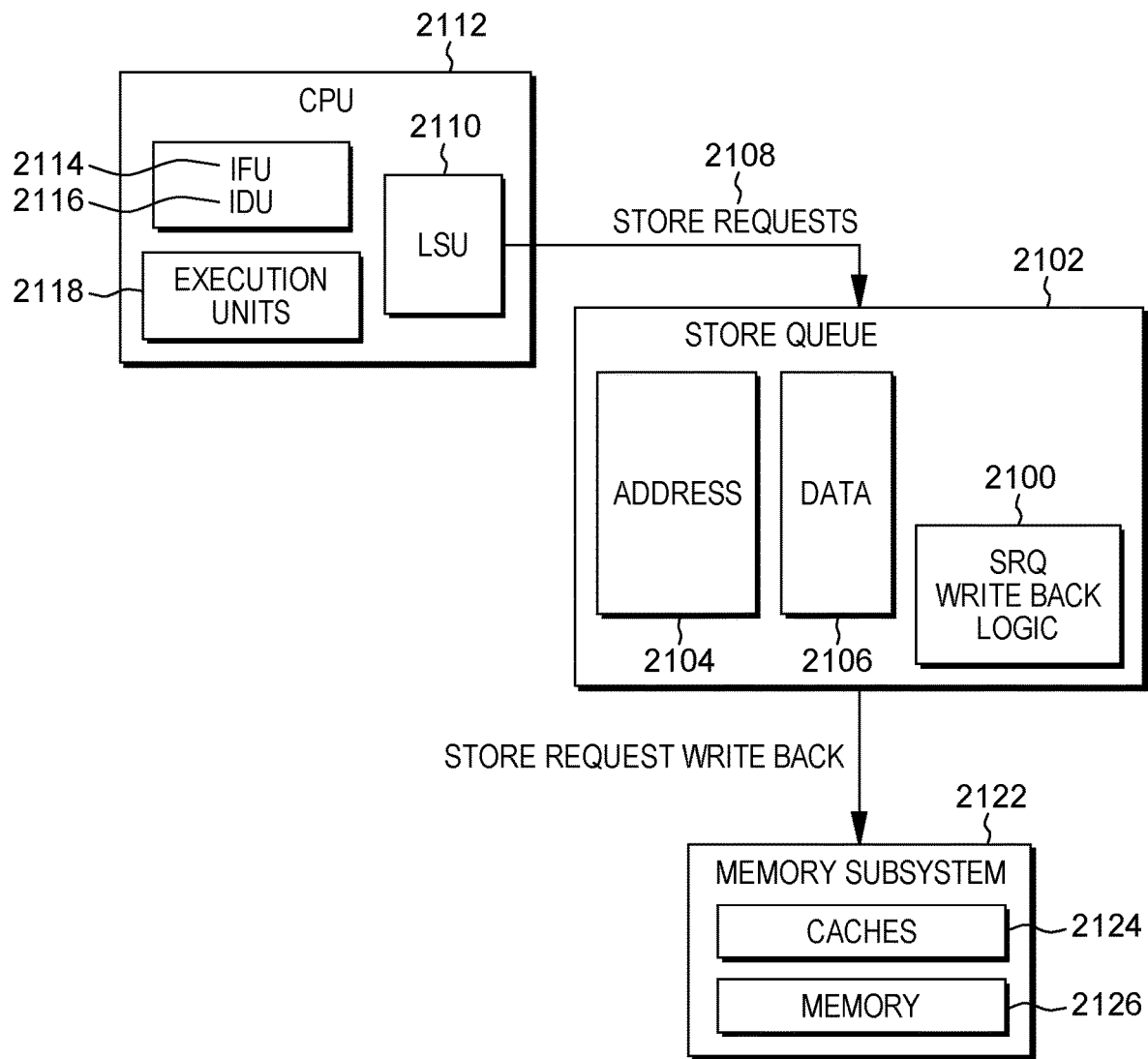
FIG. 21A depicts one example of a store queue that includes write back logic, used in accordance with an aspect of the present invention.

Aspects of managing the store queue are controlled by store queue write back logic, which is augmented in accordance with one or more aspects of the present invention. As shown in FIG. 21A, in one example, a store request (SRQ) write back logic 2100 is located in a store queue 2102 that further includes address information 2104 and data 2106 for each store queue entry. Store queue 2102 receives store requests 2108 from a load/store unit (LSU) 2110 of a central processing unit (CPU) 2112. CPU 2112 further includes, for instance, an instruction fetch unit (IFU) 2114 that fetches instructions, which are decoded using an instruction decode unit 2116. The decoded instructions may be executed via one or more execution units 2118.

Figure 21B:
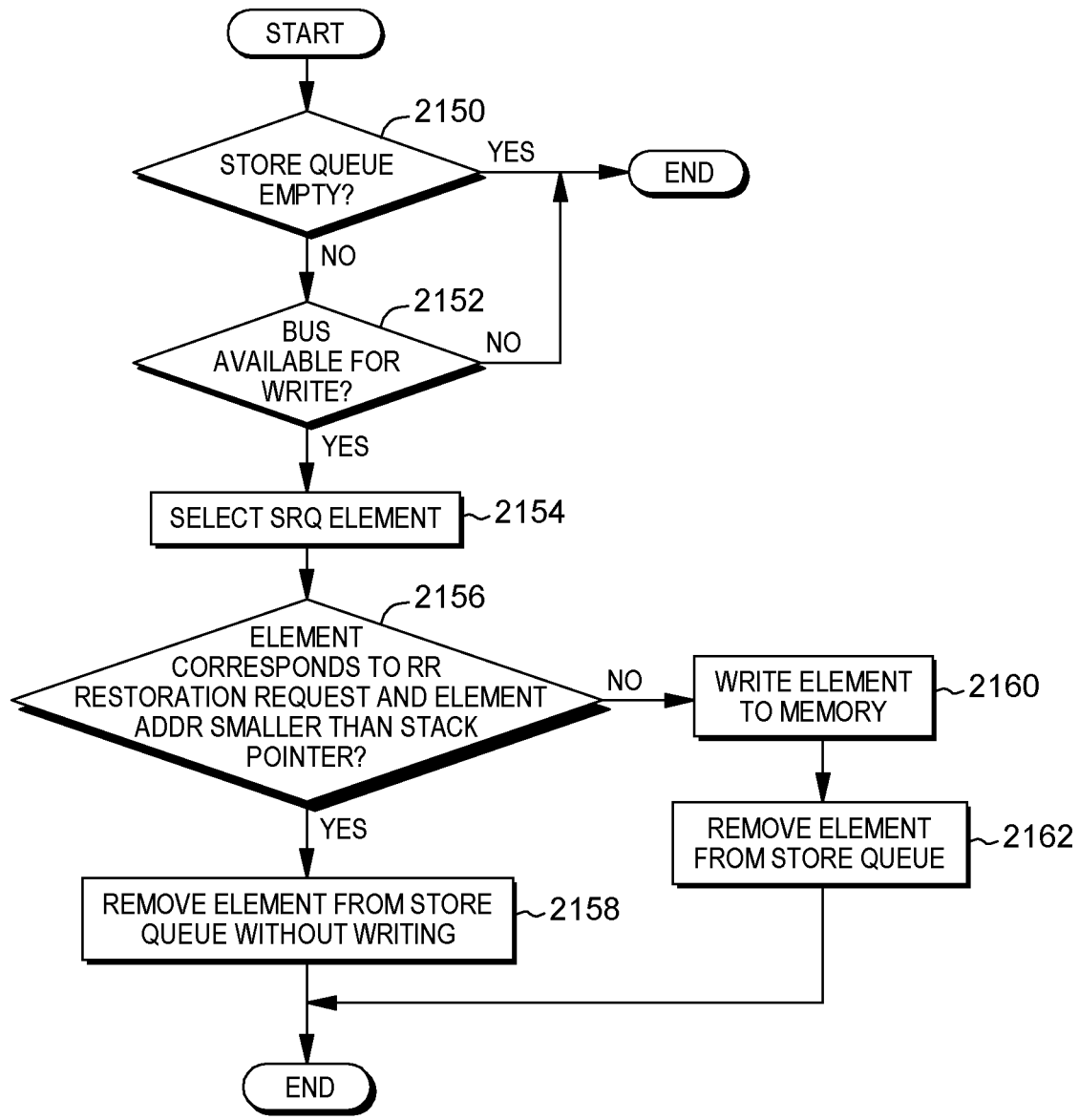
FIGS. 21B-21C depict examples of write back logic processing, in accordance with one or more aspects of the present invention.

As indicated, the load/store unit places store requests 2108 on store queue 2102. Store request write back logic 2100 performs a write back to a memory subsystem 2122, which may include one or more caches 2124 and memory 2126. In accordance with an aspect of the present invention, and with reference to FIG. 21B the write back logic includes the following:
REPEAT
  if store queue not empty (2150)
    If cache bus available for write (2152)
      Select oldest SRQ element (2154)
      IF (ELEMENT Corresponds to RR restoration request
        && element address smaller than stack pointer) (2156)
        remove element from store queue without writing (2158)
      ELSE
        write element to memory (2160)
        Remove element from store queue (2162)
While the logic shown hereinabove and in FIG. 21B is described with reference to a processor stack growing downwards, i.e., wherein addresses smaller than the value of the stack pointer are not part of the stack (INQUIRY 2156), those skilled in the art will understand that the teachings herein may be adapted to architectures wherein the processor stack grows upwards, i.e., wherein addresses larger than a stack pointer are not a part of the stack, e.g., by replacing the test for "smaller" with a test for "greater" in the example write back logic pseudocode hereinabove and in INQUIRY 2156 of FIG. 21B.

Figure 21C:
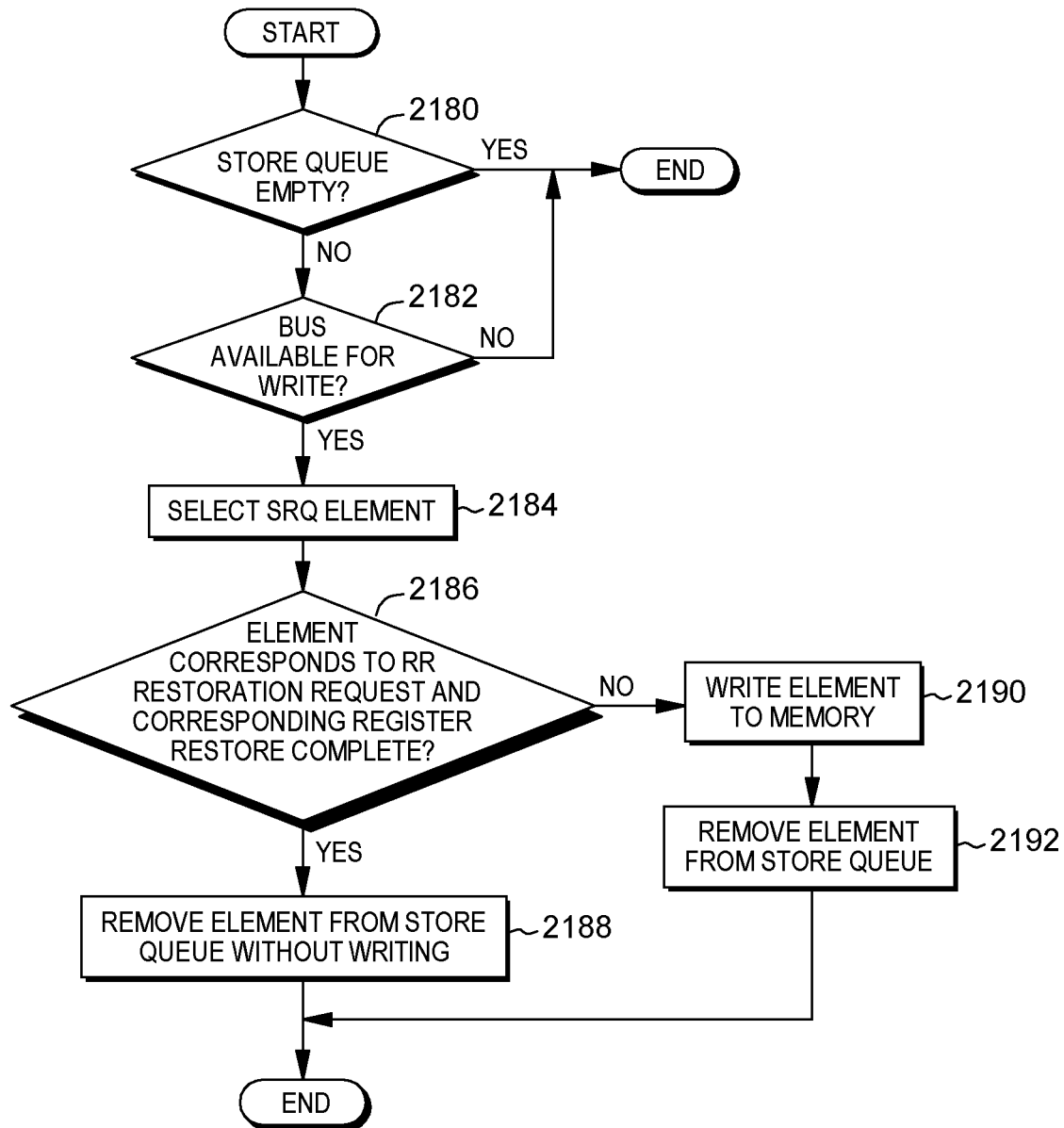

In another embodiment, with reference to FIG. 21C, the write back logic includes:
REPEAT
  if store queue not empty (2180)
    If cache bus available for write (2182)
      Select oldest SRQ element (2184)
      IF (ELEMENT Corresponds to RR restoration request
        && corresponding register restore has completed) (2186)
        remove element from store queue without writing (2188)
      ELSE
        write element to memory (2190)
        Remove element from store queue (2192)
In one embodiment, the processing of FIGS. 21B-21C is performed in conjunction with the Spillm/Reloadm instructions, since those instructions indicate that the buffer is not programmer accessible for writes at a particular point in time (e.g., between store and load). In another embodiment, one or more instructions or other mechanisms are used to indicate that the storage buffer will no longer be accessed after a load multiple state restore or after another selected point in time.

In yet other embodiments, data stored in the stack region (i.e., those pages in the address space allocated for holding the stack) below the stack pointer are considered to be no longer used, and are suppressed during write back from the store queue, and/or in responding to XI cross-interrogate requests. In such an embodiment, optimizations wherein data is allocated below the stack pointer are not permissible. In another embodiment supporting optimizations wherein data may be allocated below the stack pointer (e.g., in a region defined by an ABI such as the Power ELFv2 ABI, or the AMD Red Zone specification for Linux), the write back of data is suppressed when the data is written beyond the defined region wherein data may be allocated and accessed beyond the stack pointer, e.g., write back from a store queue may be suppressed for addresses more than 512 bytes below the stack pointer, in accordance with, e.g., the Power ELFv2 ABI.

Figure 22A:
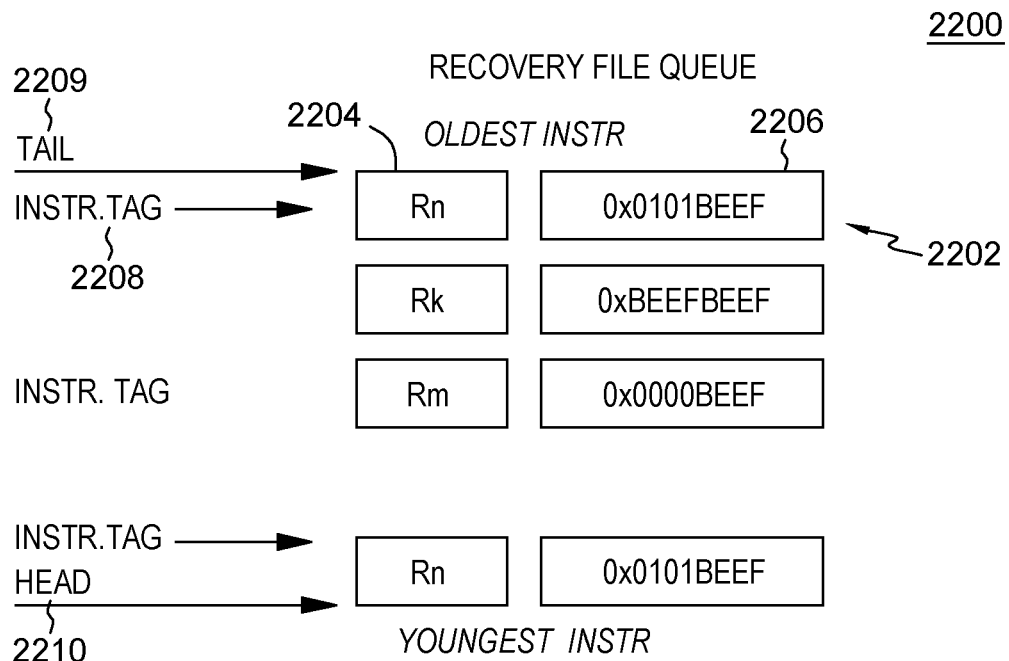
FIG. 22A depicts one example of a recovery buffer, in accordance with an aspect of the present invention.

In a further aspect of the present invention, an alternative to the register restoration snapshot may be used. This alternative is a recovery buffer, also referred to as a recovery file. In the case of a misprediction or an exception, the register values may be recovered from the recovery buffer rather than a snapshot. Each time a register is overwritten, the old values are stored in a recovery file queue in case they are needed for recovery. One example of such a recovery file is depicted in FIG. 22A. In one example, a recovery file 2200 is implemented as a queue, and includes one or more register recovery values corresponding to executed instructions 2202. As an example, recovery buffer 2200 includes a plurality of registers 2204 having a register number to be recovered, Rn, Rk, Rm, and so forth, and a register value 2206 to be recovered. An instruction tag 2208 is assigned to each register 2204. The queue has a tail pointer 2209 pointing to the recovery register corresponding to the oldest instruction that may be rolled back by recovering the value overwritten by the instruction, and a head pointer 2210 pointing to the recovery value corresponding to the youngest instruction and indicating the position where additional recovery values will be inserted responsive to instructions being executed.

In one aspect, a stored recovery value is associated with an instruction to restore. The stored value is overwritten by an instruction and recovery is performed when the instruction is flushed. A state machine may be provided in which for each flushed instruction, the value is recovered from recovery buffer 2200 reading recovery values 2206 corresponding to instructions. The state machine may have a forward or backward scan.

Figure 22B:
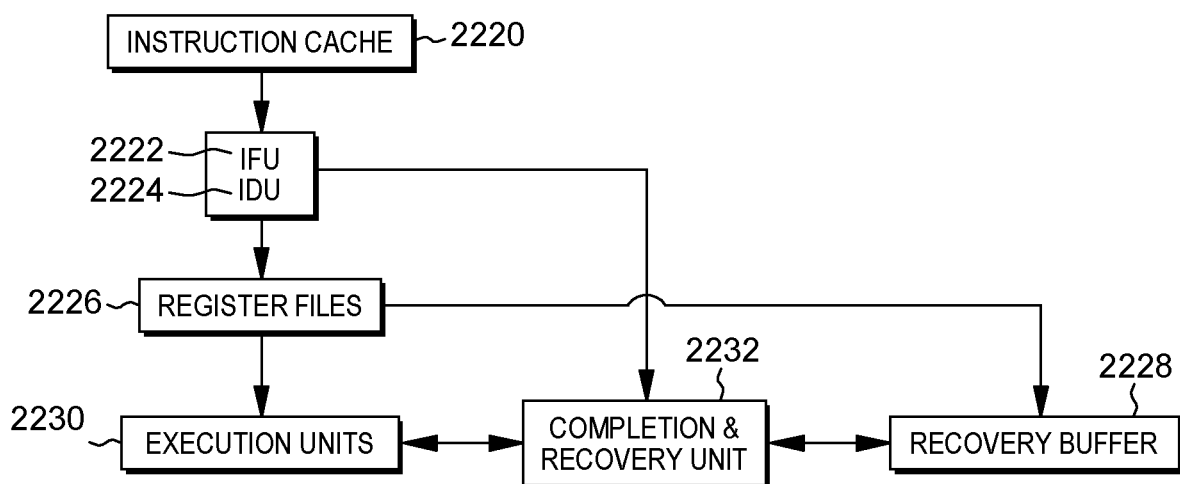
FIG. 22B depicts one example of a processor that includes a recovery buffer, in accordance with an aspect of the present invention.

Further details regarding the recovery buffer are described with reference to FIG. 22B. In one example, an instruction is fetched from an instruction cache 2220 by an instruction fetch unit 2222 and decoded by an instruction decode unit 2224. Operands are obtained from one or more register files 2226. If a value from a register file is modified, it is stored in recovery buffer 2228 at the head of the recovery buffer. One or more execution units 2230 execute the instructions, and completion and recovery unit 2232 completes the instruction or if there is a misprediction or exception, processing proceeds to the recovery buffer 2228 that walks backwards, in one example, copying each value to be restored from recovery buffer 2228 to register files 2226 until the in-order register state at the misprediction or exception point is restored.

In accordance with one aspect of the present invention, the recovery values stored in fast processor memory are used to restore values responsive to a register restoration request corresponding to a load multiple, a coalesced load multiple sequence or Reloadm instructions.

In one example, when a register is overwritten, the old values are stored in the recovery buffer. During recovery, the values in the recovery buffer are copied back to the register file. In one example, the processor steps through the recovery buffer to retrieve the values present at entry to the store multiple. As examples, the step through the recovery buffer to restore register values is performed via a backward scan or a forward scan. (In one particular example, the oldest recovery entry successive to a save request for a specified register is restored.) One example of the logic for a forward scan is indicated below:

```
Retore [0...31] <= false
Restore [LM range] <= true
If NOT (STM tag in recovery file)
    ... special handling
For i = STM tag to LM tag
{
    Rec <= RecFile[i]
    If Restore[Rec.reg]
    {
        RegRec.reg] <= Rec.value
        Restordrec.reg] <= false
    }
}
```

In accordance with the example hereinabove, Restore tracks for each register whether a register is still to be restored. It is initialized to restore all registers corresponding to the registers specified by the Load Multiple (or Reloadm) instruction. If the tag of a corresponding Store Multiple (STM) from which the Load Multiple (LM) is to restore the state cannot be located, special handling is performed. In at least one embodiment, the special handling corresponds to loading values from the memory location specified in the Load Multiple or Reloadm instruction.

The pseudocode then scans forward through the recovery buffer starting at the recovery buffer entry corresponding to the tag of the register save instruction (e.g., a STM Store Multiple or Spillm) up to the instruction restoring registers (e.g., the Load Multiple or Reloadm).

For each entry, the recovery buffer entry is read (i.e., represented by the value RecFile[ ]), consisting of at least the fields Rec.reg indicating the register number (2204 of FIG. 22A) contained in the particular recovery buffer entry and the value to be restored to the register, Rec.value (field 2206 of FIG. 22A). If the register corresponds to one of the registers of the Load Multiple or Reloadm, the first (oldest) value overwritten after the STM Store Multiple (Spillm) is restored.

Any remaining registers in Restore[ ] that have not been restored from the recovery buffer are restored from memory.

Similarly, for a backward scan, the logic includes:

```
Restore [0...31] <= false
Restore [LM range] <= trueIf NOT (STM tag in recovery file)
    ... special handling
For i = LM tag to STM tag
{
    If Rec.reg in LM range
    {
        Reg Rec.reg] <= Rec.value
        Restordrec.reg] <= false
    }
}
```

In a further aspect, values beyond the recovery file tail may be recovered. This may be performed if the value has not been overwritten, which can be determined by comparing against a highwater mark of the head/second tail that moves in response to the head overwriting the tail entries. If head is greater than or equal to the second tail, then the second tail is equal to the head.

As described herein, the actual state restored by exception and branch misprediction recovery, as well as register restoration, is contained, in one example, in physical registers. To write to a new register, a physical register is allocated, an architected register to be written to is mapped to the allocated physical register, and the physical register is written. In accordance with an aspect of the present invention, physical registers are allocated responsive to register write requests so as to maximize the utility of physical registers as a source for restoring registers responsive to a register restoration request. For instance, the allocation technique for new registers from the physical register file is modified to give preference to selecting registers not associated with a register restoration snapshot. Further, if a register is to be obtained from a register restoration snapshot, in at least one embodiment, a selection is made so as to minimize the performance impact by selecting a physical register which may not be a part of the registers to be restored from a snapshot, or from a snapshot with the least performance impact. In at least one embodiment, a snapshot corresponding to the least performance impact is the oldest snapshot. This processing, in accordance with one or more aspects of the present invention, is further described with reference to FIGS. 23A-23B.

Figure 23B:
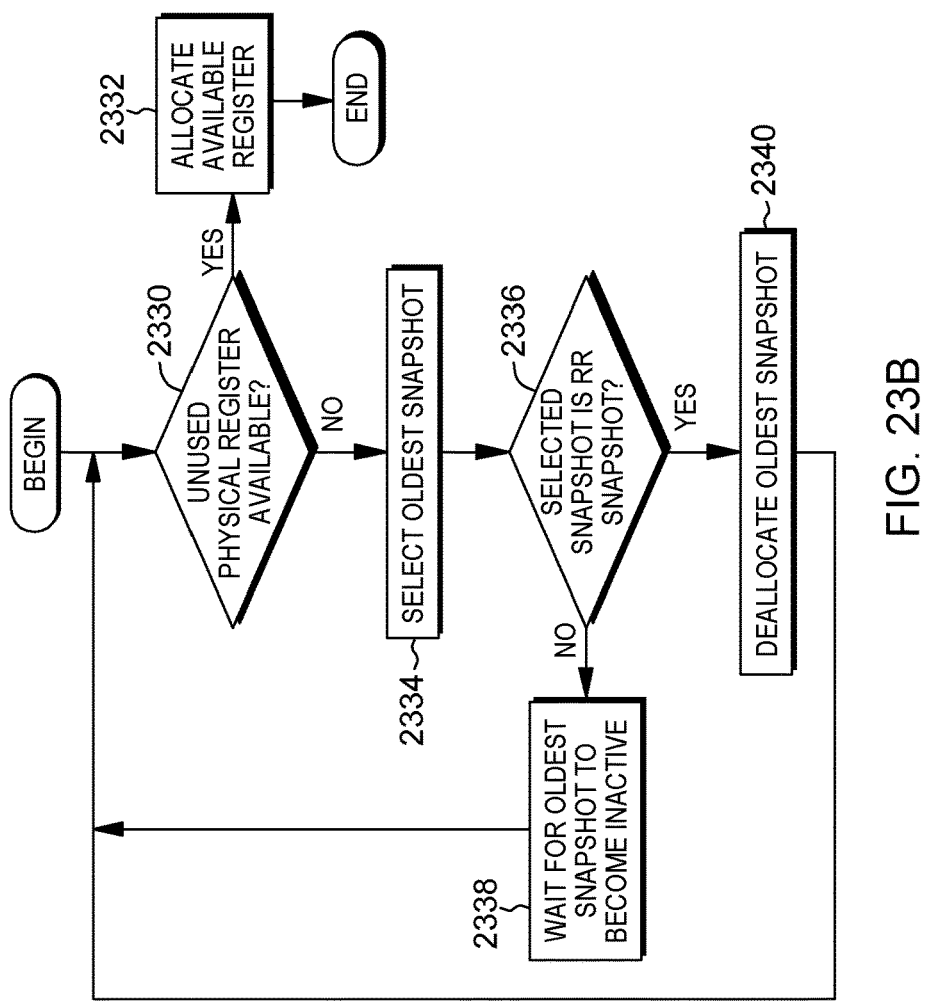
FIGS. 23A-23B depict examples of processing associated with register allocation requests, in accordance with one or more aspects of the present invention.
Figure 23A:
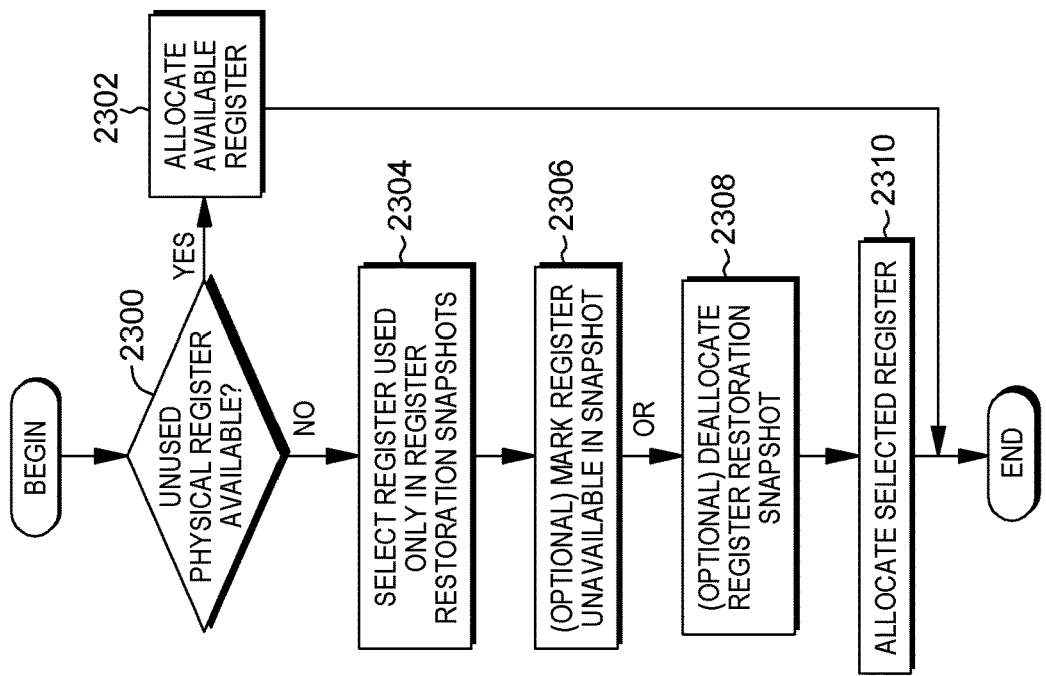

Referring to FIG. 23A, in one example, a determination is made as to whether an unused physical register is available, INQUIRY 2300. If an unused physical register is available, an unused register is selected and allocated, STEP 2302.

However, if an unused physical register is not available, then a register is selected, in accordance with an aspect of the present invention, STEP 2304. For instance, a register is selected that is not in an active snapshot for recovery (e.g., branch misprediction, exception, etc.); i.e., a register used in register restoration snapshots, but not recovery snapshots. In one example, a register is selected from the oldest snapshot, since, for instance, the oldest snapshot may be more likely to have a register ready to be freed and it may be less costly to take a register from an older snapshot, since it may not be used as soon as a register in a younger snapshot. In another embodiment, a register from a register restoration snapshot is chosen that does not correspond to a register to be restored, i.e., a register outside the range of registers specified to be saved by the STM or Spillm instruction.

Further, the register may be marked as invalid in the snapshot, STEP 2306, or the register restoration snapshot may be deallocated, STEP 2308. When a register restoration snapshot is deallocated, the physical registers associated with that snapshot become available when they do not correspond to registers also used in another snapshot.

The selected register is then allocated, STEP 2310.

Another embodiment for allocating a register is described with reference to FIG. 23B. In one example, a determination is made as to whether an unused physical register is available, INQUIRY 2330. If an unused physical register is available, an unused register is selected and allocated, STEP 2332. However, if an unused physical register is not available, then an oldest snapshot is selected, STEP 2334, and a determination is made as to whether the selected snapshot is a register restoration snapshot, INQUIRY 2336. If it is a register restoration snapshot, it is deallocated enabling the registers associated therewith to become available if they are not in another snapshot, STEP 2340. Processing continues to INQUIRY 2330.

Returning to INQUIRY 2336, if the selected snapshot is not a register restoration snapshot, processing waits for the oldest snapshot to become inactive, STEP 2338. Processing returns to INQUIRY 2330.

In other embodiments, instead of waiting for the oldest snapshot to become inactive, other snapshots may be checked. Further, a snapshot other than the oldest may initially be selected, in other embodiments. Many variations are possible.

As described herein, rename registers and rename maps (e.g., snapshots) may be used for implementing branch misprediction recovery and precise exceptions. When an exception or a branch misprediction is discovered the in-order program state can be recovered from the register rename map and the physical registers, and by flushing speculatively stored state in store queues (and possibly caches, e.g., for an embodiment using transactional memory). When an exception or branch misprediction can no longer occur, because an instruction has committed, the register rename maps and physical registers may be deallocated and reused.

In accordance with at least one embodiment, rename registers and rename maps used for implementing branch misprediction recovery and precise exceptions are also used to implement register restoration for saving and restoring program state, e.g., in the context of function calls, for recovering caller and callee-saved registers in the caller and a callee, respectively.

Further, in accordance with one embodiment, register snapshots are created in order to implement branch misprediction recovery, and implement precise exceptions in the presence of out-of-order execution. In one embodiment, additional snapshots are made for recovering architected state using register restoration. However, holding such register snapshots for register restoration may cause an insufficient number of free registers to become available, stopping processors from making progress during execution when no new target registers can be executed.

Also, register restoration snapshots may be allocated, but recovery may never occur. For example, structured C++/Java exception handling may cause a function to abort without ever restoring its state, or setjump/longjump may similarly prevent a register restore to be encountered that may deallocate a register snapshot allocated for register restoration.

In accordance with one embodiment, register snapshots are maintained in a separate queue, rename registers referenced in snapshots are prevented from being deallocated, and register snapshots may be recycled based on ensuring a suitable supply of free registers. Thus, when the register freelist, i.e., the register rename pool used to satisfy new register allocation requests, falls below a certain number of registers, register snapshots may be deallocated until the freelist reaches the target size. The target size may be a fixed threshold, or based on an estimate of the number of new rename registers allocated by a current workload, possibly weighted by the number of cycles needed to deallocate snapshots and make available additional registers. (In one embodiment, that threshold may be 0, and snapshots would only be deallocated to satisfy rename register allocation requests. However, that policy may lead to resource stalls while instructions are waiting for rename registers to become available.)

In one embodiment, register rename snapshots and their associated registers are deallocated and recycled into the rename freelist in the FIFO (first in, first out) policy, where the snapshot having been allocated the earliest is also deallocated first. In another embodiment, register snapshots that have been used by register restoration are also immediately deallocated—this may take particular advantage of the stack model used for function calls, where the most recently entered function is exited first, and so its register restoration state may become available for deallocation first).

In another embodiment, only a single snapshot (or the last n, where n is a small integer, such as 2) corresponding to the most recent bulk save request is stored for register restoration. While this supports only register restoration for a single function call, this offers the best benefit in terms of the relationship of gains achieved per design complexity, given that these are both dynamically the most frequent (in many workloads, over 50% of function calls are leaf functions), and have the biggest negative impact in terms of load/hit/store interlocks resulting in performance-degrading stall cycles.

In at least one embodiment, register snapshots for register restoration are captured under mask control, so that a snapshot may only contain the registers listed by the Spilll/STM request, in order to prevent rename registers from being unnecessarily prevented from reallocation.

In another embodiment, registers corresponding to register save/restore sequences that may be listed in register rename map snapshots made for register restoration are not independently retained. Instead, rename registers are deallocated based on their use for implementing branch misprediction recovery and precise exceptions. When registers are no longer needed, they are returned to the freelist pool (e.g., in accordance with an implementation, such as that of Buti et al.)

In one embodiment, the freelist selection algorithm is modified to select registers from the freelist which are not referenced by a register restoration snapshot. In another embodiment, the freelist selection algorithm is modified to select registers from the freelist which were allocated to a register rename snapshot earlier than other rename registers. In yet another embodiment, the freelist selection algorithm is modified to select registers from the freelist which are not referenced by an active register rename snapshot (i.e., for example excluding most recently allocated snapshots that have already been used to restore the register state, e.g., for a corresponding function). In yet another embodiment, a combination of any of these three criteria and additional criteria may be used. In yet another embodiment, a combination of all of these three criteria and additional criteria may be used. Other possibilities also exist.

Described herein are various aspects and embodiments of register restoration processing.

Although a number of examples and techniques are provided, variations and/or additions may be made without departing from a spirit of aspects of the present invention.

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 24A-24B.

Referring to FIG. 24A, in one embodiment, one or more architected registers of the computing environment are restored from a snapshot previously taken of the one or more architected registers (2400). The snapshot indicates one or more physical registers previously assigned to the one or more architected registers (2402). The restoring replaces the one or more physical registers currently assigned to the one or more architected registers with the one or more physical registers previously assigned to the one or more architected registers as indicated by the snapshot (2404). A determination is made as to the validity of the one or more architected registers restored using the snapshot (2406). The determining the validity includes, for instance, checking memory locations associated with the one or more architected registers to determine whether contents of the one or more architected registers have changed since the snapshot was taken, wherein the one or more architected registers are valid based on the checking indicating the contents of the one or more architected registers have not changed (2408).

In a further aspect, based on determining invalidity of the one or more architected registers restored using the snapshot, the contents of the one or more architected registers are reloaded from memory (2410).

Further, in one aspect, a restore instruction is obtained (2412), and the restoring is performed based thereon (2414). The restore instruction provides an indication of the one or more architected registers to be restored (2416). In one example, the restore instruction includes a bulk restore instruction to restore a plurality of architected registers (2418).

Referring to FIG. 24B, in a further aspect, a comparison is made of an indication of the one or more architected registers to be restored with a previous save request to determine whether the snapshot of the one or more architected registers has been taken (2420), and the restoring is performed based on the comparing indicating the snapshot has been taken (2422). In one example, the save request includes a bulk store instruction to save a plurality of architected registers (2424). Further in one embodiment, based on the comparing indicating the snapshot has not been taken, contents of the one or more architected registers are reloaded from memory (2426).

As one example, the determining validity of the one or more architected registers includes loading contents of the one or more architected registers from memory (2428); comparing the contents loaded from memory with contents of the one or more architected registers restored from the snapshot (2430); and determining invalidity of the one or more architected registers based on the comparing indicating a mismatch (2432).

The snapshot is obtained, in one example, from a stack of snapshots (2434), and in a further example, the snapshot is a last snapshot taken (2436).

Many variations are possible without departing from a spirit of aspects of the present invention. It should be noted that numerous aspects and features are described herein, and unless otherwise inconsistent, each aspect or feature may be combinable with any other aspect or feature.

Figure 25A:
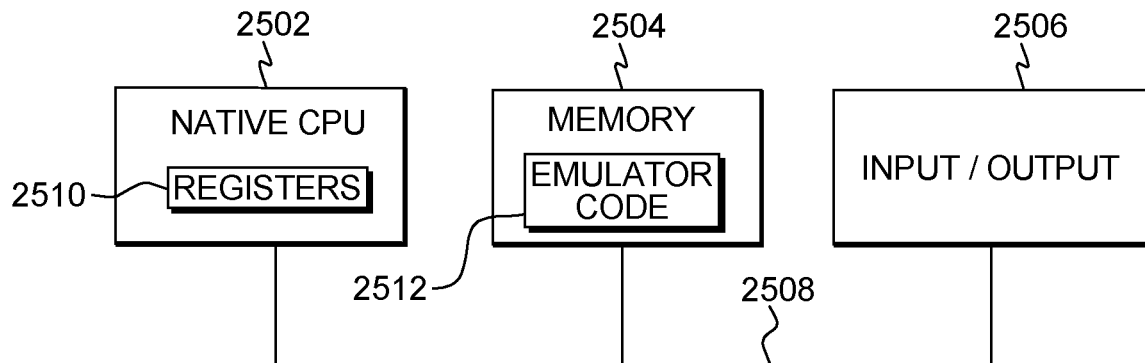
FIG. 25A depicts another example of a computing environment to incorporate and use one or more aspects of the present invention.

Other types of computing environments may also incorporate and use one or more aspects of the present invention, including, but not limited to, emulation environments, an example of which is described with reference to FIG. 25A. In this example, a computing environment 2500 includes, for instance, a native central processing unit (CPU) 2502, a memory 2504, and one or more input/output devices and/or interfaces 2506 coupled to one another via, for example, one or more buses 2508 and/or other connections. As examples, computing environment 2500 may include a PowerPC processor or a pSeries server offered by International Business Machines Corporation, Armonk, N.Y.; and/or other machines based on architectures offered by International Business Machines Corporation, Intel, or other companies.

Native central processing unit 2502 includes one or more native registers 2510, such as one or more general purpose registers and/or one or more special purpose registers used during processing within the environment. These registers include information that represents the state of the environment at any particular point in time.

Moreover, native central processing unit 2502 executes instructions and code that are stored in memory 2504. In one particular example, the central processing unit executes emulator code 2512 stored in memory 2504. This code enables the computing environment configured in one architecture to emulate another architecture. For instance, emulator code 2512 allows machines based on architectures other than the z/Architecture, such as PowerPC processors, pSeries servers, or other servers or processors, to emulate the z/Architecture and to execute software and instructions developed based on the z/Architecture.

Figure 25B:
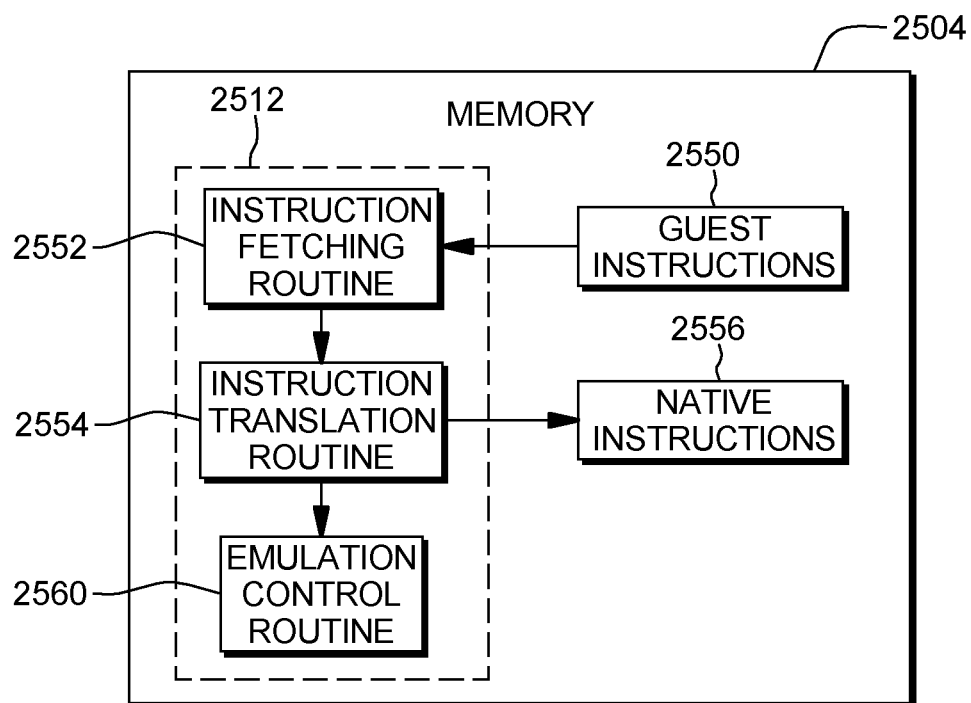
FIG. 25B depicts further details of the memory of FIG. 25A.

Further details relating to emulator code 2512 are described with reference to FIG. 25B. Guest instructions 2550 stored in memory 2504 comprise software instructions (e.g., correlating to machine instructions) that were developed to be executed in an architecture other than that of native CPU 2502. For example, guest instructions 2550 may have been designed to execute on a z/Architecture processor, but instead, are being emulated on native CPU 2502, which may be, for example, an Intel processor. In one example, emulator code 2512 includes an instruction fetching routine 2552 to obtain one or more guest instructions 2550 from memory 2504, and to optionally provide local buffering for the instructions obtained. It also includes an instruction translation routine 2554 to determine the type of guest instruction that has been obtained and to translate the guest instruction into one or more corresponding native instructions 2556. This translation includes, for instance, identifying the function to be performed by the guest instruction and choosing the native instruction(s) to perform that function.

Further, emulator code 2512 includes an emulation control routine 2560 to cause the native instructions to be executed. Emulation control routine 2560 may cause native CPU 2502 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 2556 may include loading data into a register from memory 2504; storing data back to memory from a register; or performing some type of arithmetic or logic operation, as determined by the translation routine.

Each routine is, for instance, implemented in software, which is stored in memory and executed by native central processing unit 2502. In other examples, one or more of the routines or operations are implemented in firmware, hardware, software or some combination thereof. The registers of the emulated processor may be emulated using registers 2510 of the native CPU or by using locations in memory 2504. In embodiments, guest instructions 2550, native instructions 2556 and emulator code 2512 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 2550 that is obtained, translated and executed is, for instance, one of the instructions described herein. The instruction, which is of one architecture (e.g., the z/Architecture), is fetched from memory, translated and represented as a sequence of native instructions 2556 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 26:
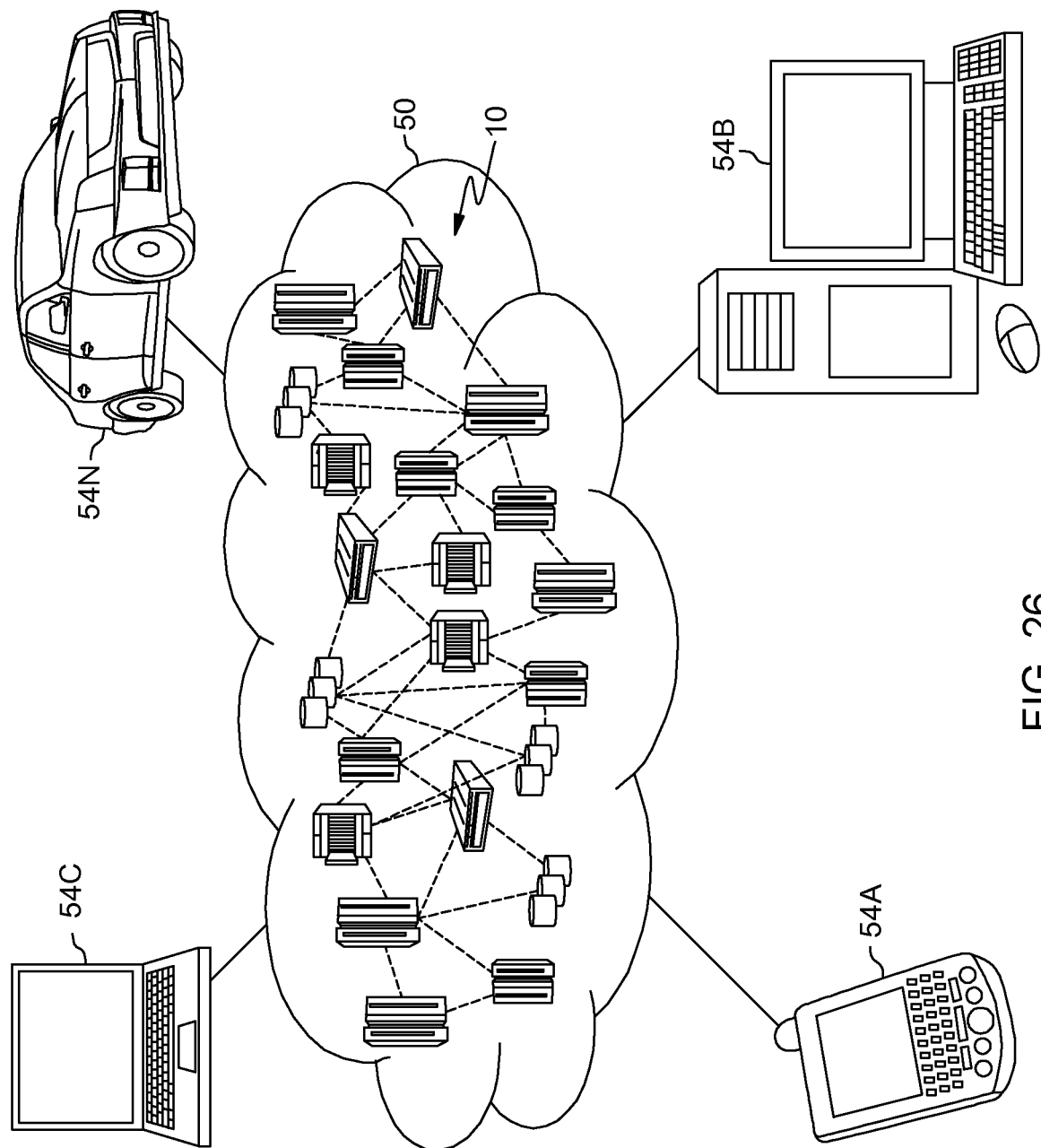
FIG. 26 depicts one embodiment of a cloud computing environment.

Referring now to FIG. 26, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 26 are intended to be illustrative only and that computing nodes 10 and cloud computing environment 50 can communicate with any type of computerized device over any type of network and/or network addressable connection (e.g., using a web browser).

Figure 27:
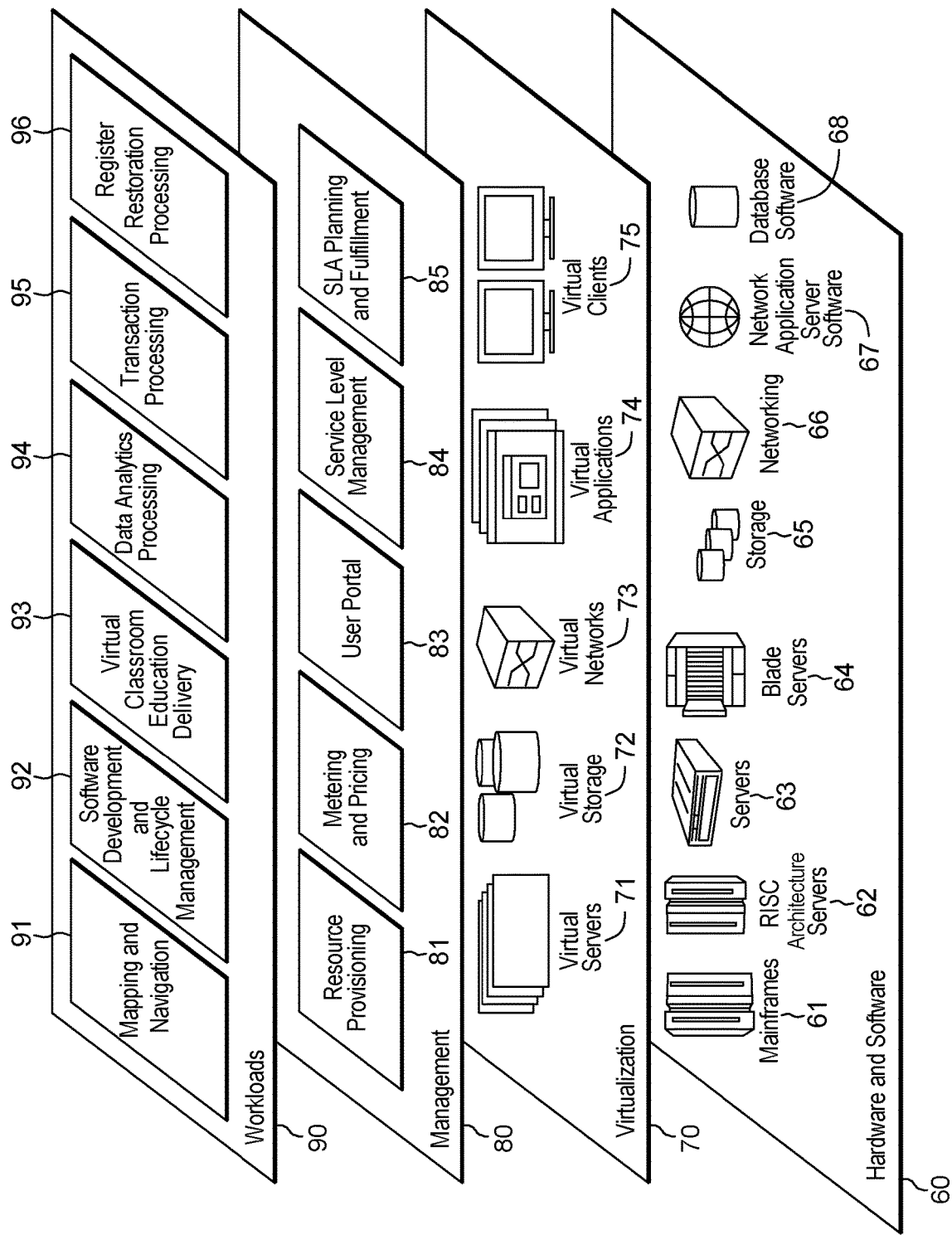
FIG. 27 depicts one example of abstraction model layers.

Referring now to FIG. 27, a set of functional abstraction layers provided by cloud computing environment 50 (FIG. 26) is shown. It should be understood in advance that the components, layers, and functions shown in FIG. 27 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and register restoration and associated processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a computer readable storage medium readable by a processing circuit and storing instructions for performing a method comprising:
   obtaining a restore request to restore one or more architected registers specified in the restore request the restore request being obtained based on a return from a called routine;
   comparing, based on obtaining the restore request, an indication of the one or more architected registers specified in the restore request with an indication of one or more architected registers specified in a save request of a caller that calls routines, the save request to save the one or more architected registers specified in the save request by taking a snapshot of the one or more architected registers specified in the save request, the snapshot comprising an indication of one or more physical registers previously assigned to the one or more architected registers specified in the save request, the comparing to determine whether the one or more architected registers specified in the restore request have been saved in the snapshot;
   reloading contents of the one or more architected registers specified in the restore request from memory based on the comparing indicating the snapshot has not been taken for the one or more architected registers specified in the restore request,
   obtaining the snapshot, based on the comparing indicating that the one or more architected registers specified in the restore request have been saved in the snapshot;
   restoring, based on obtaining the snapshot, the one or more architected registers specified in the restore request from the snapshot taken of the one or more architected registers specified in the save request, the snapshot indicating the one or more physical registers previously assigned to the one or more architected registers specified in the save request, the restoring replacing one or more physical registers currently assigned to the one or more architected registers specified in the restore request with the one or more physical registers previously assigned to the one or more architected registers specified in the save request as indicated by the snapshot;
   determining validity of the one or more architected registers specified in the restore request, and restored using the snapshot, to determine whether changes to memory subsequent to taking the snapshot have resulted in incorrect contents of at least one architected register of the one or more architected registers specified in the restore request, the determining validity checking memory locations associated with the one or more architected registers specified in the restore request to determine whether contents of the one or more architected registers specified in the restore request have changed since the snapshot was taken, wherein the one or more architected registers specified in the restore request are valid based on the checking indicating the contents of the one or more architected registers specified in the restore request have not changed; and
   reloading the contents of the at least one architected register specified in the restore request from memory, based on determining the incorrect contents of the at least one architected register of the one or more architected registers specified in the restore request and restored using the snapshot.

2. The computer program product of claim 1, wherein the obtaining the restore request comprises:
   obtaining a restore instruction, and performing the comparing based thereon, the restore instruction providing the indication of the one or more architected registers specified in the restore request.

3. The computer program product of claim 2, wherein the restore instruction comprises a bulk restore instruction to restore a plurality of architected registers.

4. The computer program product of claim 1, wherein the save request comprises a bulk store instruction to save a plurality of architected registers.

5. The computer program product of claim 1, wherein the method further comprises:
   checking validity of the snapshot, based on obtaining the snapshot; and
   performing the reloading the contents of the one or more architected registers specified in the restore request from memory based on the checking indicating the snapshot is invalid and performing the restoring based on the checking indicating the snapshot is valid.

6. The computer program product of claim 1, wherein the determining validity of the one or more architected registers specified in the restore request comprises:
   loading contents of the one or more architected registers specified in the restore request from memory;
   comparing the contents loaded from memory with contents of the one or more architected registers specified in the restore request and restored using the snapshot; and
   determining invalidity of the one or more architected registers specified in the restore request based on the comparing indicating a mismatch.

7. The computer program product of claim 1, wherein the method further comprises obtaining the snapshot from a stack of snapshots.

8. The computer program product of claim 7, wherein the snapshot is a last snapshot taken.

9. A computer system for facilitating processing within a computing environment, the computer system comprising:
   a memory; and
   a processor in communication with the memory, wherein the computer system is configured to perform a method, said method comprising:

obtaining a restore request to restore one or more architected registers specified in the restore request the restore request being obtained based on a return from a called routine;

comparing, based on obtaining the restore request, an indication of the one or more architected registers specified in the restore request with an indication of one or more architected registers specified in a save request of a caller that calls routines, the save request to save the one or more architected registers specified in the save request by taking a snapshot of the one or more architected registers specified in the save request, the snapshot comprising an indication of one or more physical registers previously assigned to the one or more architected registers specified in the save request, the comparing to determine whether the one or more architected registers specified in the restore request have been saved in the snapshot;

reloading contents of the one or more architected registers specified in the restore request from memory based on the comparing indicating the snapshot has not been taken for the one or more architected registers specified in the restore request, obtaining the snapshot, based on the comparing indicating that the one or more architected registers specified in the restore request have been saved in the snapshot;

restoring, based on obtaining the snapshot, the one or more architected registers specified in the restore request from the snapshot taken of the one or more architected registers specified in the save request, the snapshot indicating the one or more physical registers previously assigned to the one or more architected registers specified in the save request, the restoring replacing one or more physical registers currently assigned to the one or more architected registers specified in the restore request with the one or more physical registers previously assigned to the one or more architected registers specified in the save request as indicated by the snapshot;

determining validity of the one or more architected registers specified in the restore request, and restored using the snapshot, to determine whether changes to memory subsequent to taking the snapshot have resulted in incorrect contents of at least one architected register of the one or more architected registers specified in the restore request, the determining validity checking memory locations associated with the one or more architected registers specified in the restore request to determine whether contents of the one or more architected registers specified in the restore request have changed since the snapshot was taken, wherein the one or more architected registers specified in the restore request are valid based on the checking indicating the contents of the one or more architected registers specified in the restore request have not changed; and reloading the contents of the at least one architected register specified in the restore request from memory, based on determining the incorrect contents of the at least one architected register of the one or more architected registers specified in the restore request and restored using the snapshot.

10. The computer system of claim 9, wherein the obtaining the restore request comprises:

obtaining a restore instruction, and performing the comparing based thereon, the restore instruction providing the indication of the one or more architected registers specified in the restore request.

11. The computer system of claim 10, wherein the restore instruction comprises a bulk restore instruction to restore a plurality of architected registers.

12. The computer system of claim 9, wherein the determining validity of the one or more architected registers specified in the restore request comprises:

loading contents of the one or more architected registers specified in the restore request from memory;

comparing the contents loaded from memory with contents of the one or more architected registers specified in the restore request and restored using the snapshot; and determining invalidity of the one or more architected registers specified in the restore request based on the comparing indicating a mismatch.

13. The computer system of claim 9, wherein the save request comprises a bulk store instruction to save a plurality of architected registers.

14. The computer system of claim 9, wherein the method further comprises obtaining the snapshot from a stack of snapshots.

15. A computer-implemented method of facilitating processing within a computing environment, the computer-implemented method comprising:

obtaining a restore request to restore one or more architected registers specified in the restore request the restore request being obtained based on a return from a called routine;

comparing, based on obtaining the restore request, an indication of the one or more architected registers specified in the restore request with an indication of one or more architected registers specified in a save request of a caller that calls routines, the save request to save the one or more architected registers in the save request by taking a snapshot of the one or more architected registers specified in the save request, the snapshot comprising an indication of one or more physical registers previously assigned to the one or more architected registers specified in the save request, the comparing to determine whether the one or more architected registers specified in the restore request have been saved in the snapshot;

reloading contents of the one or more architected registers specified in the restore request from memory based on the comparing indicating the snapshot has not been taken for the one or more architected registers specified in the restore request, obtaining the snapshot, based on the comparing indicating that the one or more architected registers specified in the restore request have been saved in the snapshot;

restoring, based on obtaining the snapshot, the one or more architected registers specified in the restore request from the snapshot taken of the one or more architected registers specified in the save request, the snapshot indicating the one or more physical registers previously assigned to the one or more architected registers specified in the save request, the restoring replacing one or more physical registers currently assigned to the one or more architected registers specified in the restore request with the one or more physical registers previously assigned to the one or more architected registers specified in the save request as indicated by the snapshot;

determining validity of the one or more architected registers specified in the restore request, and restored using the snapshot, to determine whether changes to memory subsequent to taking the snapshot have resulted in incorrect contents of at least one architected register of the one or more architected registers specified in the restore request, the determining validity checking memory locations associated with the one or more architected registers specified in the restore request to determine whether contents of the one or more architected registers specified in the restore request have changed since the snapshot was taken, wherein the one or more architected registers specified in the restore request are valid based on the checking indicating the contents of the one or more architected registers specified in the restore request have not changed; and reloading the contents of the at least one architected register specified in the restore request from memory, based on determining the incorrect contents of the at least one architected register of the one or more architected registers specified in the restore request and restored using the snapshot.

16. The computer-implemented method of claim 15, wherein the obtaining the restore request comprises:

obtaining a restore instruction, and performing the comparing based thereon, the restore instruction providing the indication of the one or more architected registers specified in the restore request.

17. The computer-implemented method of claim 16, wherein the restore instruction comprises a bulk restore instruction to restore a plurality of architected registers.

18. The computer-implemented method of claim 15, wherein the determining validity of the one or more architected registers comprises:

loading contents of the one or more architected registers specified in the restore request from memory;

comparing the contents loaded from memory with contents of the one or more architected registers specified in the restore request and restored using the snapshot; and determining invalidity of the one or more architected registers specified in the restore request based on the comparing indicating a mismatch.

19. The computer-implemented method of claim 15, wherein the save request comprises a bulk store instruction to save a plurality of architected registers.

20. The computer-implemented method of claim 15, further comprising obtaining the snapshot from a stack of snapshots.

* * * * *